(12) United States Patent
Morimoto et al.

(10) Patent No.: US 12,244,217 B2
(45) Date of Patent: Mar. 4, 2025

(54) POWER SUPPLY CIRCUIT AND SEMICONDUCTOR INTEGRATED CIRCUIT INCLUDING DC-DC CONVERTER AND REGULATOR

(71) Applicant: Kioxia Corporation, Tokyo (JP)

(72) Inventors: Makoto Morimoto, Yokohama Kanagawa (JP); Rui Ito, Chigasaki Kanagawa (JP); Ryuichi Fujimoto, Tokyo (JP)

(73) Assignee: Kioxia Corporation, Tokyo (JP)

( * ) Notice: Subject to any disclaimer, the term of this patent is extended or adjusted under 35 U.S.C. 154(b) by 556 days.

(21) Appl. No.: 17/475,498

(22) Filed: Sep. 15, 2021

(65) Prior Publication Data
US 2022/0302817 A1    Sep. 22, 2022

(30) Foreign Application Priority Data

Mar. 18, 2021   (JP) ................................ 2021-044843

(51) Int. Cl.
*H02M 1/00*   (2007.01)
*H02M 1/14*   (2006.01)
*H02M 3/07*   (2006.01)

(52) U.S. Cl.
CPC ........... *H02M 1/0045* (2021.05); *H02M 1/14* (2013.01); *H02M 3/07* (2013.01)

(58) Field of Classification Search
CPC ...... H02M 1/0045; H02M 3/07; H02M 3/072; H02M 3/073; H02M 3/075; H02M 3/077
See application file for complete search history.

(56) References Cited

U.S. PATENT DOCUMENTS

| | | | |
|---|---|---|---|
| 6,597,158 B2 * | 7/2003 | Umeda | H02M 3/07 323/272 |
| 7,679,350 B2 | 3/2010 | Falvey et al. | |
| 9,160,875 B2 | 10/2015 | Miura | |
| 9,899,919 B2 | 2/2018 | Crossley et al. | |
| 9,998,010 B1 * | 6/2018 | Ibrahim | H02M 3/07 |
| 10,020,747 B2 | 7/2018 | Madsen | |
| 10,073,478 B1 * | 9/2018 | Ivanov | G05F 1/595 |
| 10,720,833 B2 * | 7/2020 | Tsuda | H02M 3/073 |
| 11,088,618 B2 * | 8/2021 | Nag | H02M 3/07 |
| 2003/0234635 A1 | 12/2003 | Currelly et al. | |

(Continued)

FOREIGN PATENT DOCUMENTS

| CN | 100552593 C | 10/2009 |
|---|---|---|
| JP | 2011-72094 A | 4/2011 |

(Continued)

OTHER PUBLICATIONS

Design Techniques for Fully Integrated Switched-Capacitor DC-DC Converters, JSSC2011.

*Primary Examiner* — Gustavo A Rosario-Benitez
(74) *Attorney, Agent, or Firm* — Maier & Maier, PLLC

(57) ABSTRACT

A power supply circuit has a first node, a second node, a DC-DC converter that includes a switched capacitor, generates an output voltage based on an input voltage supplied from the first node, and outputs the output voltage from the second node, and a regulator that is connected in parallel to the DC-DC converter between the first node and the second node and controls an output current flowing to the second node based on a reference voltage lower than the input voltage.

17 Claims, 58 Drawing Sheets

(56) References Cited

U.S. PATENT DOCUMENTS

| | | | |
|---|---|---|---|
| 2005/0088856 A1* | 4/2005 | Yamamoto | H02M 3/1588 363/19 |
| 2008/0116979 A1* | 5/2008 | Lesso | H03G 1/0029 330/297 |
| 2008/0224769 A1* | 9/2008 | Markowski | H03F 1/0227 330/136 |
| 2009/0016085 A1* | 1/2009 | Rader | H02M 3/07 363/79 |
| 2015/0061613 A1 | 3/2015 | Kondou | |
| 2015/0234403 A1* | 8/2015 | Siao | G05F 1/575 323/280 |
| 2016/0019092 A1 | 1/2016 | Yuan et al. | |
| 2020/0209902 A1* | 7/2020 | Elias-Palacios | H02M 1/44 |
| 2021/0075316 A1* | 3/2021 | Oshita | H03K 5/249 |
| 2021/0303013 A1* | 9/2021 | Sun | G05F 1/575 |

FOREIGN PATENT DOCUMENTS

| | | |
|---|---|---|
| JP | 2014-143791 A | 8/2014 |
| JP | 2015-47017 A | 3/2015 |
| JP | 2017-511679 A | 4/2017 |
| JP | 6224365 B2 | 11/2017 |
| JP | 6332962 B2 | 5/2018 |
| JP | 6521187 B2 | 5/2019 |
| JP | 6560360 B2 | 8/2019 |
| JP | 6672312 B2 | 3/2020 |

* cited by examiner

CAPACITANCE SUPPLY STATE

POWER SUPPLY CIRCUIT AND SEMICONDUCTOR INTEGRATED CIRCUIT INCLUDING DC-DC CONVERTER AND REGULATOR

CROSS REFERENCE TO RELATED APPLICATIONS

This application is based upon and claims the benefit of priority from the prior Japanese Patent Application No. 2021-044843, filed on Mar. 18, 2021, the entire contents of which are incorporated herein by reference.

FIELD

Embodiments of the present invention relate to a power supply circuit and a semiconductor integrated circuit.

BACKGROUND

Semiconductor integrated circuits tend to lower a voltage of power to be supplied in order to reduce power consumption. The voltage of the power used as a voltage source of the semiconductor integrated circuit is generated using a DC-DC converter, an analog LDO regulator, or the like. The DC-DC converter using a switched capacitor (hereinafter, SC-DCDCC) does not require a transformer, is easy to integrate, and has good power efficiency, but has a problem that a ripple of an output voltage is large.

On the other hand, the analog LDO regulator has a simple configuration, is easy to integrate, can suppress the ripple of the output voltage, and can adjust the output voltage, but has a problem that power efficiency is poor.

In this manner, the SC-DCDCC and the analog LDO regulator have advantages and disadvantages, a configuration in which the SC-DCDCC and the LDO regulator are connected in cascade has been proposed. This configuration has advantages that power efficiency is excellent, the ripple of the output voltage is small, and the output voltage can be adjusted. However, since the SC-DCDCC and the analog LDO regulator are connected in cascade, large-current driving is difficult, and further, it is necessary to connect a large output capacitance to the analog LDO regulator in order to suppress a load variation, so that there is a problem that a circuit area increases.

DETAILED DESCRIPTION

According to one embodiment, a power supply circuit has a first node, a second node, a DC-DC converter that includes a switched capacitor, generates an output voltage based on an input voltage supplied from the first node, and outputs the output voltage from the second node, and a regulator that is connected in parallel to the DC-DC converter between the first node and the second node and controls an output current flowing to the second node based on a reference voltage lower than the input voltage.

Hereinafter, embodiments of a power supply circuit and a semiconductor integrated circuit will be described with reference to the drawings. Although main components of the power supply circuit and the semiconductor integrated circuit will be mainly described hereinafter, the power supply circuit and the semiconductor integrated circuit may have components and functions that are not illustrated or described. The following description does not exclude the components and functions that are not illustrated or described.

First Embodiment

Figure 1:
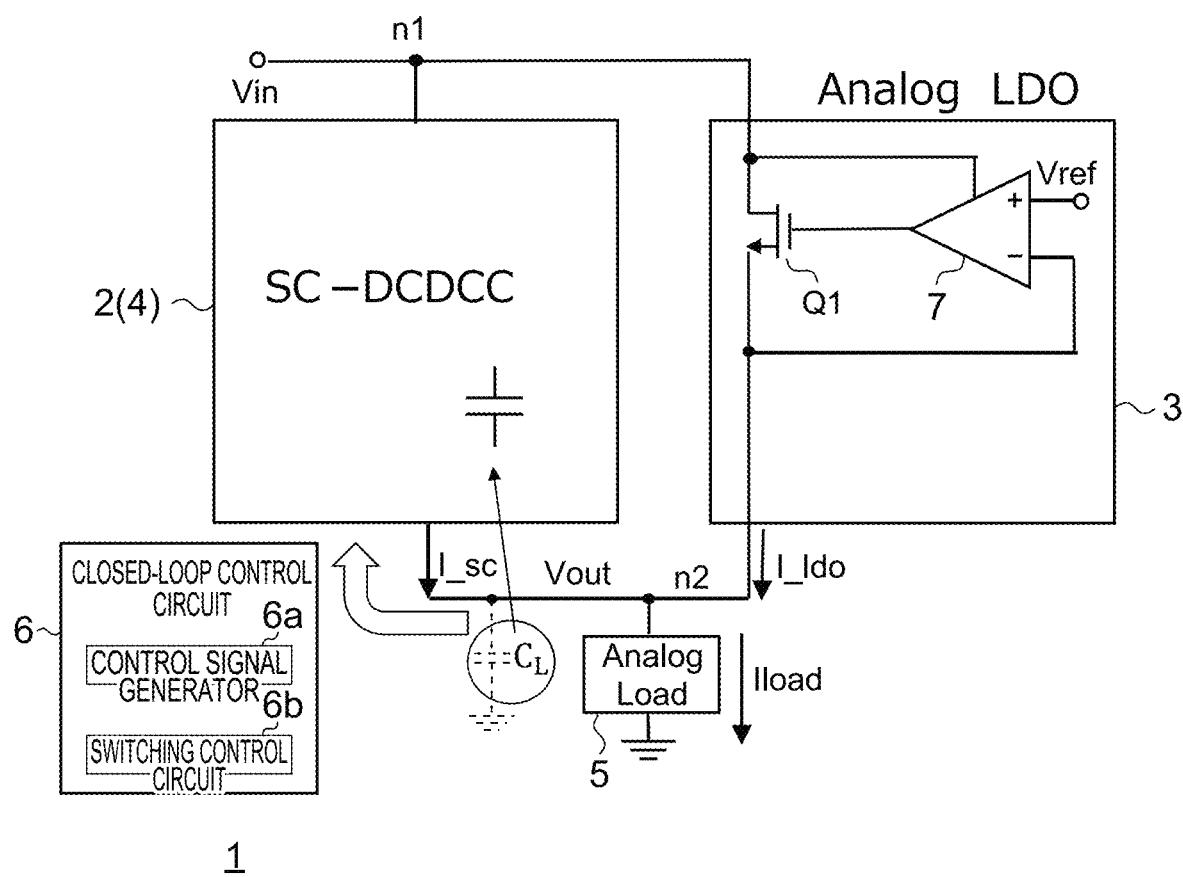
FIG. 1 is a block diagram illustrating a schematic configuration of a power supply circuit according to a first embodiment.

FIG. 1 is a block diagram illustrating a schematic configuration of a power supply circuit 1 according to a first embodiment. The power supply circuit 1 of FIG. 1 includes a DC-DC converter 2 and a regulator 3 both connected in parallel between a first node n1 and a second node n2. The power supply circuit 1 includes the first node n1 and the second node n2. A DC input voltage Vin of a certain voltage level is supplied to the first node n1. An output voltage Vout of a certain voltage level is output from the second node n2. The first node n1 is an input node of the power supply circuit 1, and the second node n2 is an output node of the power supply circuit 1.

The DC-DC converter 2 of FIG. 1 includes a switched capacitor circuit 4, generates the output voltage Vout based on the DC input voltage Vin supplied from the first node n1, and outputs the output voltage Vout from the second node n2. The switched capacitor circuit 4 is a circuit including a capacitor and a switching element that controls charging and discharging of the capacitor. The switched capacitor circuit 4 may be abbreviated as a switched capacitor. The number of capacitors and switches included in the switched capacitor circuit 4 is arbitrary. The switching element in the switched capacitor circuit 4 is periodically turned on and off. As a result, the capacitor performs charging and discharging, and a voltage across the capacitor changes. Hereinafter, the DC-DC converter 2 may be referred to as the SC-DCDCC 2. The SC-DCDCC 2 periodically turns on and off the switching element in the switched capacitor circuit 4 to charge and discharge the capacitor in the switched capacitor circuit 4, thereby generating the output voltage Vout having a voltage level different from a voltage level of the input voltage Vin as will be described in detail in other embodiments below.

The regulator 3 of FIG. 1 is connected in parallel to the SC-DCDCC 2 between the first node n1 and the second node n2. The regulator 3 controls a current flowing to the second node n2 based on a reference voltage Vref lower than the input voltage Vin. Hereinafter, the regulator 3 may be referred to as the analog LDO 3. In the present specification, an example in which the input voltage Vin supplied to the first node n1 is a power supply voltage will be mainly described. Here, the power supply voltage is a voltage supplied to a power supply terminal of the power supply circuit 1.

A load circuit (analog load) 5 is connected to the second node n2. A specific circuit configuration of the load circuit 5 is not limited. A current (I_sc+I_ldo) obtained by adding a current I_sc output from the SC-DCDCC 2 and a current I_ldo output from the analog LDO 3 flows through the load circuit 5.

The power supply circuit 1 further includes a closed-loop control circuit (first circuit) 6 that performs feedback control of the SC-DCDCC 2 based on the voltage level of the output voltage Vout. The closed-loop control circuit 6 includes, for example, a control signal generator (second circuit) 6a and a switching control circuit (third circuit) 6b. The control signal generator 6a generates a control signal corresponding to the voltage level of the output voltage Vout. The switching control circuit 6b controls switching of the switched capacitor circuit 4 based on the control signal.

The analog LDO 3 includes a control amplifier 7 and a first transistor Q1. The control amplifier 7 outputs a signal corresponding to a voltage difference between the output voltage Vout and the reference voltage Vref. In the example of FIG. 1, the reference voltage Vref is applied to a non-inverting input terminal of the control amplifier 7, and the output voltage Vout is applied to an inverting input terminal. The reference voltage Vref is a voltage at a voltage level lower than the voltage level of the input voltage Vin supplied to the first node n1. In addition, the input voltage Vin is supplied from the first node n1 to a power supply terminal of the control amplifier 7. An output node of the control amplifier 7 is connected to the first transistor Q1.

The first transistor Q1 is, for example, an NMOS transistor. A gate of the first transistor Q1 is connected to the output node of the control amplifier 7, a drain of the first transistor Q1 is connected to the first node n1, and a source of the first transistor Q1 is connected to the second node n2 and the inverting input terminal of the control amplifier 7. In this manner, the analog LDO 3 performs a feedback control such that the voltage level of the output voltage Vout matches to the reference voltage Vref, and the control amplifier 7 and the first transistor Q1 in the analog LDO 3 constitute a closed-loop control circuit different from the closed-loop control circuit 6.

In general, when the analog LDO 3 is used alone, a large output capacitance CL is required in order to suppress a load variation of the output voltage Vout output from the analog LDO 3. In the power supply circuit 1, a capacitor in the switched capacitor circuit 4 included in the SC-DCDCC 2 can be used as the output capacitance CL of the analog LDO 3. Thus, it is unnecessary to provide the large output capacitance CL, and the circuit scale of the power supply circuit 1 can be reduced.

In this manner, the SC-DCDCC 2 and the analog LDO 3 are connected in parallel between the first node n1 and the second node n2 in the power supply circuit 1 according to the first embodiment. Therefore, a current, obtained by adding the current output from the SC-DCDCC 2 and the current output from the analog LDO 3, can flow to the load circuit 5, and the current flowing to the load circuit 5 can be increased. More specifically, transistor sizes in the SC-DCDCC 2 and the analog LDO 3 can be individually determined according to the current required for the load circuit 5. Therefore, it is unnecessary to make the transistor size of each of the transistors in the SC-DCDCC 2 and the analog LDO 3 larger than necessary, and a circuit area of the power supply circuit 1 can be reduced.

Figure 2:
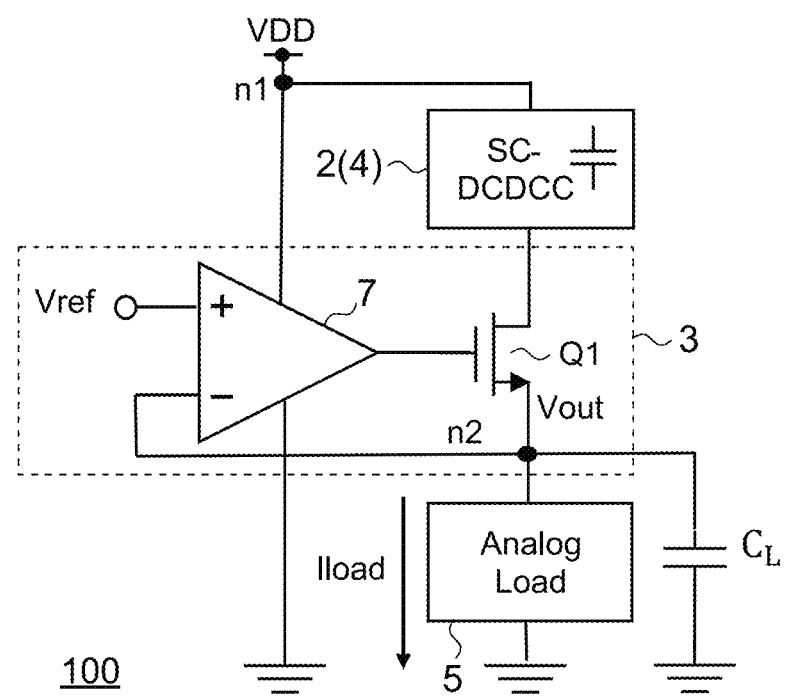
FIG. 2 is a block diagram illustrating a schematic configuration of a power supply circuit according to a comparative example.

FIG. 2 is a block diagram illustrating a schematic configuration of a power supply circuit 100 according to a comparative example. The power supply circuit 100 of FIG. 2 includes an SC-DCDCC 2 and an analog LDO 3 connected in cascade between a first node n1 that supplies an input voltage Vin and a second node n2 that outputs an output voltage Vout. More specifically, the SC-DCDCC 2 is connected between the first node n1 and a drain of a first transistor Q1 in the analog LDO 3. A source of the first transistor Q1 is connected to the second node n2. A control amplifier 7 supplies a signal corresponding to a voltage difference between a reference voltage Vref and the output voltage Vout to a gate of the first transistor Q1. Each of the SC-DCDCC 2 and the analog LDO 3 included in the power supply circuit 100 according to the comparative example has the same configuration as each of the SC-DCDCC 2 and the analog LDO 3 included in the power supply circuit 1 according to the first embodiment.

The power supply circuit 100 according to the comparative example illustrated in FIG. 2 can improve the power efficiency due to the presence of the SC-DCDCC 2, can reduce a ripple of the output voltage Vout due to the presence of the analog LDO 3, and can adjust the output voltage Vout by the analog LDO 3. However, only a current of either the SC-DCDCC 2 or the analog LDO 3 that has a smaller output current can flow to the load circuit 5 since the SC-DCDCC 2 and the analog LDO 3 are connected in cascade. Therefore, it is necessary to increase transistor sizes in both the SC-DCDCC 2 and the analog LDO 3 in order to cause a large current to flow to the load circuit 5, so that a circuit area of the power supply circuit 100 increases. In addition, it is necessary to connect a large output capacitance CL to an output node of the analog LDO 3 in order to suppress a load variation. However, since the SC-DCDCC 2 is connected in cascade with the analog LDO 3, it is difficult for a capacitor in the SC-DCDCC 2 to substituted for the output capacitance CL of the analog LDO 3. Therefore, the output capacitance CL needs to be separately provided so that the circuit area of the power supply circuit 100 further increases.

On the other hand, since the SC-DCDCC 2 and the analog LDO 3 are connected in parallel between the first node n1 and the second node n2 in the power supply circuit 1 of FIG. 1, a large current can flow to the load circuit 5 as compared with the power supply circuit 100 of FIG. 2. In addition, the switched capacitor circuit 4 in the SC-DCDCC 2 can be used as the output capacitance CL of the analog LDO 3 in the power supply circuit 1 of FIG. 1, and thus, the circuit area can be reduced as compared with the power supply circuit 100 of FIG. 2.

In this manner, the power supply circuit 1 in FIG. 1 has many advantages over the power supply circuit 100 in FIG. 2. However, the power supply circuit 1 of FIG. 1 performs double-loop control in which both the SC-DCDCC 2 and the analog LDO 3 perform the closed-loop control of the DC output voltage Vout. Therefore, it is difficult to determine which control is prioritized, and the operation is likely to be unstable. Therefore, a power supply circuit obtained by considering such a point will be described hereinafter.

Figure 3:
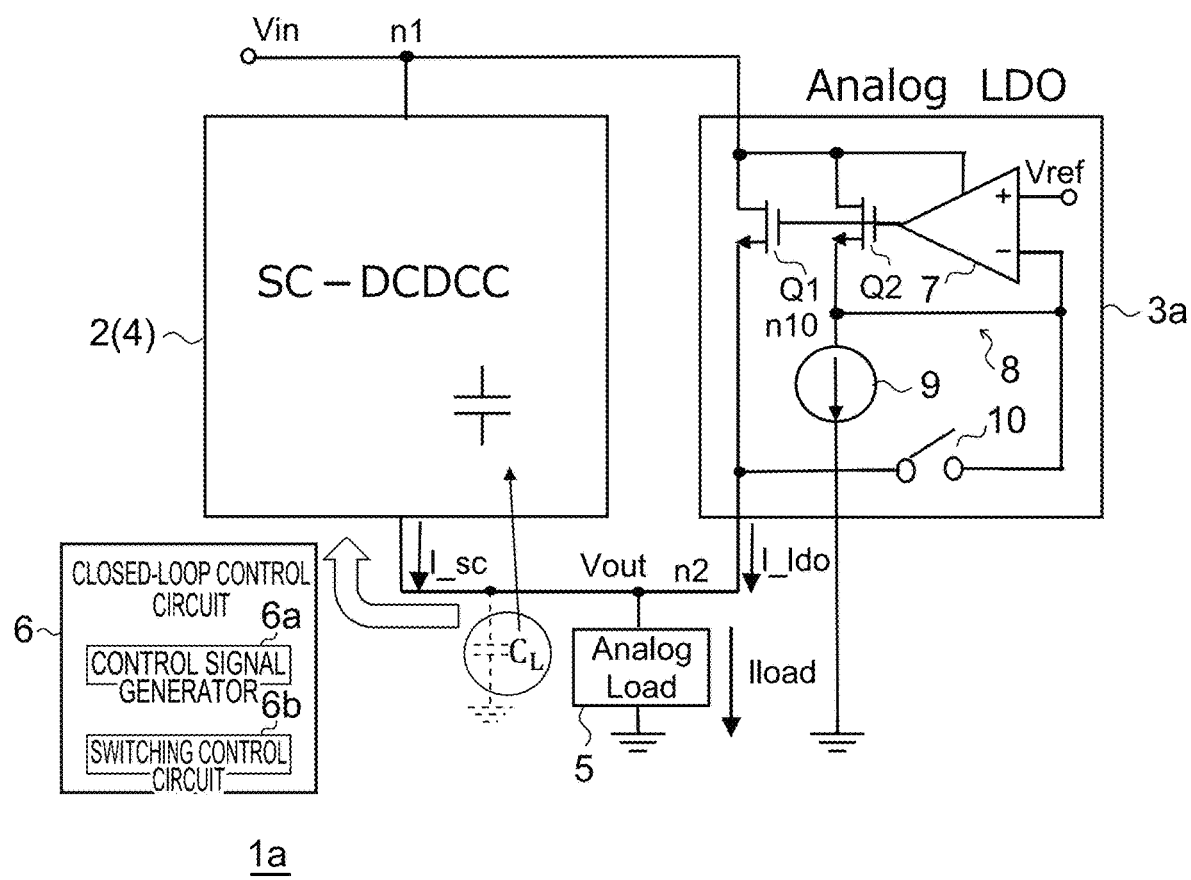
FIG. 3 is a block diagram of a first modification of the power supply circuit of FIG. 1.

FIG. 3 is a block diagram of a first modification of the power supply circuit 1 of FIG. 1. Similarly to FIG. 1, a power supply circuit 1a of FIG. 3 includes the SC-DCDCC 2 and an analog LDO 3a connected in parallel between the first node n1 and the second node n2.

An internal configuration of the analog LDO 3a in FIG. 3 is different from that of the analog LDO 3 in FIG. 1. The analog LDO 3a of FIG. 3 has an open-loop control circuit (fourth circuit) 8. The open-loop control circuit 8 executes open-loop control for controlling an output current flowing to the second node n2 based on the reference voltage Vref without performing feedback control on a voltage level of the output voltage Vout. The open-loop control circuit 8 includes a second transistor Q2, a current source 9, and a switching element 10 in addition to the control amplifier 7 and the first transistor Q1. The second transistor Q2 is, for example, an NMOS transistor.

The control amplifier 7 outputs a signal corresponding to a voltage difference between a voltage of a node n10 (third node) in the open-loop control circuit 8 and the reference voltage Vref. The first transistor Q1 receives an output signal of the control amplifier 7 at a gate, and adjusts a current flowing to the second node n2 according to a level of the received signal. The second transistor Q2 receives the output signal of the control amplifier 7 at a gate, and adjusts the voltage of the node n10 according to a level of the received signal. The node n10 is connected to a source of the second transistor Q2, for example.

A drain of the second transistor Q2 is connected to the first node n1, and the gate of the second transistor Q2 is connected to an output node of the control amplifier 7. The current source 9 is connected between the source of the second transistor Q2 and a ground node. The source of the second transistor Q2 is connected to an inverting input terminal of the control amplifier 7 via the node n10.

The switching element 10 is connected between the source of the first transistor Q1 and the inverting input terminal of the control amplifier 7. The switching element 10 switches whether to cause the analog LDO 3a to perform closed-loop control for feedback control of the voltage level of the output voltage Vout. When the switching element 10 is turned on, the source of the first transistor Q1 and the inverting input terminal of the control amplifier 7 are connected. When the switching element 10 is turned off, the connection between the source of the first transistor Q1 and the inverting input terminal of the control amplifier 7 is disconnected. In order for the open-loop control circuit 8 of the analog LDO 3a to function, it is necessary to turn off the switching element 10. When the switching element 10 is turned off, the output voltage Vout is not fed back to an input side of the control amplifier 7, and the analog LDO 3a performs the open-loop control using the second transistor Q2.

Note that the power supply circuit 1a of FIG. 3 can perform closed-loop control by the analog LDO 3a alone by stopping the operation of the SC-DCDCC 2 and turning on the switching element 10 as will be described later.

Figure 4:
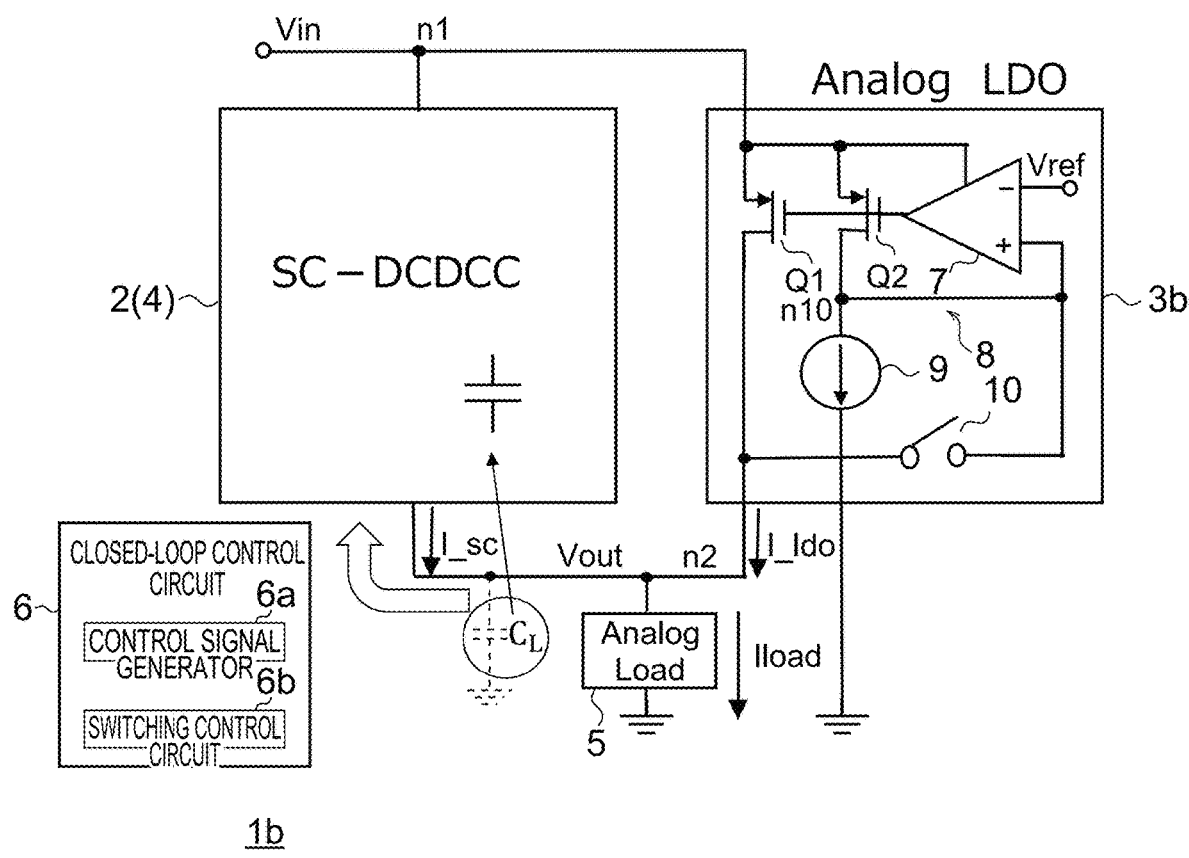
FIG. 4 is a block diagram of a second modification of the power supply circuit of FIG. 1.

The analog LDO 3a of FIG. 3 includes the first transistor Q1 and the second transistor Q2 which are the NMOS transistors, but may be configured using PMOS transistors. FIG. 4 is a block diagram of a second modification of the power supply circuit 1 of FIG. 1. A power supply circuit 1b of FIG. 4 is different from the power supply circuit 1a of FIG. 3 in that both the first transistor Q1 and the second transistor Q2 in an analog LDO 3b are PMOS transistors. A source of the first transistor Q1 and a source of the second transistor Q2 in FIG. 4 are connected to the first node n1. A drain of the first transistor Q1 is connected to the second node n2. The switching element 10 is connected between the drain of the first transistor Q1 and the non-inverting input terminal of the control amplifier 7. The reference voltage Vref is applied to the inverting input terminal of the control amplifier 7. A drain of the second transistor Q2 is connected to the non-inverting input terminal of the control amplifier 7 via the node n10. The open-loop control circuit 8 of FIG. 4 includes the control amplifier 7, the first transistor Q1, the second transistor Q2, the current source 9, and the switching element 10.

Similarly to the analog LDO 3a of FIG. 3, the analog LDO 3b of FIG. 4 can cause a large current to flow to the load circuit 5 without increasing a circuit area, and can also suppress a ripple of the output voltage Vout.

Each of the power supply circuits 1, 1a, and 1b in FIGS. 1, 3, and 4 includes only single SC-DCDCC 2. However, the ripple of the output voltage Vout can be further suppressed by providing a plurality of SC-DCDCCs 2 in the power supply circuits 1, 1a, and 1b and causing an interleaving operation of the SC-DCDCCs 2.

Figure 5:
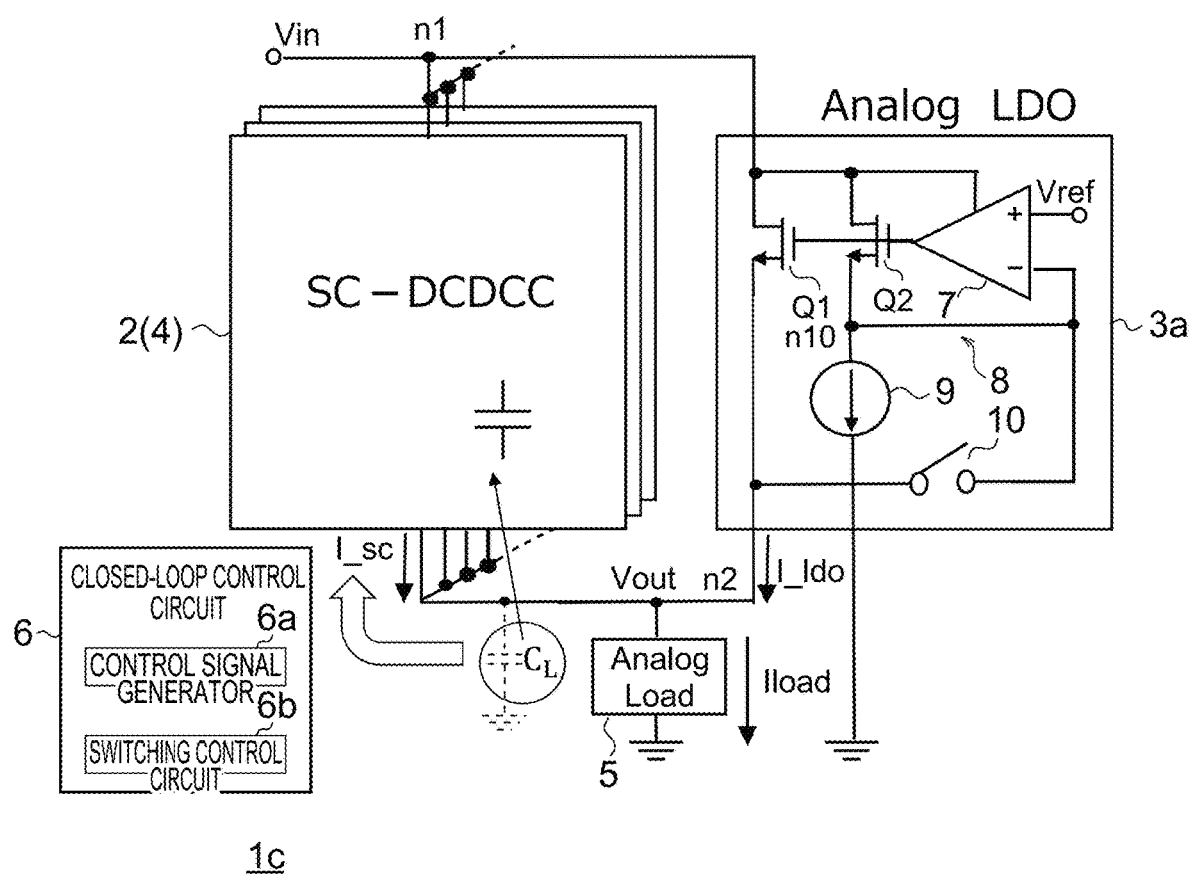
FIG. 5 is a block diagram of a third modification of the power supply circuit of FIG. 1.
Figure 6:
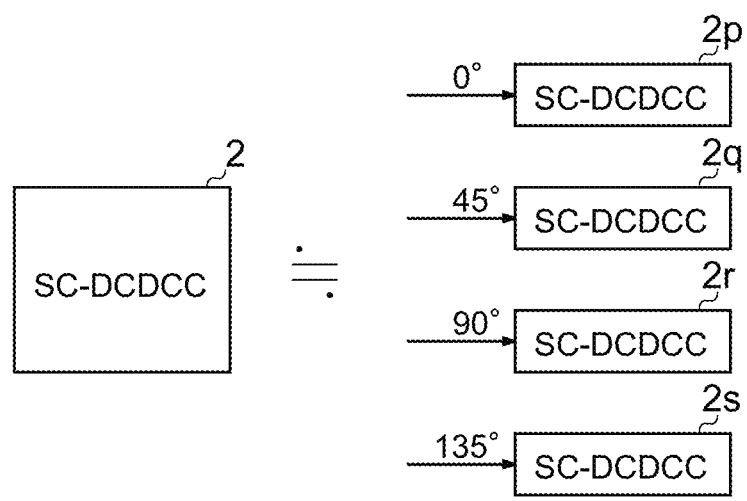
FIG. 6 is a diagram illustrating a four-interleaving operation.

FIG. 5 is a block diagram of a third modification of the power supply circuit 1 of FIG. 1. A power supply circuit 1c of FIG. 5 is different from the power supply circuit 1a of FIG. 3 in that the plurality of SC-DCDCCs 2 are connected in parallel between the first node n1 and the second node n2. The plurality of SC-DCDCCs 2 in the power supply circuit 1c in FIG. 5 performs an interleaving operation. FIG. 6 is a diagram schematically illustrating the interleaving operation. In the example of FIG. 6, four SC-DCDCCs 2p, 2q, 2r, and 2s are provided, and clock signals with shifted phases are input to the four SC-DCDCCs 2p, 2q, 2r, and 2s, respectively. For example, any one of the clock signals having phases of 0°, 45°, 90°, and 135° with respect to a reference is input to the four SC-DCDCCs 2p, 2q, 2r, and 2s in FIG. 6. Each of the SC-DCDCCs 2p, 2q, 2r, and 2s performs a switching operation of the switched capacitor circuit 4 included in each of the SC-DCDCCs 2p, 2q, 2r, and 2s in synchronization with the corresponding clock signal. That is, generation of the output voltage Vout using the clock signal shifted in phase by each of the plurality of SC-DCDCCs 2p, 2q, 2r, and 2s is referred to as the interleaving operation. Output nodes of the plurality of SC-DCDCCs 2p, 2q, 2r, and 2s are all connected to the second node n2, and a voltage obtained by combining the output voltages Vout output from the individual SC-DCDCCs 2 is output from the second node n2.

Although the four SC-DCDCCs 2p, 2q, 2r, and 2s in FIG. 6 have the same circuit configuration, it is possible to obtain the same charge transfer amount as that of the single SC-DCDCC 2 having a circuit area four times that of each of the SC-DCDCCs 2p, 2q, 2r, and 2s by operating the four SC-DCDCCs 2p, 2q, 2r, and 2s with the shifted phases. As the circuit area decreases, a size of a capacitor in the SC-DCDCC decreases. That is, the size of the capacitor constituting each of the SC-DCDCCs is reduced by using the four SC-DCDCCs 2. As a result, the charge transmission amount per one divided SC-DCDCC decreases, and the ripple of the output voltage Vout can be suppressed. In this manner, the plurality of SC-DCDCCs 2p, 2q, 2r, and 2s having the small circuit area are operated with the shifted phases, so that the ripple can be significantly suppressed as compared with the case where the output voltage Vout is generated by the single SC-DCDCC 2 having a large circuit area.

Figure 7:
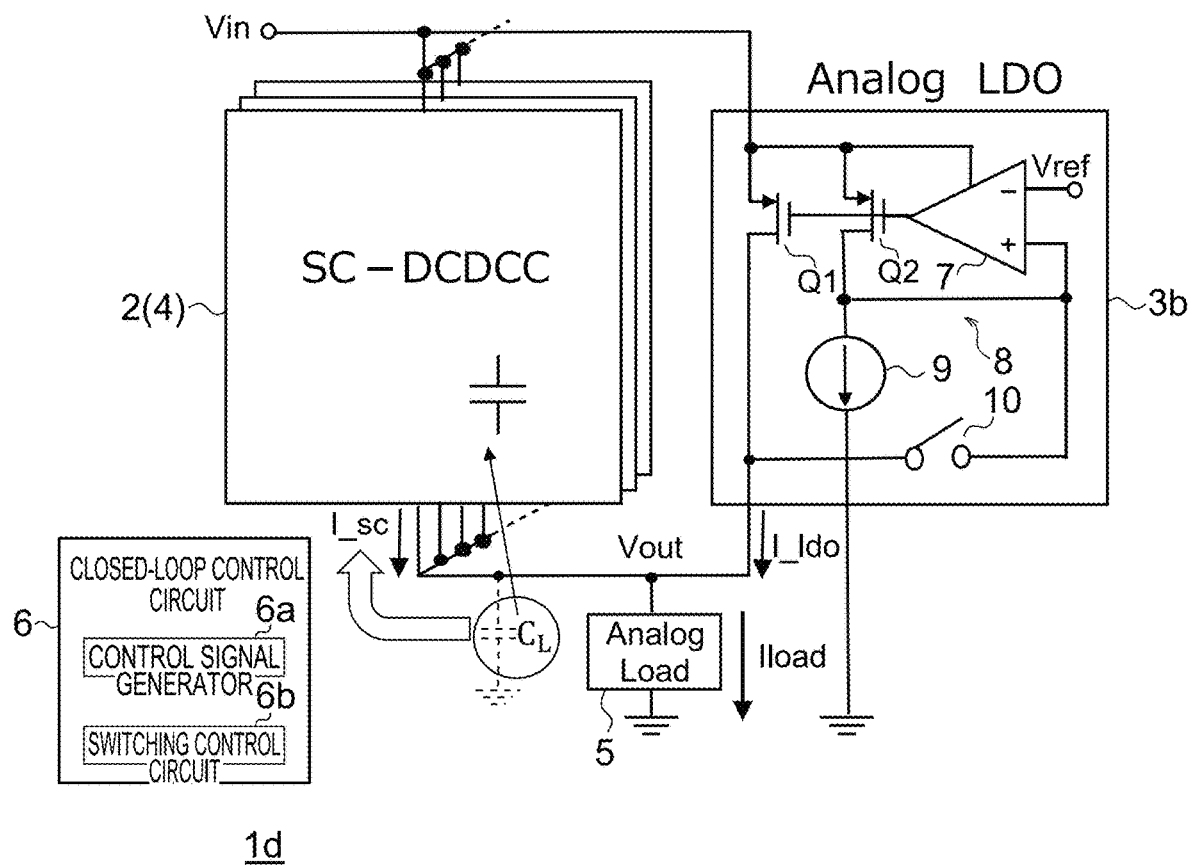
FIG. 7 is a block diagram of a fourth modification of the power supply circuit of FIG. 1.

FIG. 7 is a block diagram of a fourth modification of the power supply circuit 1 of FIG. 1. A power supply circuit 1d of FIG. 7 is different from the power supply circuit 1c of FIG. 5 in that the first transistor Q1 and the second transistor Q2 in the analog LDO 3b are PMOS transistors similarly to the power supply circuit 1b of FIG. 4, and an essential circuit operation and an obtained effect are the same as those of the power supply circuit 1c in FIG. 5.

Figure 8:
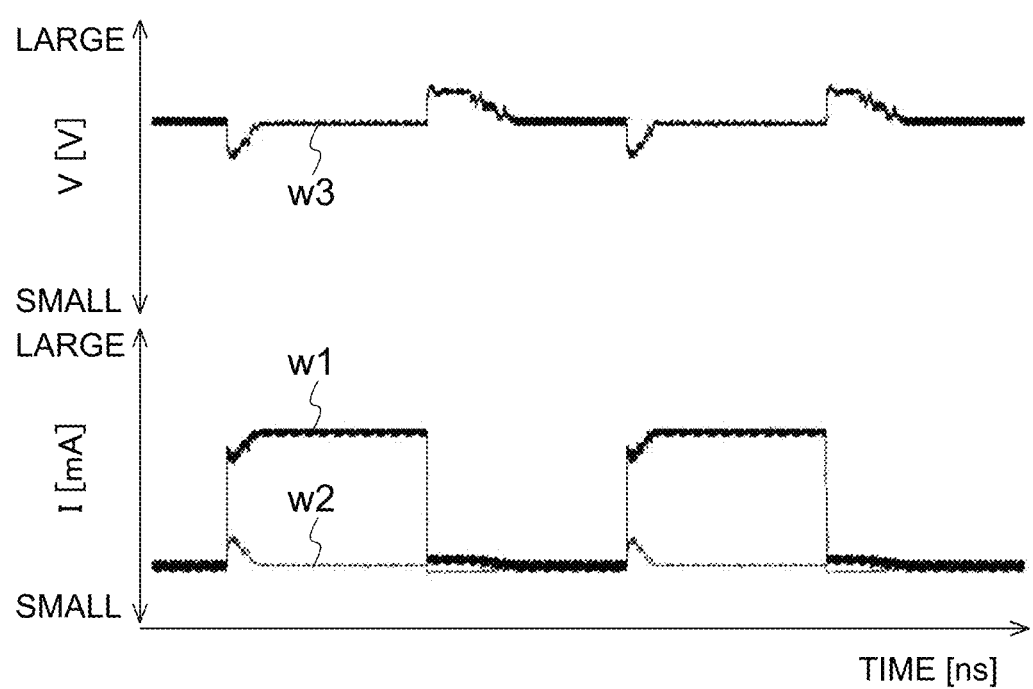
FIG. 8 is a simulation waveform diagram of each unit in the power supply circuit of FIG. 7.

FIG. 8 is a simulation waveform diagram of each unit in the power supply circuit 1c of FIG. 5. FIG. 8 illustrates a waveform in a state where the output capacitance CL is not connected to an output node of the analog LDO 3a. FIG. 8 illustrates an output current waveform w1 of the SC-DCDCC 2, an output current waveform w2 of the analog LDO 3a, and a voltage waveform w3 of the output voltage Vout of the power supply circuit 1c of FIG. 5. The output current of the SC-DCDCC 2 changes according to a change in load current. The output voltage Vout temporarily decreases in synchronization with the timing at which the output current of the SC-DCDCC 2 rapidly increases. In the parallel connection configuration as illustrated in FIG. 5, however, an ON-resistance of the output node n2 is small, and current assistance by the analog LDO 3a can be obtained when a load current varies. Therefore, a variation of the output voltage Vout when the load current varies can be suppressed to be small. Most of the current output from the power supply circuit 1c in FIG. 5 is output from the SC-DCDCC 2 as can be seen from the current waveforms w1 and w2.

Figure 9:
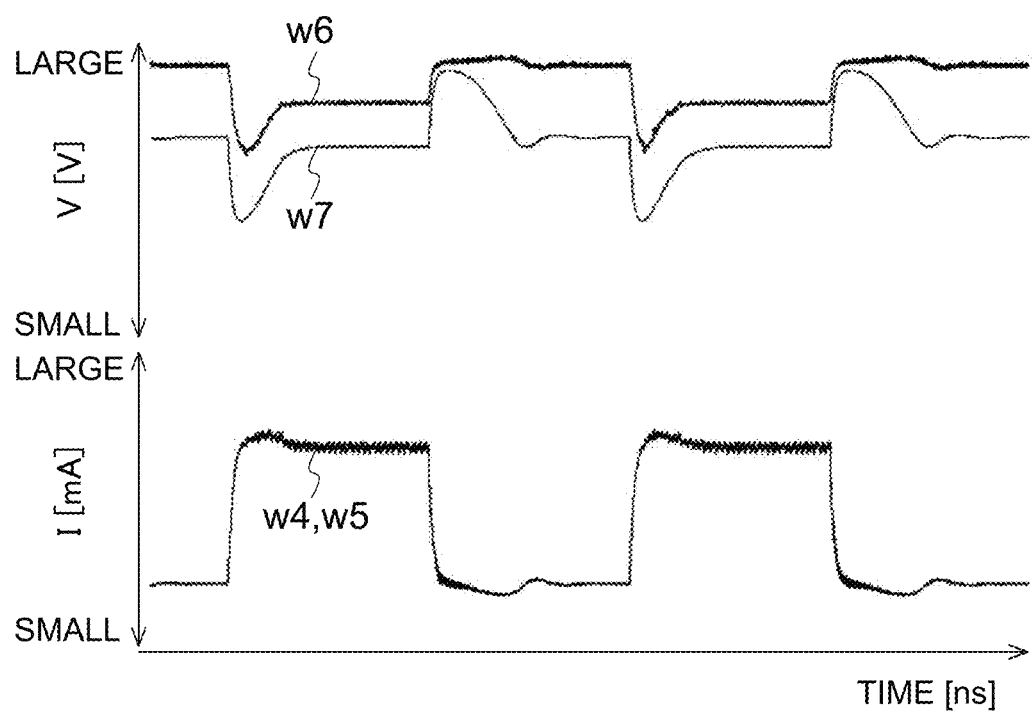
FIG. 9 is a simulation waveform diagram of each unit in the power supply circuit according to the comparative example of FIG. 2.

FIG. 9 is a simulation waveform diagram of each unit in the power supply circuit 100 according to the comparative example of FIG. 2. FIG. 9 illustrates an output current waveform w4 of the SC-DCDCC 2, an output current waveform w5 of the analog LDO 3, an output voltage waveform w6 of the SC-DCDCC 2, and an output voltage waveform w7 output from the power supply circuit 100 of FIG. 2. In the power supply circuit 100 of FIG. 2, the SC-DCDCC 2 and the analog LDO 3 are connected in cascade between the first node n1 to which the input voltage Vin is supplied and the second node n2 from which the output voltage Vout is output. Thus, the output voltage of the SC-DCDCC 2 and the output voltage Vout of the power supply circuit 100 do not match as illustrated in the waveforms w6 and w7. On the other hand, the output current of the SC-DCDCC 2 and the output current of the analog LDO 3 are substantially the same as illustrated in the waveforms w4 and w5. As can be seen by comparing FIG. 9 with FIG. 8, a variation amount of the output voltage Vout when the output current (load current) varies in the power supply circuit 100 according to the comparative example is larger than that in the power supply circuit 1c of FIG. 5.

Figure 10:
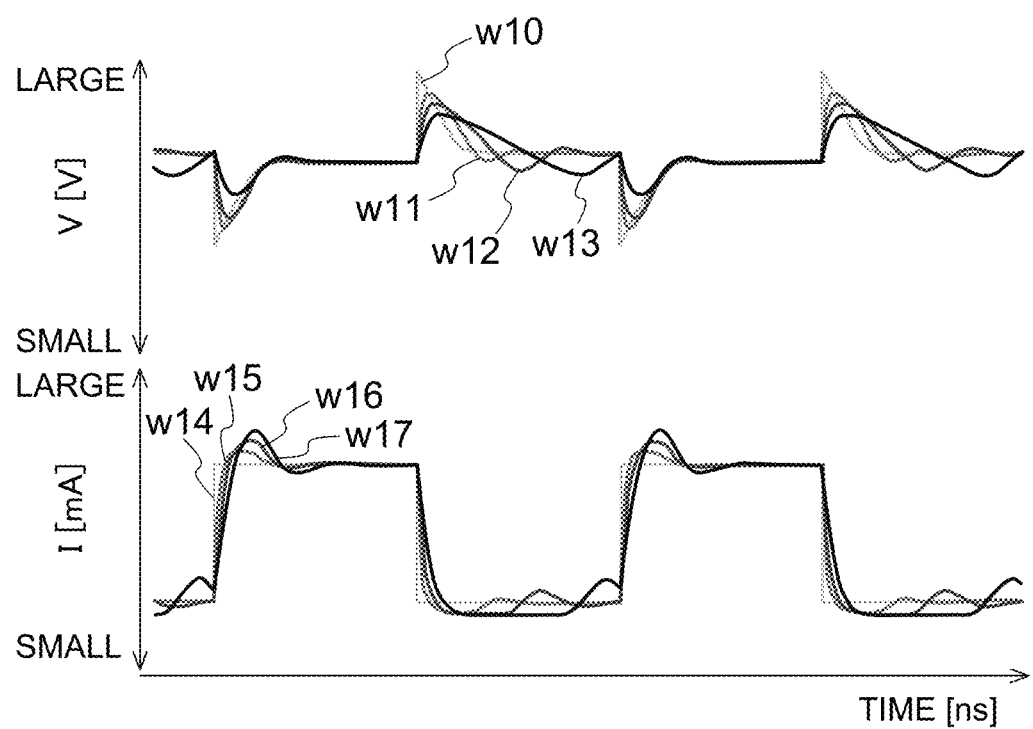
FIG. 10 is a diagram illustrating an output voltage waveform and an output current waveform when an output capacitance of an analog LDO is changed in four ways.

FIG. 10 illustrates output voltage waveforms w10 to w13 and output current waveforms w14 to w17 in a case where the output capacitance CL of the analog LDO 3a is changed in four ways in a state where the SC-DCDCC 2 is not operated in the power supply circuit 1c of FIG. 5. The output voltage waveforms w10 to w13 and the output current waveforms w14 to w17 indicate waveforms in the order of increasing the output capacitance CL. As illustrated in FIG. 10, the variation of the output voltage Vout increases as the output capacitance CL decreases. The output voltage waveform w13 has a voltage variation similar to that of the output voltage waveform w3 of FIG. 8, but the output capacitance CL of the analog LDO 3a needs to be, for example, 1,000 pF or more in order to obtain the output voltage waveform w13, so that a circuit area of the power supply circuit 1c increases.

As can be seen by comparing the voltage waveforms w10 to w13 of FIG. 10 with the voltage waveform w3 of FIG. 8, it is possible to generate the DC output voltage Vout with a small ripple without separately providing the output capacitance CL according to the power supply circuit 1c of the present embodiment.

In this manner, the SC-DCDCC 2 and the analog LDO 3, 3a, or 3b are connected in parallel between the first node n1 and the second node n2 in the first embodiment, and thus, a large current can flow to the load circuit 5 without increasing the circuit area as compared with the case where the SC-DCDCC 2 and the analog LDO 3, 3a, or 3b are connected in cascade. In addition, it is possible to suppress the ripple of the output voltage Vout more than the single SC-DCDCC 2 by providing the analog LDO 3, 3a, or 3b connected in parallel. Furthermore, the capacitor in the switched capacitor circuit 4 provided in the SC-DCDCC 2 can be used as the output capacitance CL of the analog LDO 3, 3a, or 3b, and thus, it is unnecessary to separately provide the output capacitance CL, and the circuit area of the power supply circuit 1 can be reduced.

In addition, the double-loop control is eliminated by providing the closed-loop control circuit 6 in the SC-DCDCC 2 and providing the open-loop control circuit 8 in the analog LDO 3a, and the feedback control of the output voltage Vout can be performed more stably.

Furthermore, the ripple of the output voltage Vout can be further suppressed by providing the plurality of SC-DCDCCs 2 and causing the interleaving operation among these SC-DCDCCs 2.

Second Embodiment

Figure 11A:
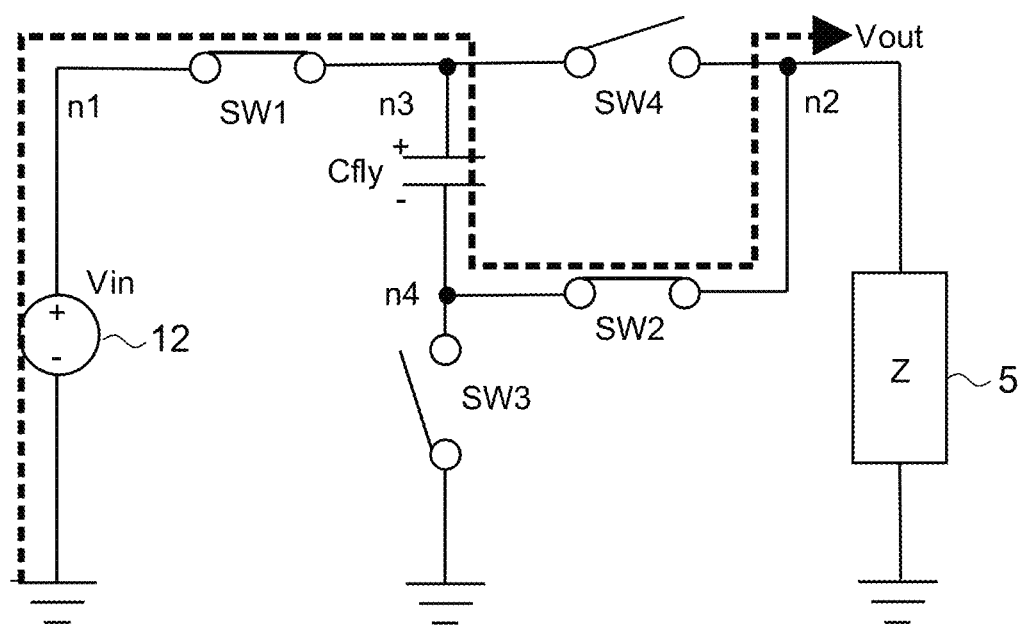
FIG. 11A is a circuit diagram illustrating an example of a basic configuration of an SC-DCDCC having a switched capacitor circuit and is the circuit diagram in which switches SW1 and SW2 are turned on, and switches SW3 and SW4 are turned off.
Figure 11B:
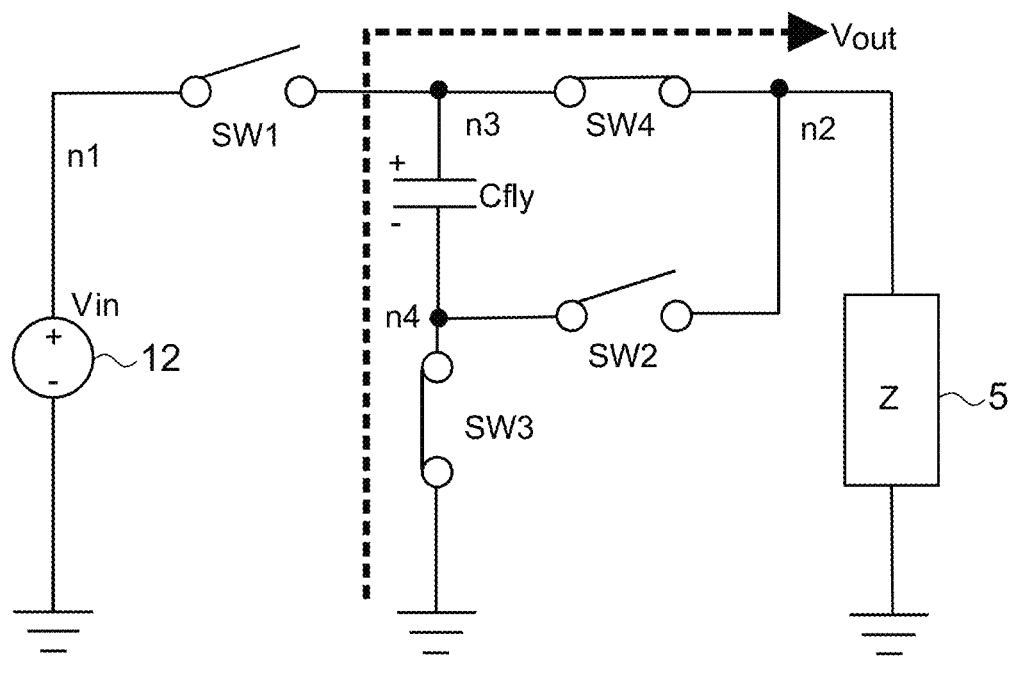
FIG. 11B is a circuit diagram in a state where the switches SW1 and SW2 are turned off and the switches SW3 and SW4 are turned on in the switched capacitor circuit.

FIGS. 11A and 11B are circuit diagrams illustrating an example of a basic configuration of an SC-DCDCC 2 including a switched capacitor circuit 4. As illustrated in FIG. 11A, the SC-DCDCC 2 includes: switches SW1 to SW4 provided between a first node n1 to which a voltage source 12 is connected and a second node n2 to which a load circuit 5 is connected; and a capacitor Cfly. The voltage source 12 supplies an input voltage Vin, which is a power supply voltage, to the SC-DCDCC 2. The switch SW1 and the switch SW4 are connected in series between the first node n1 and the second node n2. The capacitor Cfly and the switch SW3 are connected in series between a third node n3 to which the switch SW1 and the switch SW4 are connected and a ground node. The switch SW2 is connected between a fourth node n4 to which the capacitor Cfly and the switch SW3 are connected and the second node n2. An example of each of the switches SW1 to SW4 is a transistor.

FIG. 11A illustrates a state where the switches SW1 to SW4 are switched such that the input voltage (power supply voltage) Vin from the voltage source 12 is supplied to one end of the capacitor Cfly, and this state is referred to as a power supply state in the present specification. In the power supply state, the switches SW1 and SW2 are turned on, and the switches SW3 and SW4 are turned off. As a result, a current flows through a path indicated by a broken line in FIG. 11A so that the capacitor Cfly is charged. The input voltage Vin is expressed by the following Formula (1) using a voltage V (Cfly) across the capacitor Cfly and the output voltage Vout.

$$Vin=V(Cfly)+Vout \quad (1)$$

FIG. 11B is a circuit diagram in a state where the switches SW1 and SW2 are turned off and the switches SW3 and SW4 are turned on in the switched capacitor circuit 4. The input voltage (power supply voltage) Vin is not supplied to the capacitor Cfly, and the charge in the capacitor Cfly is discharged and supplied to the second node n2 in the state of FIG. 11B, therefore this state is referred to as a capacitance supply state in the present specification.

In the capacitance supply state, the switches SW1 and SW2 are turned off, and the switches SW3 and SW4 are turned on. Therefore, the accumulated charge of the capacitor Cfly flows to the load circuit 5 via the switch SW4 and the second node n2 through a path indicated by a broken line in FIG. 11B. Thus, when a voltage across the capacitor Cfly before the capacitor Cfly starts discharging is V (Cfly), the DC output voltage Vout is expressed by the following formula (2).

$$Vout=V(Cfly) \quad (2)$$

When Formula (2) is substituted into Formula (1), the output voltage Vout is expressed by the following Formula (3).

$$Vout=Vin/2 \quad (3)$$

In this manner, the output voltage Vout having a voltage level, which is half of that of the input voltage Vin, is obtained in the switched capacitor circuit 4 of FIGS. 11A and 11B.

Figure 12:
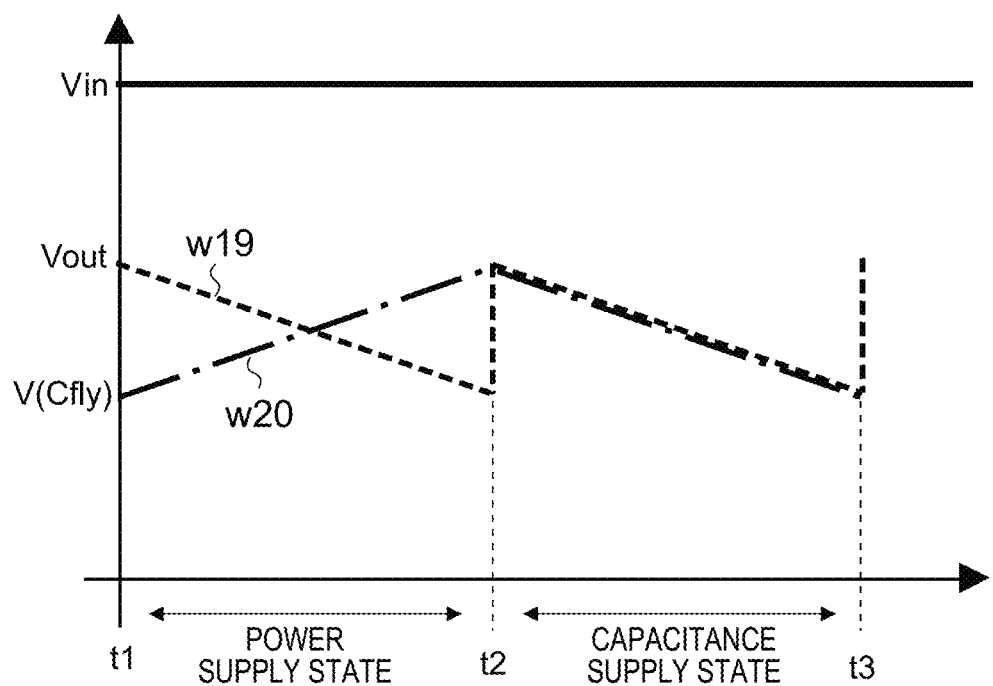
FIG. 12 is a voltage waveform diagram in a power supply state of FIG. 11A and a capacitance supply state of FIG. 11B.

FIG. 12 is a voltage waveform diagram of each unit in the power supply state of FIG. 11A and the capacitance supply state of FIG. 11B. FIG. 12 illustrates a waveform w19 of the output voltage Vout and a waveform w20 of the voltage across the capacitor Cfly. In FIG. 12, the power supply state is formed between t1 and t2, and the capacitance supply state is formed between t2 and t3. The switched capacitor circuit 4 alternately repeats the power supply state and the capacitance supply state over time. The switched capacitor circuit 4 enters the power supply state while the clock signal is at a first logic (for example, a high level), and enters the capacitance supply state while the clock signal is at a second logic (for example, a low level) different from the first logic, for example, in synchronization with the clock signal having a duty ratio of 50:50.

As illustrated in FIG. 12, the charge is gradually accumulated in the capacitor Cfly in the power supply state (time t1 to t2), and thus, the voltage V (Cfly) across the capacitor Cfly gradually increases as illustrated by the waveform w20. Since the current flows from the second node n2 to the load circuit 5, the DC output voltage Vout output from the second node n2 gradually decreases as illustrated by a waveform w19.

In addition, in the capacitance supply state (time t2 to t3), one end of the capacitor Cfly is short-circuited to the second node n2 at the timing (time t2) when the switches SW3 and SW4 are turned on, and thus, the output voltage Vout rapidly increases. Thereafter, the current flows from the second node n2 to the load circuit 5, and thus, the output voltage Vout and the voltage V (Cfly) across the capacitor Cfly gradually decrease while maintaining the same voltage level, as illustrated by the waveforms w19 and w20.

In this manner, the switched capacitor circuit 4 illustrated in FIGS. 11A and 11B periodically charges and discharges the capacitor Cfly, and accordingly, the output voltage Vout also periodically varies. Thus, the output voltage Vout of the SC-DCDCC 2 including the switched capacitor circuit 4 has a ripple in principle.

In the switched capacitor circuit 4 illustrated in FIGS. 11A and 11B, the output voltage Vout=Vin/2, which is half the voltage level of the input voltage Vin, can be generated, but it is difficult to generate the output voltages Vout at other voltage levels.

However, three types of DC output voltages Vout having different voltage levels can be generated by using the two switched capacitor circuits 4 illustrated in FIGS. 11A and 11B to perform the control for switching between on or off of each switch.

Figure 13:
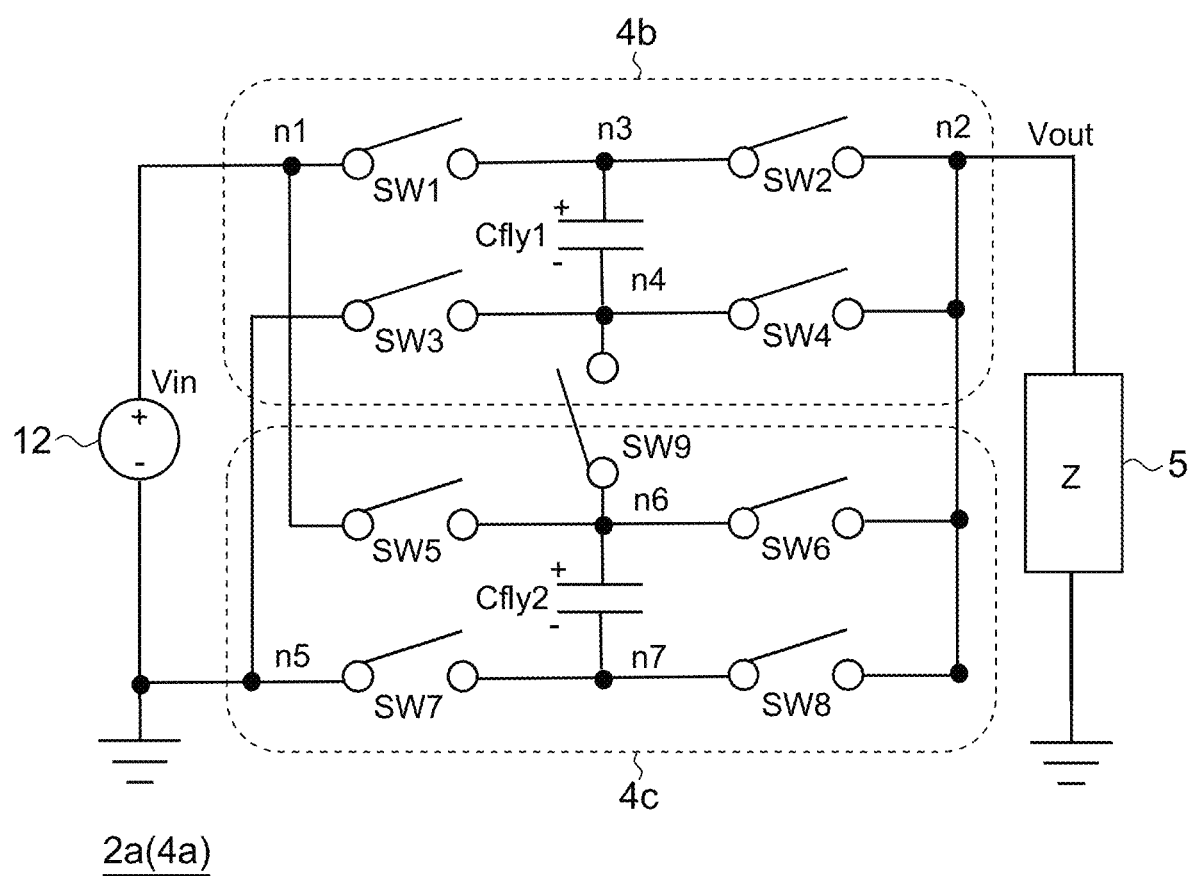
FIG. 13 is a circuit diagram of an SC-DCDCC capable of generating three types of output voltages.

FIG. 13 is a circuit diagram of an SC-DCDCC 2a capable of generating three types of output voltages Vout. The SC-DCDCC of FIG. 13 has a configuration in which the two switched capacitor circuits 4 illustrated in FIGS. 11A and 11B are used and a switch SW9 is provided between the two switched capacitor circuits 4. Hereinafter, the two switched capacitor circuits 4 in FIG. 13 will be referred to as a first switched capacitor circuit 4b and a second switched capacitor circuit 4c, and the first switched capacitor circuit 4b and the second switched capacitor circuit 4c are collectively referred to as a switched capacitor circuit 4a. Both the first switched capacitor circuit 4b and the second switched capacitor circuit 4c have the same circuit configuration as the switched capacitor circuit 4 illustrated in FIGS. 11A and 11B. More specifically, the first switched capacitor circuit 4b includes the switches SW1 to SW4 and a capacitor Cfly1. The second switched capacitor circuit 4c includes switches SW5 to SW8 and a capacitor Cfly2. An example of each of the switches SW1 to SW9 is a transistor. The input voltage Vin is supplied to the first node n1 which is one end of each of the switches SW1 and SW5. A fifth node n5, which is one end of each of the switches SW3 and SW7, is connected to a ground node. The load circuit 5 is connected to the second node n2 which is one end of each of the switches SW2, SW4, SW6, and SW8.

The capacitor Cfly1 is connected between a connection node n3 between the switches SW1 and SW2 and a connection node n4 between the switches SW3 and SW4. The capacitor Cfly2 is connected between a connection node n6 between the switches SW5 and SW6 and a connection node n7 between the switches SW7 and SW8. The switch SW9 is connected between the connection node n4 between the switches SW3 and SW4 and the connection node n6 between the switches SW5 and SW6.

Figure 14A:
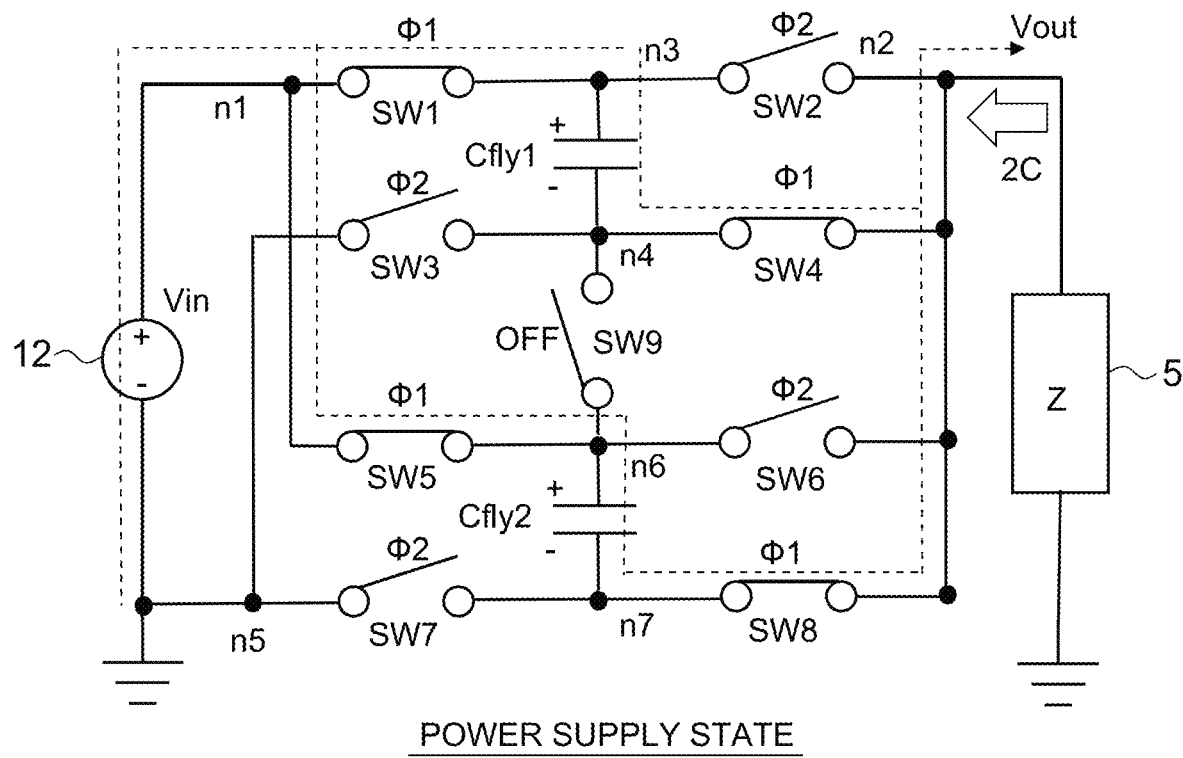
FIG. 14A is a circuit diagram illustrating an example of switching a power supply state of switches for generating an output voltage of Vin/2 from the SC-DCDCC of FIG. 13.
Figure 14B:
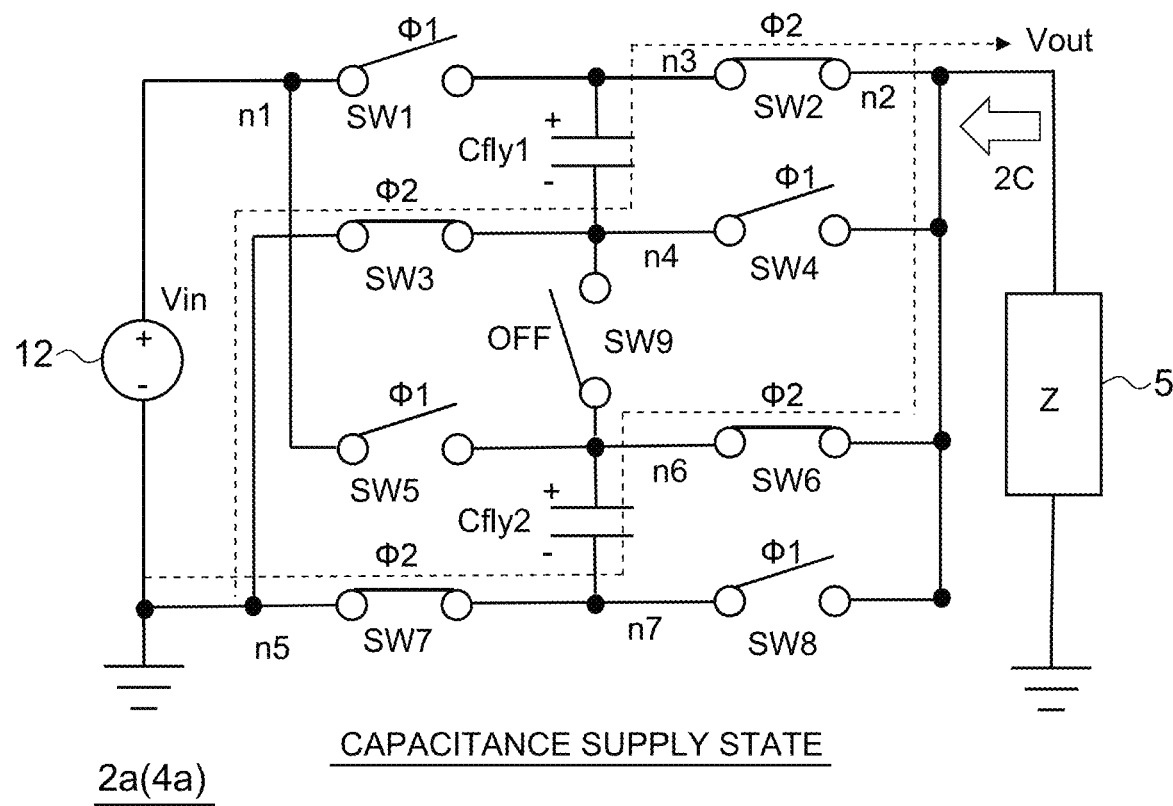
FIG. 14B is a circuit diagram illustrating an example of switching a capacitance supply state of switches for generating an output voltage of Vin/2 from the SC-DCDCC of FIG. 13.

FIGS. 14A and 14B are circuit diagrams illustrating switching examples of the switches SW1 to SW9 for generating the output voltage Vout of Vin/2 using the SC-DCDCC 2a of FIG. 13. FIG. 14A is a circuit diagram in the power supply state, and FIG. 14B is a circuit diagram in the capacitance supply state. For example, the SC-DCDCC 2a of FIG. 13 enters the power supply state of FIG. 14A while a clock signal is at a first logic (for example, a high level), and enters the capacitance supply state of FIG. 14B while the clock signal is at a second logic (for example, a low level) different from the first logic. In FIGS. 14A and 14B, control signals φ1 and φ2 corresponding to the clock signals are used. The control signal φ1 is a signal having the same phase as the clock signal, and the control signal φ2 is a signal having an opposite phase to the clock signal. In FIGS.

14A and 14B, the switches SW1, SW4, SW5, and SW8 are switch-controlled by the switch control signal φ1, and the switches SW2, SW3, SW6, and SW7 are switch-controlled by the switch control signal φ2. In addition, the switch SW9 is in an off state.

In the power supply state of FIG. 14A, the switches SW1, SW4, SW5, and SW8 are turned on, and the switches SW2, SW3, SW6, and SW7 are turned off. In addition, the switch SW9 remains off. As a result, the capacitors Cfly1 and Cfly2 are connected in parallel between the first node n1 and the second node n2. In this case, when capacitances of the capacitors Cfly1 and Cfly2 are both C, a capacitance on the output side as viewed from the second node n2 is C+C=2C.

In the power supply state of FIG. 14A, when the voltage across each of the capacitors Cfly1 and Cfly2 is V(Cfly), the input voltage Vin is expressed by the following formula (4).

$$Vin=V(Cfly)+Vout \quad (4)$$

In the capacitance supply state of FIG. 14B, the switches SW2, SW3, SW6, and SW7 are turned on, and the switches SW1, SW4, SW5, and SW8 are turned off, which is opposite to FIG. 14A. In addition, the switch SW9 still remains off. As a result, the capacitors Cfly1 and Cfly2 are connected in parallel between the ground node n5 and the second node n2. In this case, a capacitance on the output side as viewed from the second node n2 is C+C=2C.

In the capacitance supply state of FIG. 14B, the output voltage Vout is expressed by the following Formula (5).

$$Vout=V(Cfly) \quad (5)$$

When Formula (5) is substituted into V(Cfly) in Formula (4), the following Formula (6) is obtained.

$$Vout=Vin/2 \quad (6)$$

Since the capacitors Cfly1 and Cfly2 are connected in parallel between the first node n1 and the second node n2 in the power supply state of FIG. 14A, the capacitance on the output side as viewed from the second node n2 is 2C. Since the capacitors Cfly1 and Cfly2 are connected in parallel between the fifth node (ground node) n5 and the second node n2 in the capacitance supply state of FIG. 14B, the capacitance on the output side as viewed from the second node n2 is 2C.

In this manner, when the output voltage Vout=Vin/2 is output using the SC-DCDCC 2a, the capacitance on the output side as viewed from the second node n2 is 2C which is the same between the power supply state and the capacitance supply state. Thus, the capacitance does not change even when the power supply state and the capacitance supply state are switched, and thus, the ripple of the output voltage Vout can be suppressed.

Figure 15A:
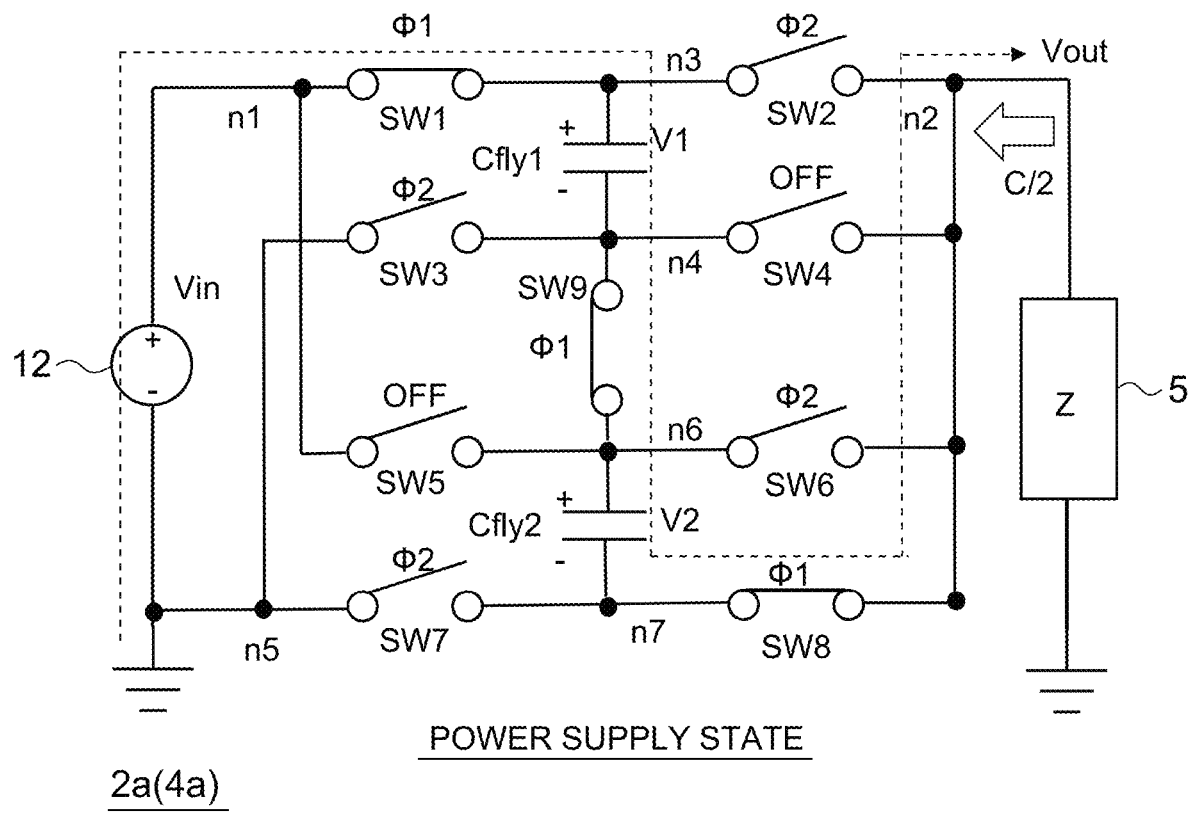
FIG. 15A is a circuit diagram illustrating an example of switching the power supply state for generating an output voltage of Vin/3 from the SC-DCDCC of FIG. 13.
Figure 15B:
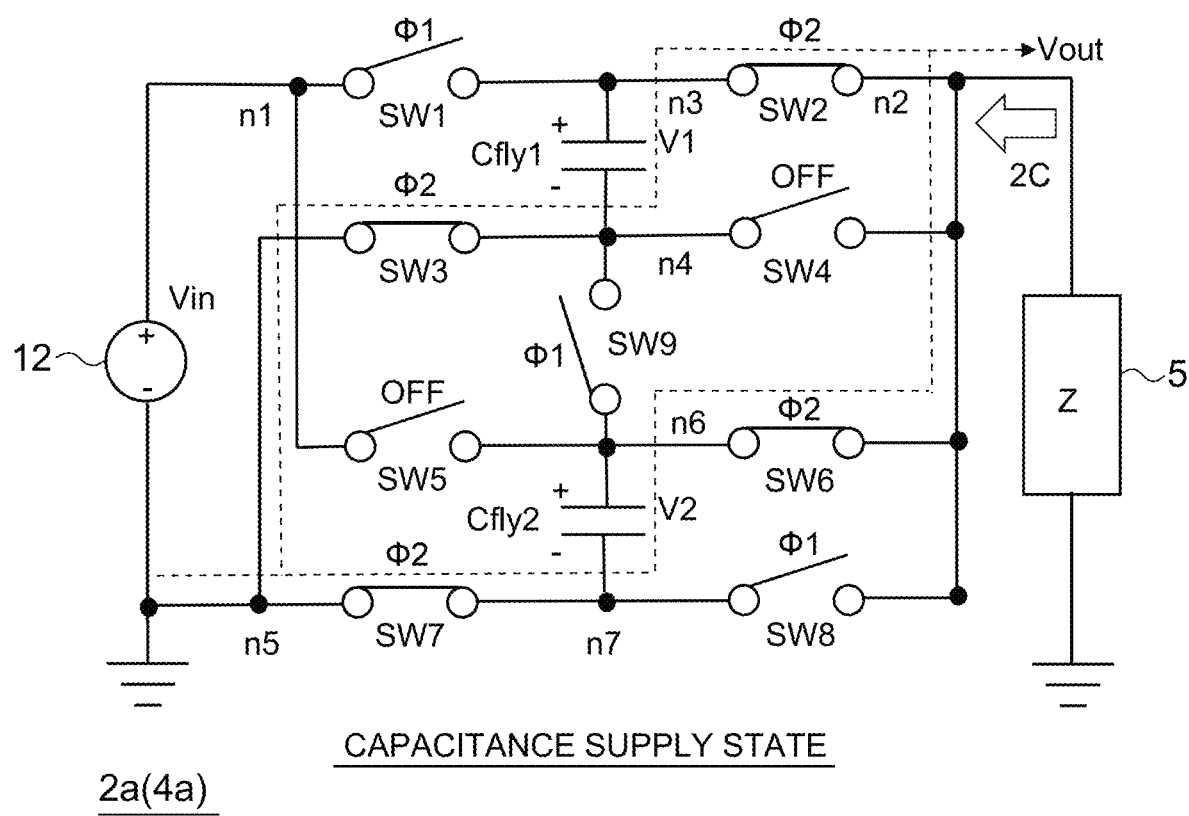
FIG. 15B is a circuit diagram illustrating an example of switching the capacitance supply state for generating an output voltage of Vin/3 from the SC-DCDCC of FIG. 13.

FIGS. 15A and 15B are circuit diagrams illustrating switching examples of the switches SW1 to SW9 for generating the output voltage Vout of Vin/3 using the SC-DCDCC 2a of FIG. 13. FIG. 15A is a circuit diagram in the power supply state, and FIG. 15B is a circuit diagram in the capacitance supply state. Even in FIGS. 15A and 15B, the control signals φ1 and φ2 corresponding to clock signals are used as in FIGS. 14A and 14B. In FIGS. 15A and 15B, the switches SW1, SW8, and SW9 are switch-controlled by the switch control signal φ1, the switches SW2, SW3, SW6, and SW7 are switch-controlled by the switch control signal φ2, and the switches SW4 and SW5 are in an off state.

In the power supply state of FIG. 15A, the switches SW1, SW8, and SW9 are turned on, and the switches SW2, SW3, SW6, and SW7 are turned off. In addition, the switches SW4 and SW5 remain off. As a result, the capacitors Cfly1 and Cfly2 are connected in series between the first node n1 to which the input voltage Vin is supplied and the second node n2 from which the output voltage Vout is output. When capacitances of the capacitors Cfly1 and Cfly2 are equal, and the voltage across each of the capacitors Cfly1 and Cfly2 is V(Cfly), the input voltage Vin is expressed by the following formula (7).

$$Vin=2V(Cfly)+Vout \quad (7)$$

In the capacitance supply state of FIG. 15B, the switches SW2, SW3, SW6, and SW7 are turned on, and the switches SW1, SW8, and SW9 are turned off. In addition, the switches SW4 and SW5 still remain off. As a result, the capacitors Cfly1 and Cfly2 are connected in parallel between the ground node n5 and the second node n2. Thus, in the capacitance supply state of FIG. 15B, the output voltage Vout is expressed by the above-described Formula (5).

When Formula (5) is substituted into V(Cfly) in Formula (7), the following Formula (8) is obtained.

$$Vout=Vin/3 \quad (8)$$

Since the capacitors Cfly1 and Cfly2 are connected in series between the first node n1 and the second node n2 in the power supply state of FIG. 15A, the capacitance on the output side as viewed from the second node n2 is C/2. Since the capacitors Cfly1 and Cfly2 are connected in parallel between the fifth node (ground node) n5 and the second node n2 in the capacitance supply state of FIG. 15B, the capacitance on the output side as viewed from the second node n2 is 2C.

In this manner, when the output voltage Vout=Vin/3 is output using the SC-DCDCC 2a, the capacitance on the output side as viewed from the second node n2 greatly changes between the power supply state and the capacitance supply state, and thus, there is a possibility that the ripple of the output voltage Vout increases. A countermeasure therefor will be described later.

Figure 16A:
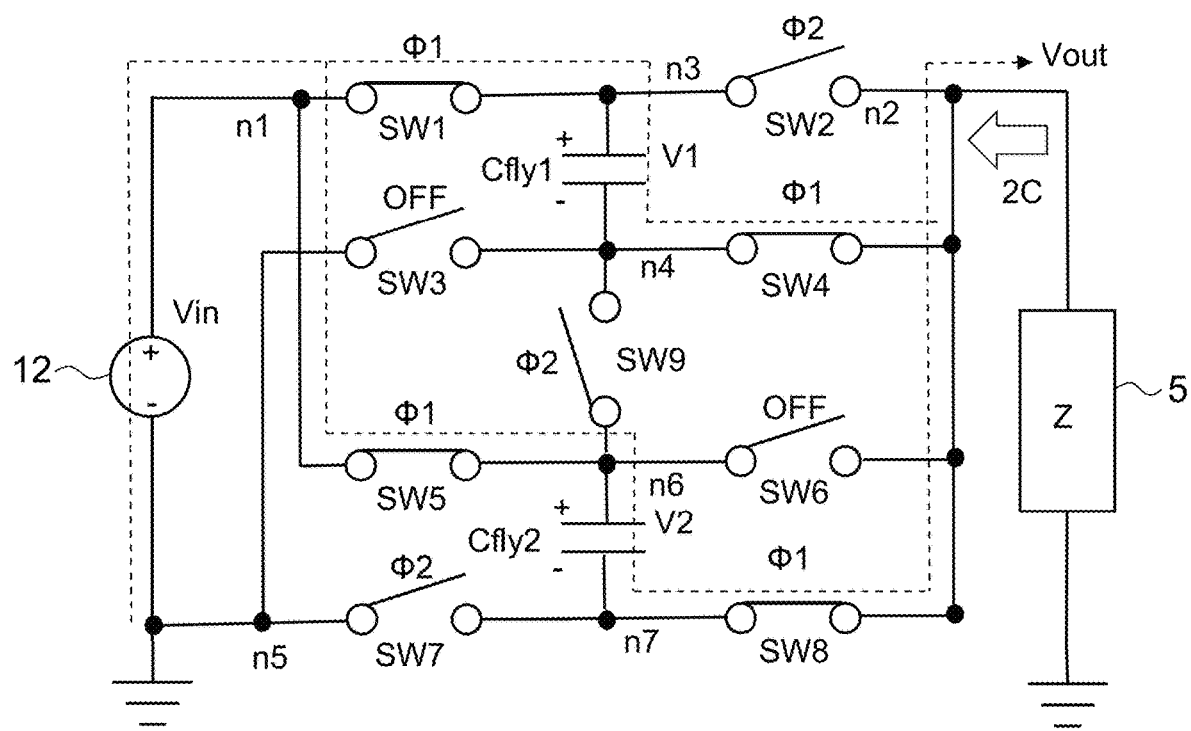
FIG. 16A is a circuit diagram illustrating an example of switching the power supply state for generating an output voltage of 2Vin/3 from the SC-DCDCC of FIG. 13.
Figure 16B:
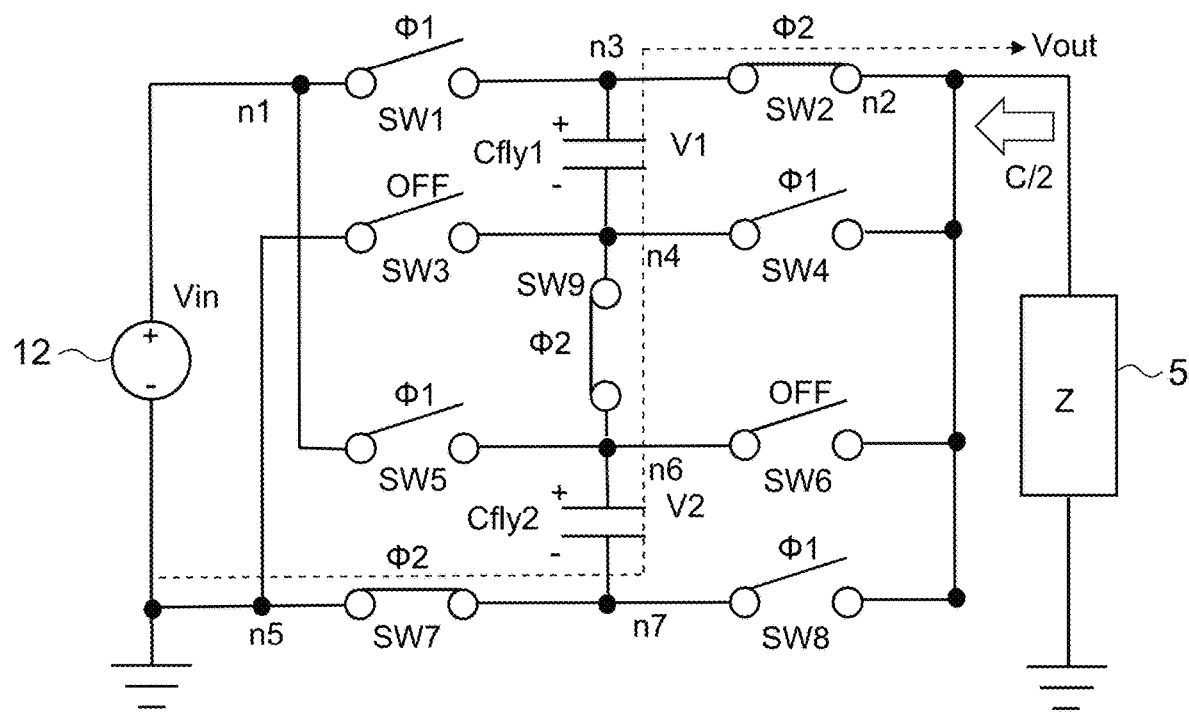
FIG. 16B is a circuit diagram illustrating an example of switching the capacitance supply state for generating an output voltage of 2Vin/3 from the SC-DCDCC of FIG. 13.

FIGS. 16A and 16B are circuit diagrams illustrating switching examples of the switches SW1 to SW9 for generating the output voltage Vout of 2Vin/3 using the SC-DCDCC 2a of FIG. 13. FIG. 16A is a circuit diagram in the power supply state, and FIG. 16B is a circuit diagram in the capacitance supply state. Even in FIGS. 16A and 16B, the control signals φ1 and φ2 corresponding to clock signals are similarly used. In FIGS. 16A and 16B, the switches SW1, SW4, SW5, and SW8 are switch-controlled by the switch control signal φ1, the switches SW2, SW7, and SW9 are switch-controlled by the switch control signal φ2, and the switches SW3 and SW6 are in an off state.

In the power supply state of FIG. 16A, the switches SW1, SW4, SW5, and SW8 are turned on, and the switches SW2, SW7, and SW9 are turned off. In addition, the switches SW3 and SW6 remain off. As a result, the capacitors Cfly1 and Cfly2 are connected in parallel between the first node n1 to which the input voltage Vin is supplied and the second node n2 from which the output voltage Vout is output. When the voltage across each of the capacitors Cfly1 and Cfly2 is V(Cfly), the input voltage Vin is expressed by the following formula (9).

$$Vin=V(Cfly)+Vout \quad (9)$$

In the capacitance supply state of FIG. 16B, the switches SW2, SW7, and SW9 are turned on, and the switches SW1, SW4, SW5, and SW8 are turned off. In addition, the switches SW3 and SW6 still remain off. As a result, the capacitors Cfly1 and Cfly2 are connected in series between the second node n2 and the ground node n5. The output voltage Vout is expressed by the following Formula (10).

$$Vout = 2V(Cfly) \qquad (10)$$

When Formula (9) is substituted into V(Cfly) in Formula (10), the following Formula (11) is obtained.

$$Vout = 2(Vin - Vout) \qquad (11)$$

When Formula (11) is modified, the following Formula (12) is obtained.

$$Vout = 2Vin/3 \qquad (12)$$

Since the capacitors Cfly1 and Cfly2 are connected in parallel between the first node n1 and the second node n2 in the power supply state of FIG. 16A, the capacitance on the output side as viewed from the second node n2 is 2C. Since the capacitors Cfly1 and Cfly2 are connected in series between the fifth node (ground node) n5 and the second node n2 in the capacitance supply state of FIG. 16B, the capacitance on the output side as viewed from the second node n2 is C/2.

In this manner, even when the output voltage 2Vin/3 is output using the SC-DCDCC 2a, the capacitance on the output side as viewed from the second node n2 greatly changes between the power supply state and the capacitance supply state, and thus, there is a possibility that the ripple of the output voltage Vout increases. A countermeasure therefor will be described later.

In this manner, the SC-DCDCC 2a of FIG. 13 can output any one of three types of output voltages Vout=Vin/2, Vin/3, and 2Vin/3 by individually controlling on and off of the switches SW1 to SW9.

Figure 17:
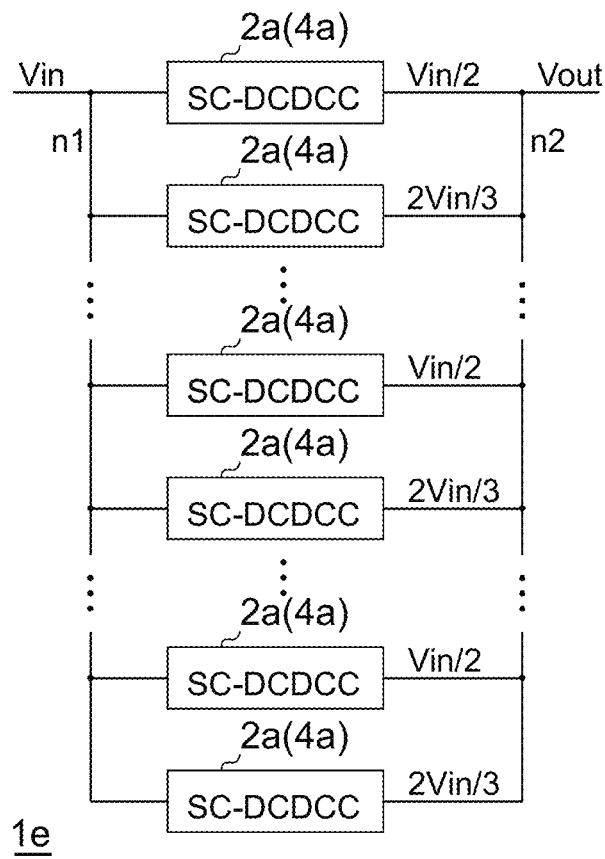
FIG. 17 is a schematic block diagram of a power supply circuit in which a plurality of SC-DCDCCs each having an internal configuration similar to that of FIG. 13 are connected in parallel between a first node and a second node.

FIG. 17 is a schematic block diagram of a power supply circuit 1e in which a plurality of SC-DCDCCs 2a each having an internal configuration similar to that of FIG. 13 are connected in parallel between the first node n1 and the second node n2. The number of SC-DCDCCs 2a connected in parallel is not particularly limited. Each of the plurality of SC-DCDCCs 2a connected in parallel can individually control on and off of the switches SW1 to SW9 in FIG. 13, and can output one of the three types of output voltages Vout=Vin/2, Vin/3, and 2Vin/3. Since output nodes of the plurality of SC-DCDCCs 2a are all connected to the second node n2, the output voltage Vout obtained by combining output voltages generated by the plurality of SC-DCDCCs 2a is output from the second node n2. In this manner, the unique output voltage can be output from the power supply circuit 1e by providing a control circuit (first control circuit) (not illustrated) that individually controls the plurality of SC-DCDCCs 2a.

Note that the analog LDOs 3a and 3b described in FIG. 3 and the like are omitted in FIG. 17, but the analog LDOs 3a and 3b may be connected in parallel to the plurality of SC-DCDCCs 2a.

FIG. 17 illustrates an example in which the SC-DCDCC 2a that outputs the output voltage Vin/2 and the SC-DCDCC 2a that outputs the output voltage 2Vin/3 are alternately arranged, but this is merely an example. By arbitrarily switching a ratio of the number of SC-DCDCCs 2a that output the three types of output voltages Vin/2, Vin/3, and 2Vin/3, it is possible to output the output voltage Vout at any voltage level between Vin/3 and 2Vin/3.

Figure 18:
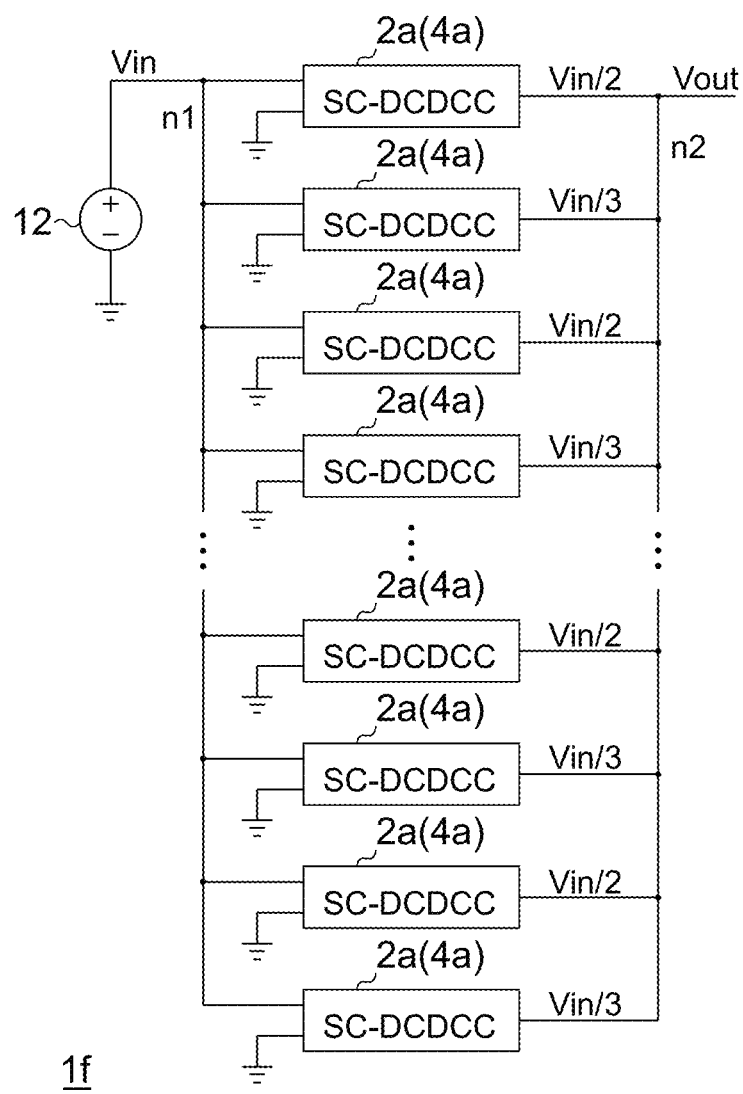
FIG. 18 is a block diagram of a power supply circuit having a parallel connection configuration including an SC-DCDCC that outputs an output voltage Vin/2 and an SC-DCDCC that outputs an output voltage Vin/3.

FIG. 18 is a block diagram of a power supply circuit 1f having a parallel connection configuration including the SC-DCDCC 2a that outputs the output voltage Vin/2 and the SC-DCDCC 2a that outputs the output voltage Vin/3. FIG. 18 illustrates an example in which the SC-DCDCC 2a that outputs the output voltage Vin/2 and the SC-DCDCC 2a that outputs the output voltage Vin/3 are alternately arranged, but a ratio between the number of the SC-DCDCCs 2a each outputting the output voltage Vin/2 and the number of the SC-DCDCCs 2a each outputting the output voltage Vin/3 can be arbitrarily adjusted. As a result, the output voltage Vout output from the power supply circuit 1f of FIG. 18 can be set to any voltage level between Vin/3 and Vin/2.

Figure 19A:
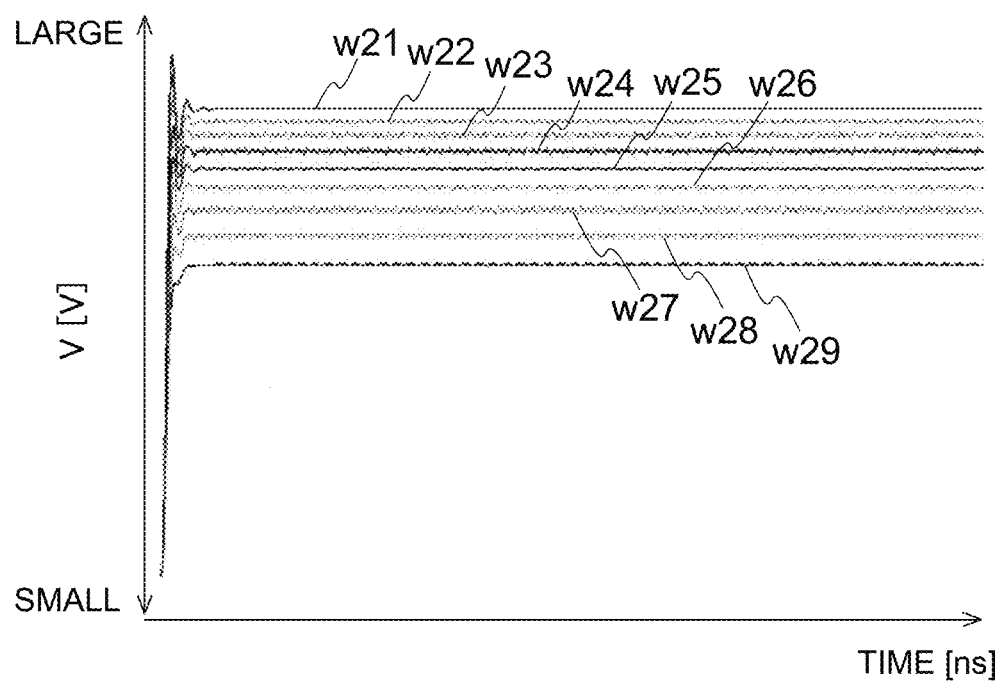
FIG. 19A is a voltage waveform diagram of an output voltage output from the power supply circuit of FIG. 18.
Figure 19B:
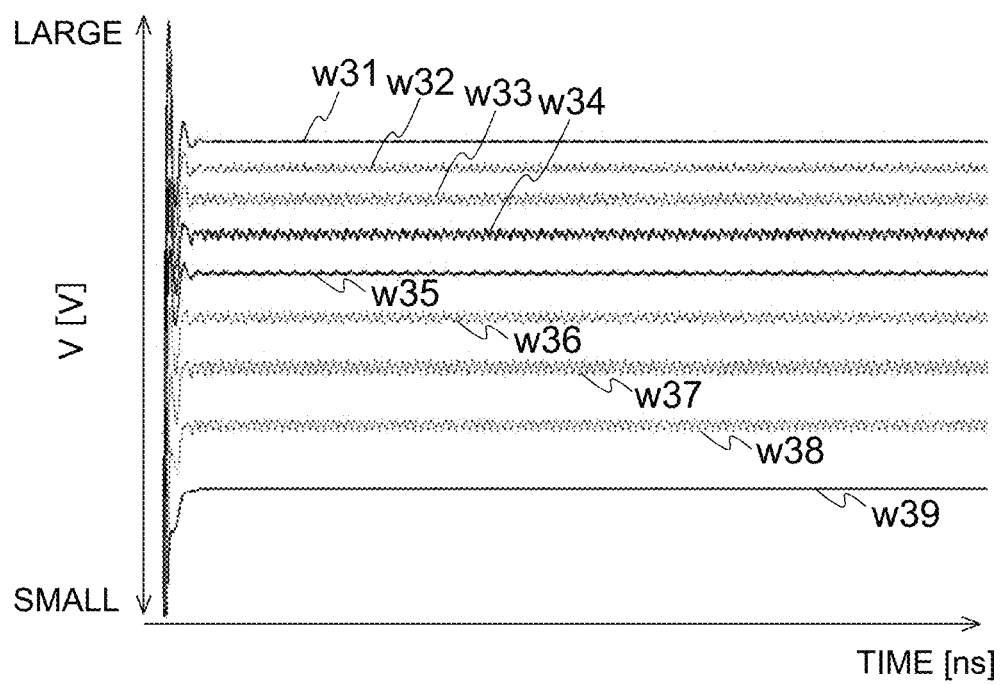
FIG. 19B is a diagram obtained by enlarging a part of the voltage waveform in FIG. 19A.

FIG. 19A is a voltage waveform diagram of the output voltage Vout output from the power supply circuit 1f of FIG. 18, and FIG. 19B is a diagram obtained by enlarging a part of the voltage waveform diagram of FIG. 19A. As illustrated in FIGS. 19A and 19B, the output voltage Vout output from the power supply circuit 1f of FIG. 18 can be set to a voltage level, which corresponds to the ratio, between Vin/3 and Vin/2 by arbitrarily switching the ratio between the number of the SC-DCDCCs 2a each outputting the output voltage Vin/2 and the number of the SC-DCDCCs 2a each outputting the output voltage Vin/3 in the power supply circuit 1f of FIG. 18. In FIG. 19A, a voltage waveform w21 is Vin/2, and a voltage waveform w29 is Vin/3. As the number of the SC-DCDCCs 2a each outputting Vin/3 increases, the voltage level of the output voltage Vout can be gradually lowered from a voltage waveform w22 to a voltage waveform w28. Waveforms w31 to w39 in FIG. 19B correspond to the waveforms w21 to w29 in FIG. 19A, the voltage waveform w31 is Vin/2, and the voltage waveform w39 is Vin/3. As the number of the SC-DCDCCs 2a each outputting Vin/3 increases, the voltage level of the output voltage Vout can be gradually lowered from the voltage waveform w32 to the voltage waveform w38.

Figure 20:
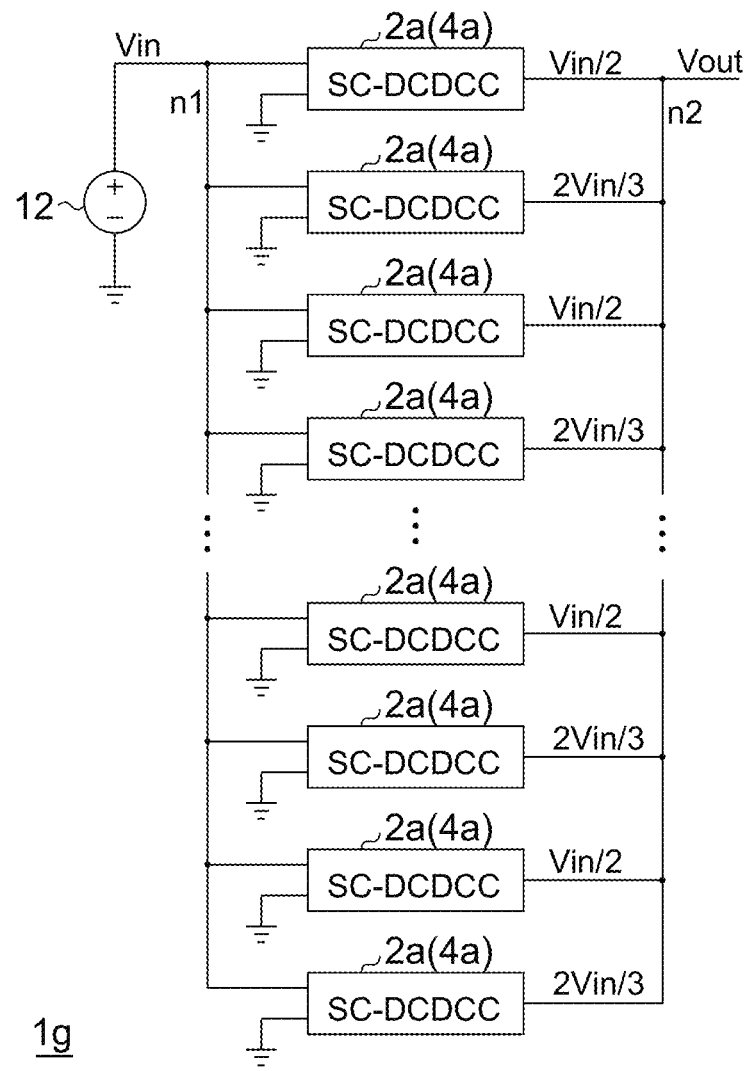
FIG. 20 is a block diagram of a power supply circuit having a parallel connection configuration including an SC-DCDCC that outputs an output voltage Vin/2 and an SC-DCDCC that outputs an output voltage 2Vin/3.

FIG. 20 is a block diagram of a power supply circuit 1g having a parallel connection configuration including the SC-DCDCC 2a that outputs the output voltage Vin/2 and the SC-DCDCC 2a that outputs the output voltage 2Vin/3. FIG. 20 illustrates an example in which the SC-DCDCC 2a that outputs the output voltage Vin/2 and the SC-DCDCC 2a that outputs the output voltage 2Vin/3 are alternately arranged, but a ratio between the number of the SC-DCDCCs 2a each outputting the output voltage Vin/2 and the number of the SC-DCDCCs 2a each outputting the output voltage 2Vin/3 can be arbitrarily adjusted. As a result, the output voltage Vout output from the power supply circuit 1g of FIG. 20 can be set to any voltage level between Vin/2 and 2Vin/3.

Figure 21A:
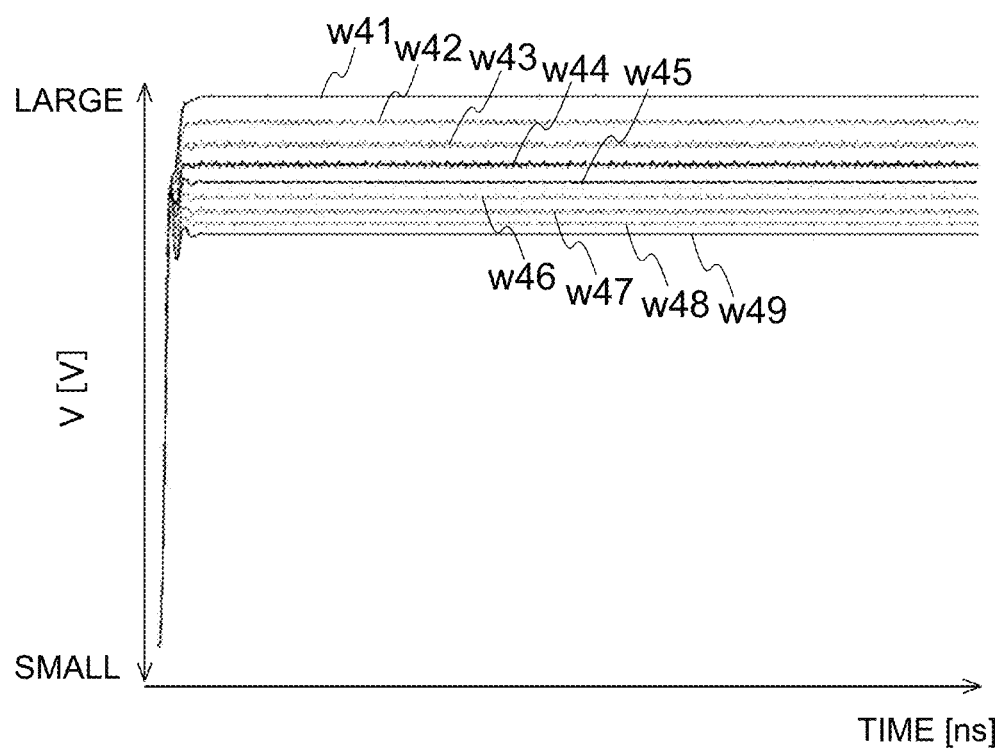
FIG. 21A is a voltage waveform diagram of an output voltage output from the power supply circuit of FIG. 20.
Figure 21B:
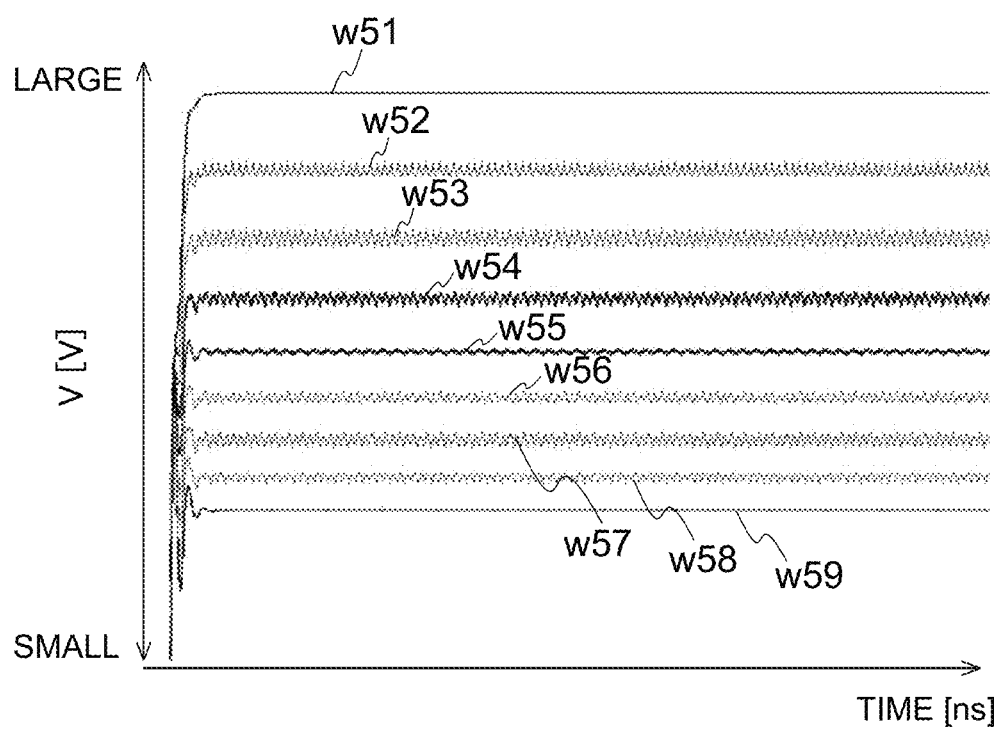
FIG. 21B is a diagram obtained by enlarging a part of the voltage waveform in FIG. 21A.

FIG. 21A is a voltage waveform diagram of the output voltage Vout output from the power supply circuit 1g of FIG. 20, and FIG. 21B is a diagram obtained by enlarging a part of the voltage waveform diagram of FIG. 21A. As illustrated in FIGS. 21A and 21B, the output voltage Vout output from the power supply circuit 1g of FIG. 20 can be set to a voltage level, which corresponds to the ratio, between Vin/2 and 2Vin/3 by arbitrarily switching the ratio between the number of the SC-DCDCCs 2a each outputting the output voltage Vin/2 and the number of the SC-DCDCCs 2a each outputting the output voltage 2Vin/3 in the power supply circuit 1g of FIG. 20. In FIG. 21A, a voltage waveform w41 is 2Vin/3, and a voltage waveform w49 is Vin/2. As the number of the SC-DCDCCs 2a each outputting Vin/2 increases, the voltage level of the output voltage Vout can be gradually lowered from a voltage waveform w42 to a voltage waveform w48. Waveforms w51 to w59 in FIG. 21B correspond to the waveforms w41 to w49 in FIG. 21A, the voltage waveform w51 is 2Vin/3, and the voltage waveform w59 is Vin/2. As the number of the SC-DCDCCs 2a each outputting Vin/2 increases, the voltage level of the output voltage Vout can be gradually lowered from the voltage waveform w52 to the voltage waveform w58.

In the power supply circuits 1e, 1f, and 1g of FIGS. 17, 18, and 20, an interleaving operation of slightly shifting the switching timing of the plurality of SC-DCDCCs 2a connected in parallel may be performed. As a result, the ripple of the output voltage Vout output from each of the SC-DCDCCs 2a can be suppressed as described above.

The power supply circuits 1e, 1f, and 1g according to the second embodiment described above can adopt the configuration in which the plurality of SC-DCDCCs 2a and the analog LDO 3a are connected in parallel between the first node n1 and the second node n2, similarly to the power supply circuits 1, 1a, 1b, 1c, and 1d according to the first embodiment. As illustrated in, for example, FIG. 17, 18, or 20, the power supply circuits 1e, 1f, and 1g according to the second embodiment include the plurality of SC-DCDCCs 2a connected in parallel between the first node n1 and the second node n2, and thus, the same effects as those of the first embodiment can be obtained by connecting the analog LDO 3a in parallel to these SC-DCDCCs 2a.

In this manner, the plurality of SC-DCDCCs 2a each outputting the output voltage Vout at any one of the plurality of types of voltage levels are connected in parallel between the first node n1 and the second node n2 in the power supply circuits 1e, 1f, and 1g according to the second embodiment. Therefore, the voltage level of the output voltage Vout output from the power supply circuit 1e, 1f, or 1g can be finely adjusted by changing the ratio of the number of the SC-DCDCCs 2a each outputting different output voltages Vout. According to the present embodiment, the voltage level of the output voltage Vout can be finely adjusted with a simple configuration in which the plurality of SC-DCDCCs 2a each having the same internal configuration are connected in parallel. In addition the voltage level is adjusted only by controlling on and off of the switches SW1 to SW9 in each of the SC-DCDCCs 2a, and the control is also easy.

Third Embodiment

The SC-DCDCC 2a of FIG. 13 includes the switched capacitor circuit 4a, and generates the output voltage Vout by alternately switching the power supply state and the capacitance supply state in synchronization with the clock signal. There is a problem that the ripple of the output voltage Vout increases as described above if the capacitance on the output side as viewed from the output node (second node n2) of the SC-DCDCC 2a changes at the time of switching to the power supply state or the capacitance supply state.

Figure 22A:
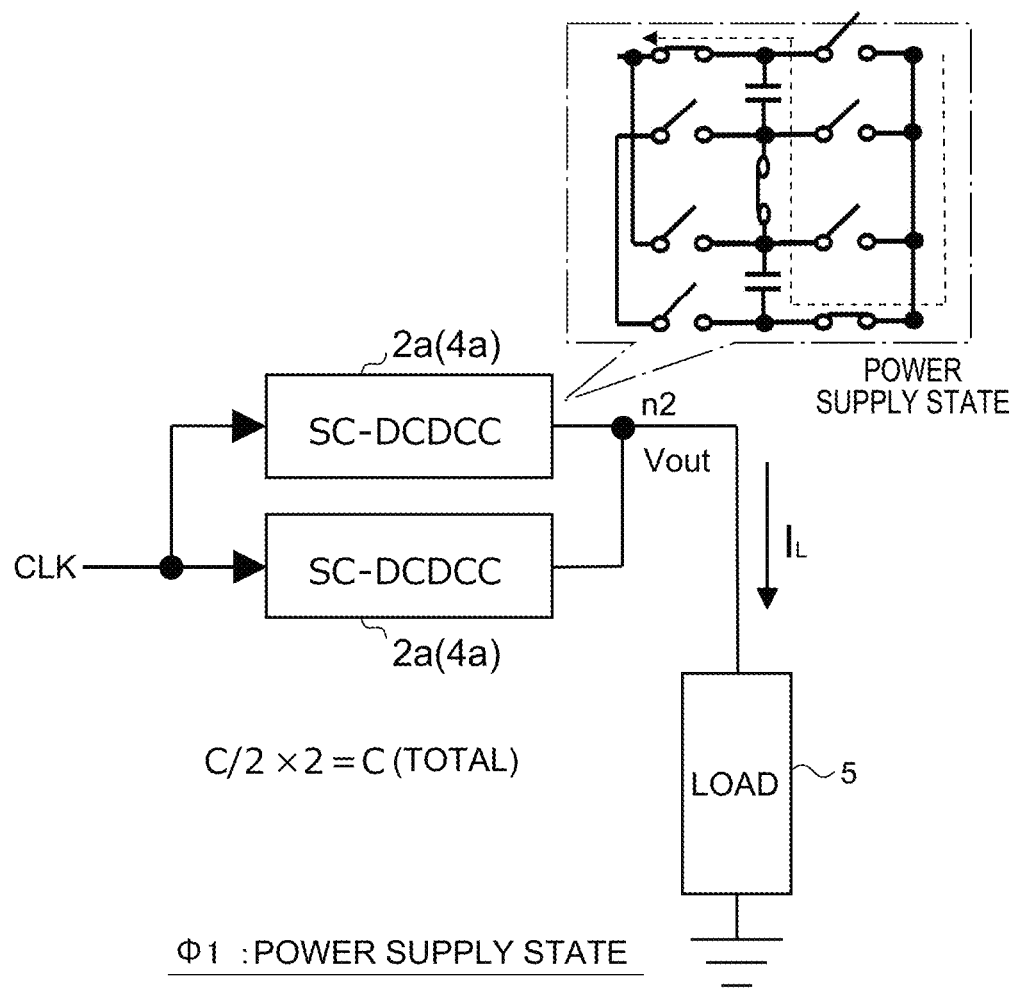
FIG. 22A is a diagram illustrating a capacitance on an output side as viewed from a second node in a power supply state of a power supply circuit in which two SC-DCDCCs each outputting an output voltage Vin/3 are connected in parallel.

FIG. 22A is a diagram illustrating a capacitance on an output side as viewed from a second node n2 in a power supply state in a power supply circuit 1h in which two SC-DCDCCs 2a each having a switched capacitor circuit 4a that outputs an output voltage Vin/3 are connected in parallel as illustrated in FIGS. 15A and 15B. In this case, capacitances of the respective switched capacitor circuits 4a are all C/2, and thus, the capacitance on the output side as viewed from the second node n2 in FIG. 22A is C/2+C/2=C.

Figure 22B:
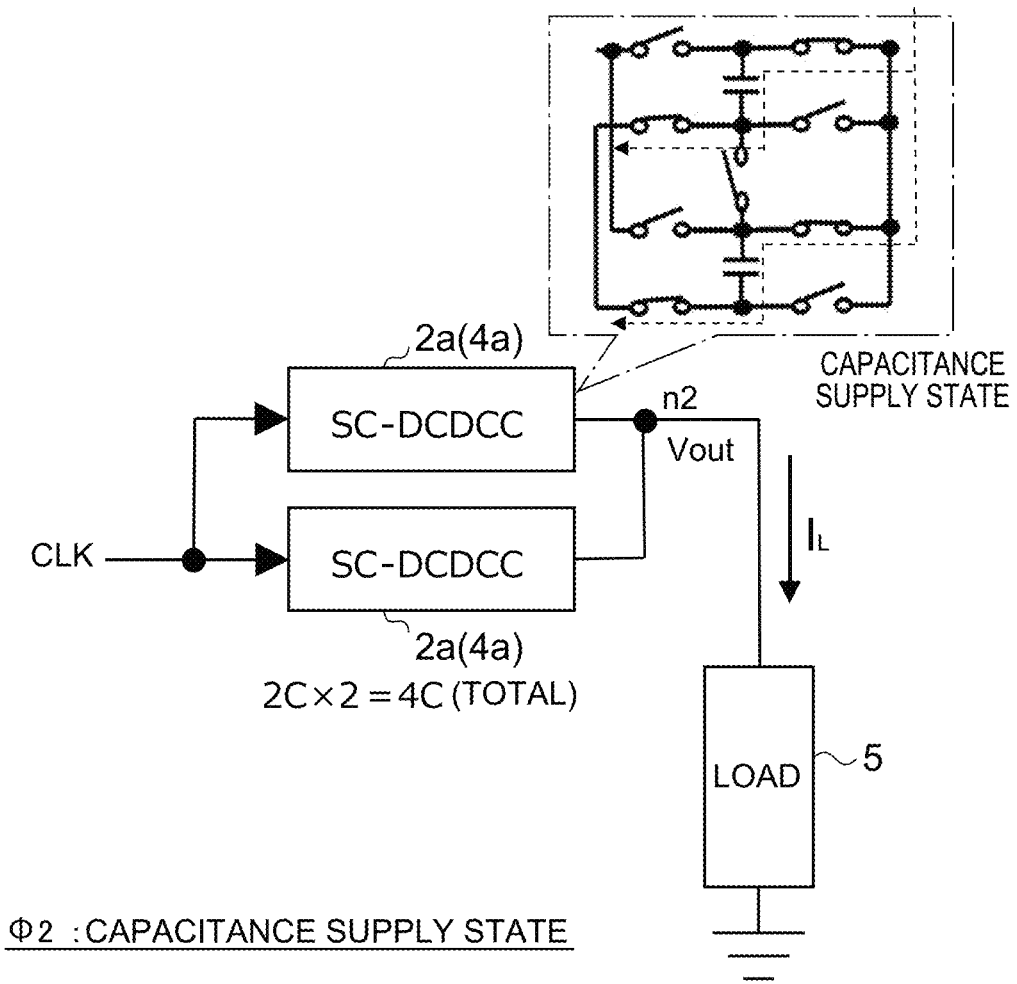
FIG. 22B is a diagram illustrating a capacitance on an output side as viewed from the second node in a capacitance supply state of the power supply circuit in which the two SC-DCDCCs each outputting the output voltage Vin/3 are connected in parallel.

FIG. 22B is a diagram illustrating the capacitance on the output side as viewed from the second node n2 in a capacitance supply state in the power supply circuit 1h in which the two switched capacitor circuits 4a each outputting the output voltage Vin/3 are connected in parallel. In this case, capacitances of the respective switched capacitor circuits 4a are all 2C, and thus, the capacitance on the output side as viewed from the second node n2 to which output nodes of the SC-DCDCC 2a are commonly connected is 2C+2C=4C.

In this manner, when the capacitance on the output side as viewed from the output node (second node n2) of the SC-DCDCC 2a greatly changes between the power supply state and the capacitance supply state, a ripple included in the output voltage Vout output from the second node n2 increases. Therefore, a power supply circuit 1i according to the third embodiment to be described below is characterized in that the capacitance on the output side as viewed from the second node n2 that outputs the DC output voltage Vout does not change between the power supply state and the capacitance supply state.

Figure 23A:
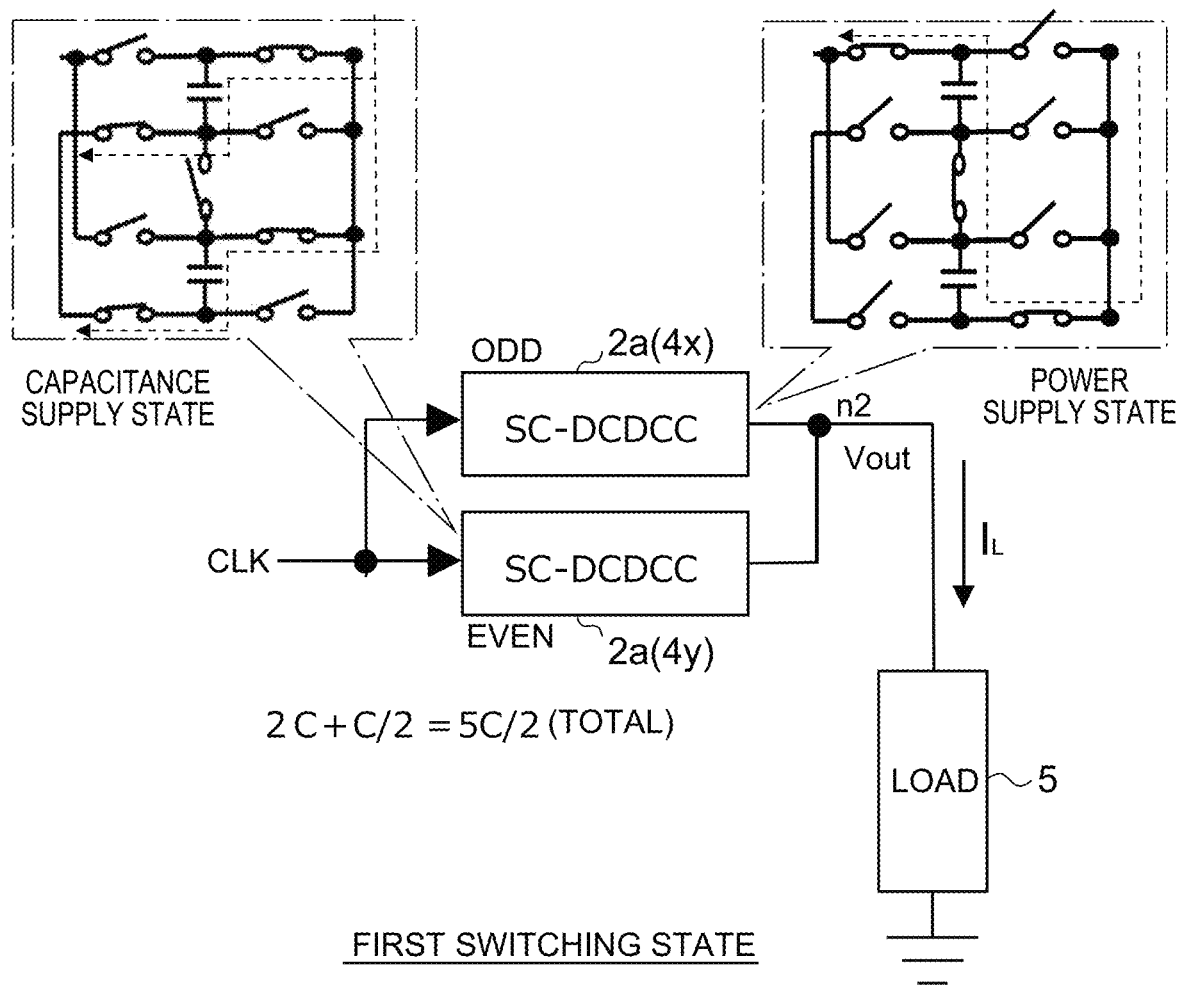
FIG. 23A is a block diagram of a first switching state of a first example of a power supply circuit according to a third embodiment.
Figure 23B:
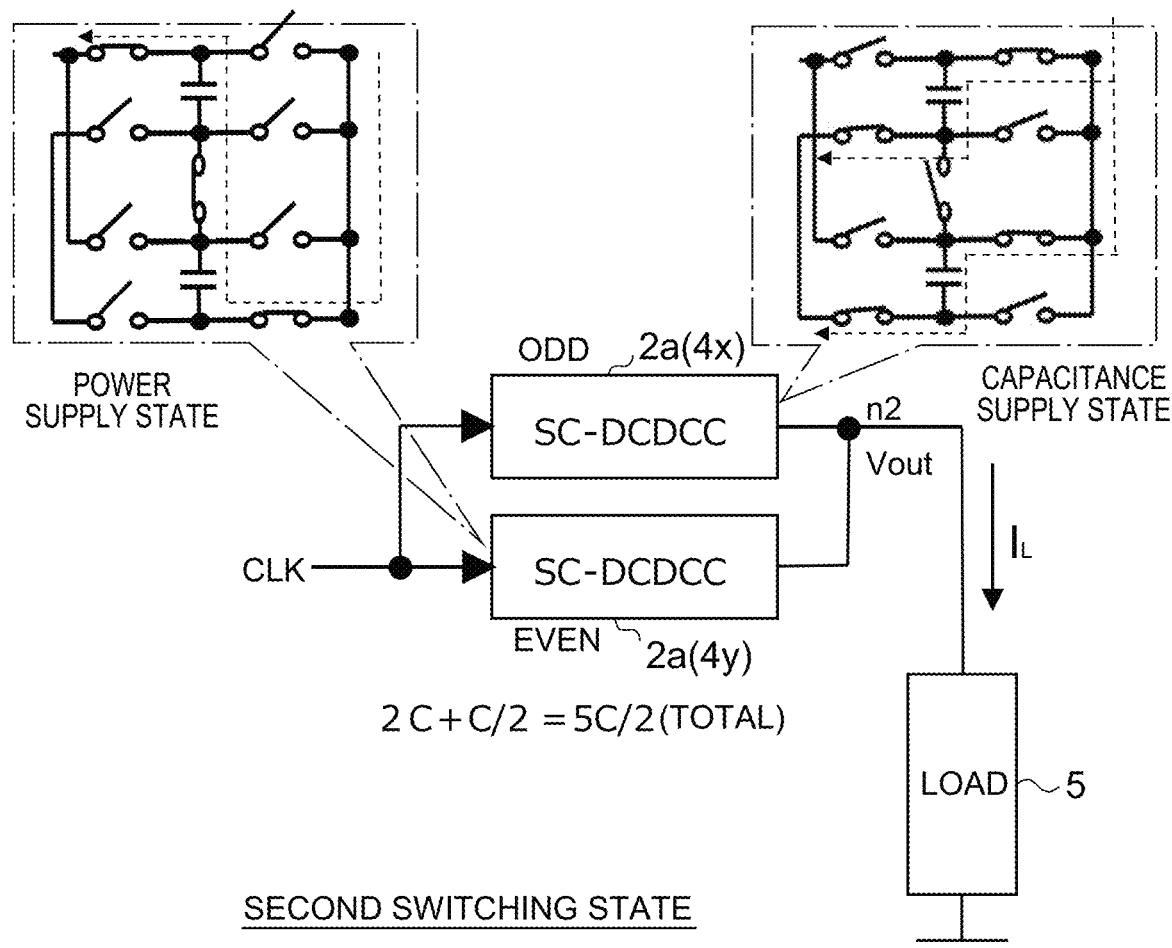
FIG. 23B is a block diagram of a second switching state of the first example of the power supply circuit according to the third embodiment.

FIGS. 23A and 23B are block diagrams of the power supply circuit 1i according to a first example of the third embodiment. FIG. 23A illustrates a first switching state, and FIG. 23B illustrates a second switching state. The power supply circuit 1i in FIGS. 23A and 23B includes two SC-DCDCCs (a first DC-DC converter circuit and a second DC-DC converter circuit) 2a. Both the two SC-DCDCCs 2a have a circuit configuration similar to that in FIG. 13, for example. One of the two SC-DCDCC 2a operates in the power supply state, and the other operates in the capacitance supply state. Here, one of switched capacitor circuits 4a included in each of the two SC-DCDCC 2a will be referred to as a switched capacitor circuit (first switched capacitor circuit) 4x, and the other will be referred to as a switched capacitor circuit (second switched capacitor circuit) 4y. A closed-loop control circuit 6 alternately repeats the first switching state in which capacitors (first capacitors) Cfly1 and Cfly2 in the switched capacitor circuit 4x are charged and capacitors (second capacitors) Cfly1 and Cfly2 in the switched capacitor circuit 4y are discharged and the second switching state in which the capacitors (second capacitors) Cfly1 and Cfly2 in the switched capacitor circuit 4y are charged and the capacitors (first capacitors) Cfly1 and Cfly2 in the switched capacitor circuit 4x are discharged. The closed-loop control circuit 6 performs switching control on the switched capacitor circuits 4x and 4y such that the capacitance on the second node n2 side in the first switching state is equal to the capacitance on the second node n2 side in the second switching state.

For example, in the first switching state of FIG. 23A, the switched capacitor circuit 4x operates in the power supply state, and the switched capacitor circuit 4y operates in the capacitance supply state. In the second switching state of FIG. 23B, switched capacitor circuit 4x operates in the capacitance supply state, and the switched capacitor circuit 4y operates in the power supply state. The capacitance on the output side as viewed from the second node n2 in the first switching state is 2C+C/2=5C/2. In addition, the capacitance on the output side as viewed from the second node n2 in the second switching state is 2C+C/2=5C/2.

In this manner, in the present embodiment, some of the plurality of switched capacitor circuits 4 connected in parallel are operated in the power supply state, and the others are operated in the capacitance supply state such that the capacitance on the output side as viewed from the second node n2 does not change even if the first switching state and the second switching state are switched. As a result, the ripple of the output voltage Vout can be suppressed.

Figure 24A:
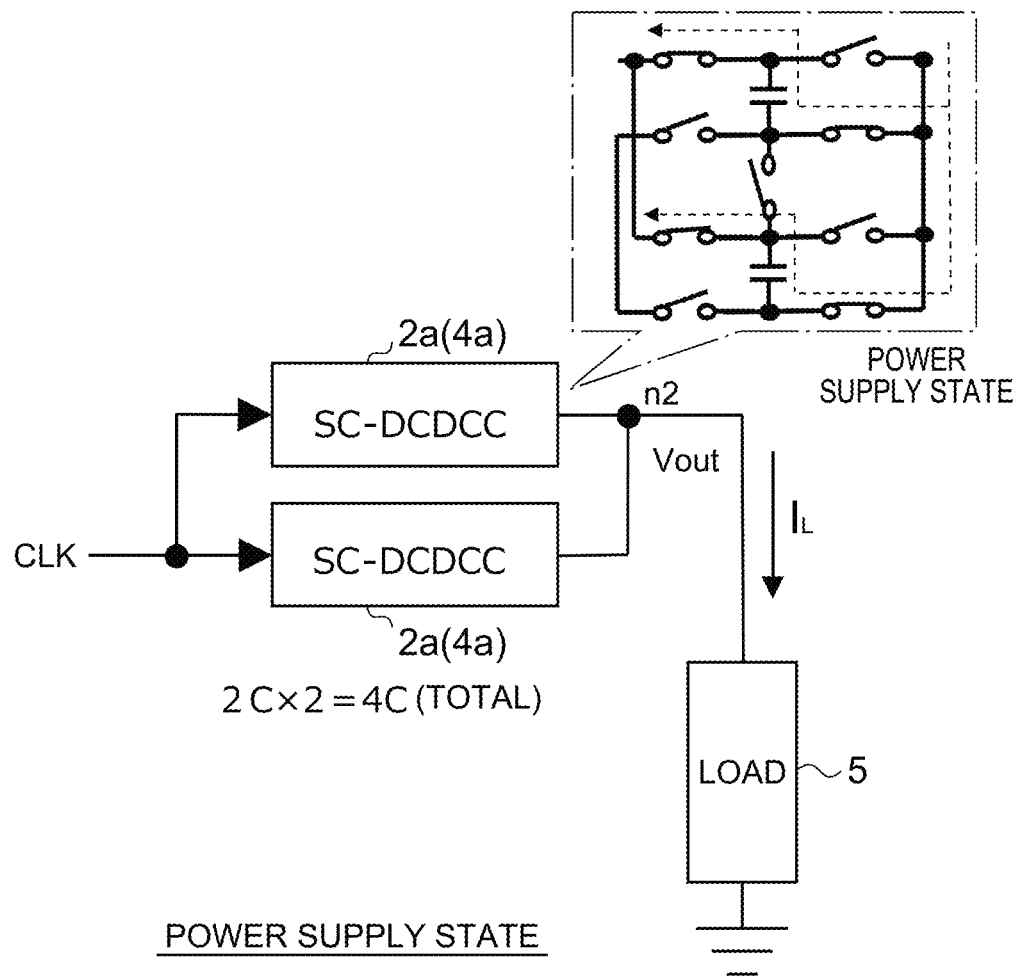
FIG. 24A is a diagram illustrating a capacitance on an output side as viewed from a second node in a power supply state of a power supply circuit in which two switched capacitor circuits each outputting an output voltage 2Vin/3 are connected in parallel.

FIG. 24A is a diagram illustrating the capacitance on the output side as viewed from the second node n2 in a power supply state of a power supply circuit 1j in which two switched capacitor circuits 4a each outputting an output voltage 2Vin/3 are connected in parallel as illustrated in FIGS. 16A and 16B. In this case, capacitances of the respective switched capacitor circuits 4a are all 2C, and thus, the capacitance on the output side of the SC-DCDCC 2a as viewed from the second node n2 is 2C+2C=4C.

Figure 24B:
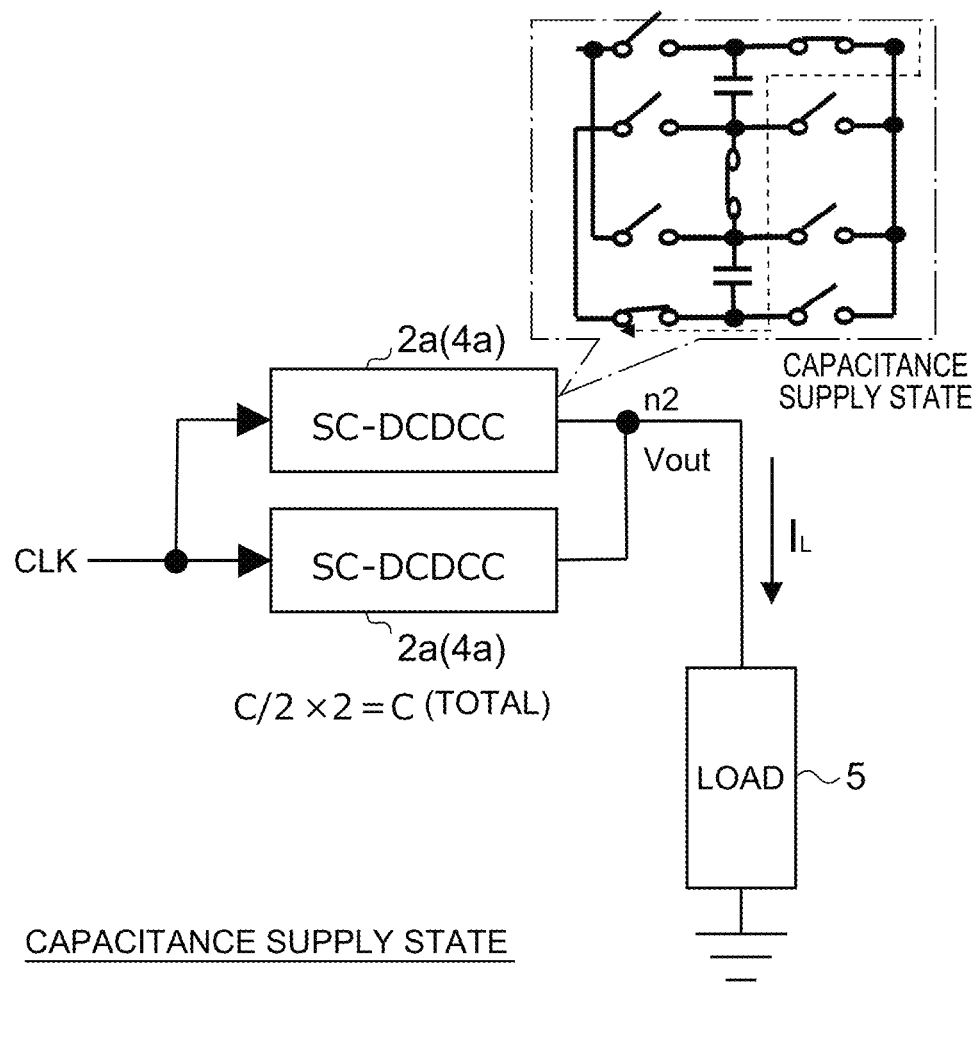
FIG. 24B is a diagram illustrating a capacitance on an output side as viewed from the second node in a capacitance supply state of the power supply circuit in which the two switched capacitor circuits each outputting the output voltage 2Vin/3 are connected in parallel.

FIG. 24B is a diagram illustrating the capacitance on the output side as viewed from the second node n2 in a capacitance supply state in the power supply circuit 1j in which the two switched capacitor circuits 4a each outputting the output voltage 2Vin/3 are connected in parallel. In this case, capacitances of the respective switched capacitor circuits 4a are all C/2, and thus, the capacitance on the output side of the SC-DCDCC 2a as viewed from the second node n2 is C/2+C/2=C.

In this manner, the capacitance on the output side as viewed from the second node n2 is greatly different between the power supply state and the capacitance supply state in the SC-DCDCC 2a that outputs the output voltage 2Vin/3 illustrated in FIGS. 24A and 24B, and thus, the ripple occurs in the output voltage Vout.

Figure 25A:
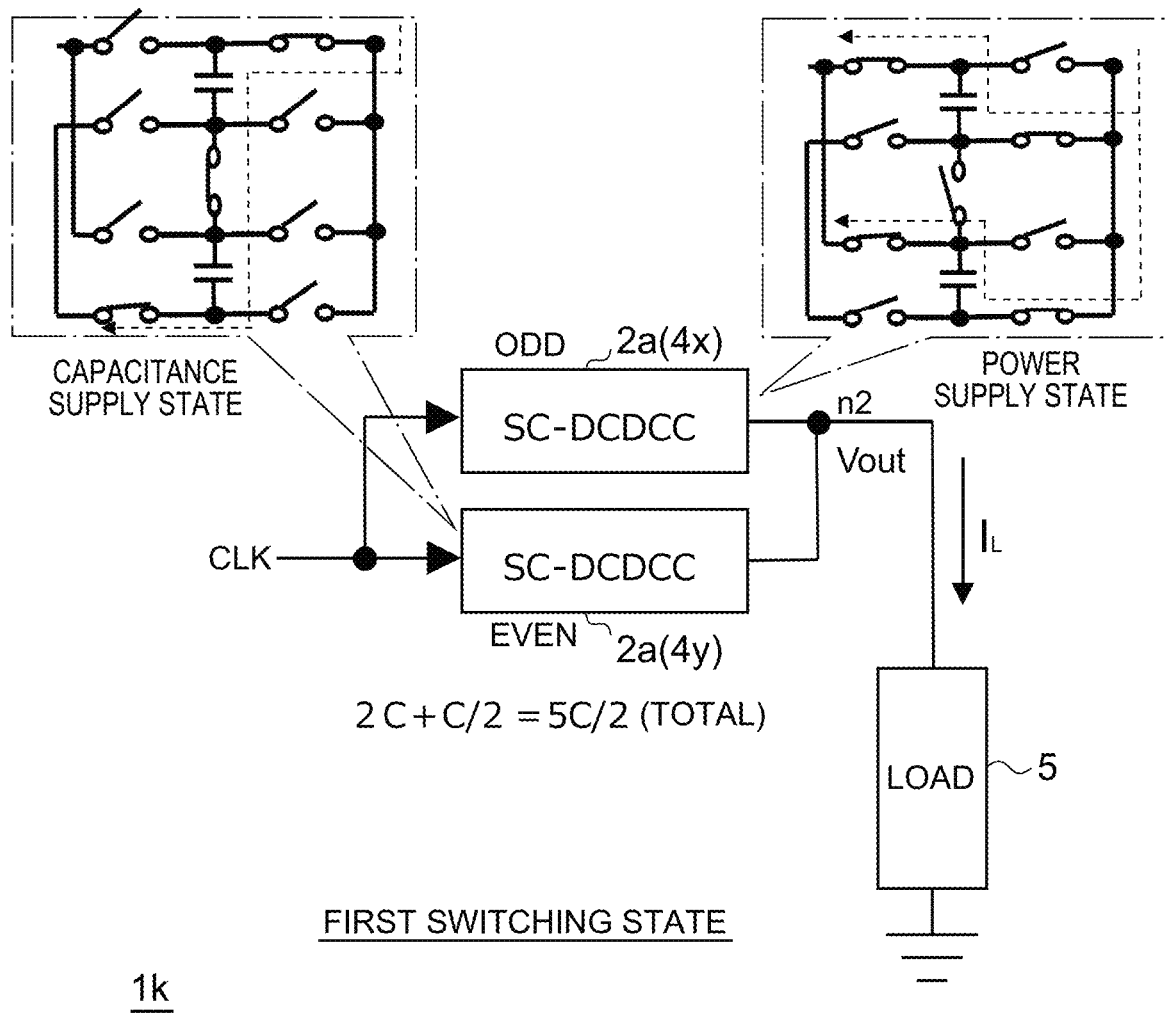
FIG. 25A is a block diagram of a first switching state of a second example of the power supply circuit according to the third embodiment.
Figure 25B:
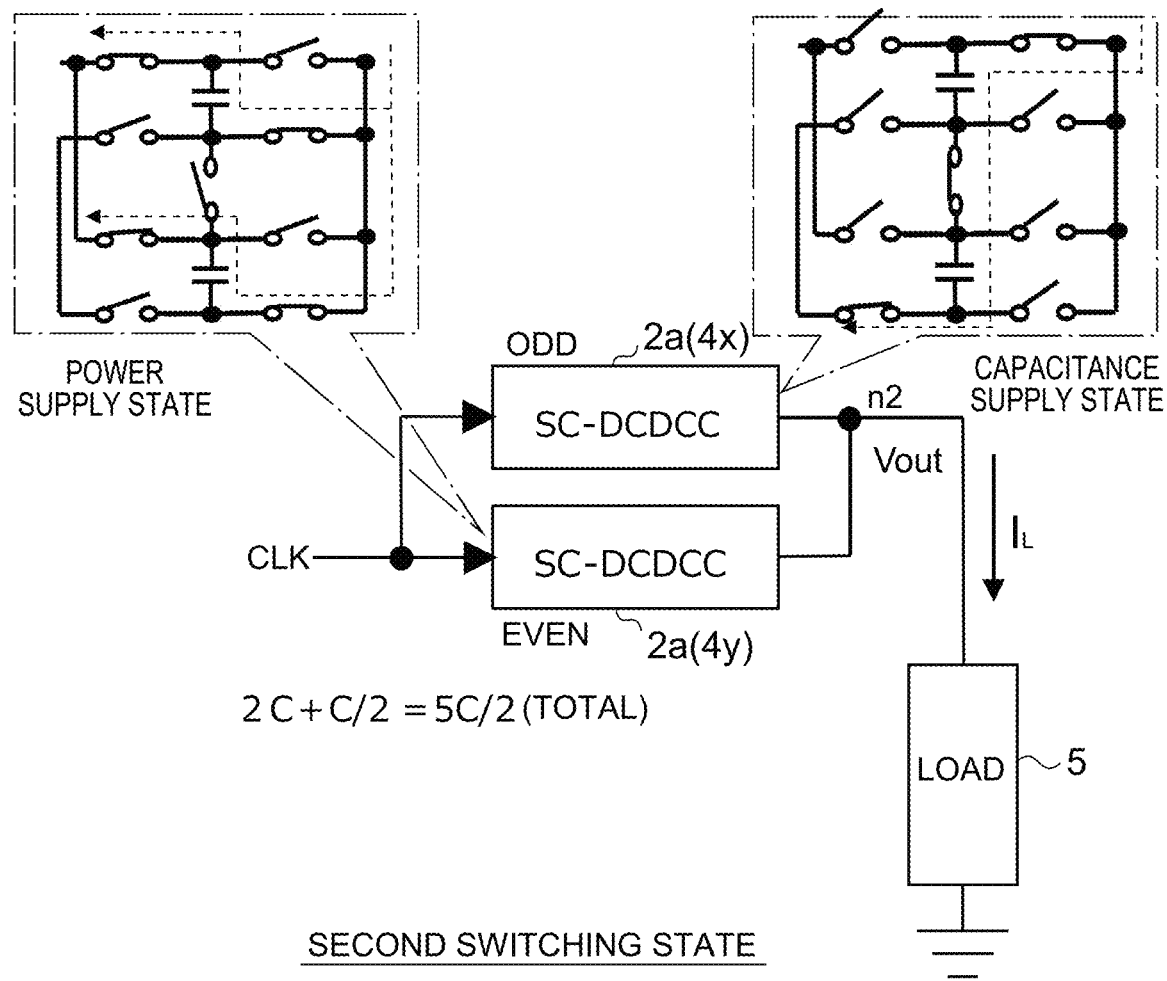
FIG. 25B is a block diagram of a second switching state of the second example of the power supply circuit according to the third embodiment.

FIGS. 25A and 25B are block diagrams of a power supply circuit 1k according to a second example of the third embodiment. FIG. 25A illustrates the first switching state, and FIG. 25B illustrates the second switching state. The power supply circuit 1k in FIGS. 25A and 25B includes two SC-DCDCCs 2a. That is, the power supply circuit 1k in FIGS. 25A and 25B includes the switched capacitor circuit 4x and the switched capacitor circuit 4y connected in parallel between the first node n1 to which the input voltage Vin is supplied and the second node n2 from which the output voltage Vout is output. One of the switched capacitor circuit 4x and the switched capacitor circuit 4y connected in parallel operates in the power supply state, and the other operates in the capacitance supply state. Even in the power supply circuit 1k of FIGS. 25A and 25B, the capacitance on the output side as viewed from the second node n2 can be made equal between the first switching state and the second switching state, similarly to the power supply circuit 1i of FIGS. 23A and 23B.

Note that the switched capacitor circuits 4x and 4y in FIGS. 23A and 23B and the switched capacitor circuits 4x and 4y in FIGS. 25A and 25B periodically switch between the first switching state and the second switching state in synchronization with a clock signal. For example, the switched capacitor circuit 4a (4x or 4y) operates in the first switching state when the clock signal is at a first logic, and operates in the second switching state when the clock signal is at a second logic different from the first logic.

Figure 26:
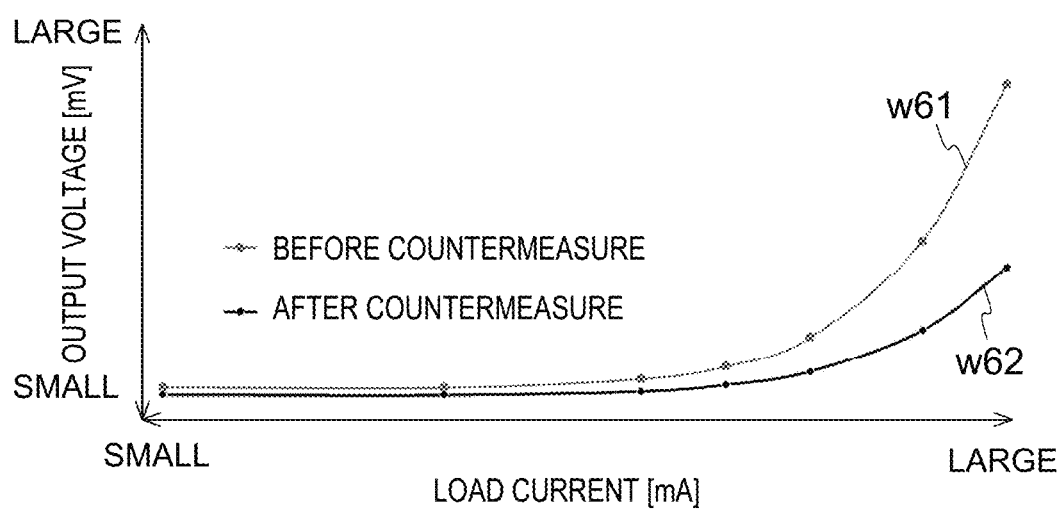
FIG. 26 is a diagram illustrating a ripple of an output voltage output from the second node in FIGS. 24A and 24B and a ripple of an output voltage output from the power supply circuit in FIGS. 25A and 25B.

FIG. 26 is a diagram illustrating a ripple component of the output voltage Vout output from the second node n2 of the power supply circuit 1j in FIGS. 24A and 24B and a ripple component of the output voltage Vout output from the second node n2 of the power supply circuit 1k in FIGS. 25A and 25B. A waveform w61 in FIG. 26 illustrates the ripple component of the output voltage Vout output from the power supply circuit 1j in FIGS. 24A and 24B, and a waveform w62 illustrates the ripple component of the output voltage Vout output from the power supply circuit 1k in FIGS. 25A and 25B. As can be seen by comparing the waveforms w61 and w62, the power supply circuit 1k in FIGS. 25A and 25B can significantly suppress the ripple component of the output voltage Vout as compared with the power supply circuit 1j in FIGS. 24A and 24B.

Figure 27A:
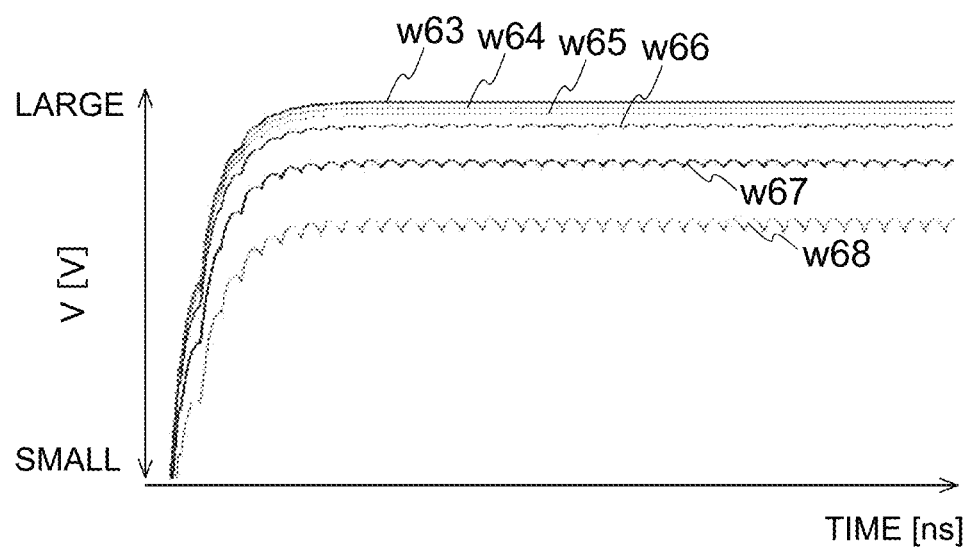
FIG. 27A is a diagram illustrating a waveform of the output voltage output from the power supply circuit according to FIGS. 25A and 25B.
Figure 27B:
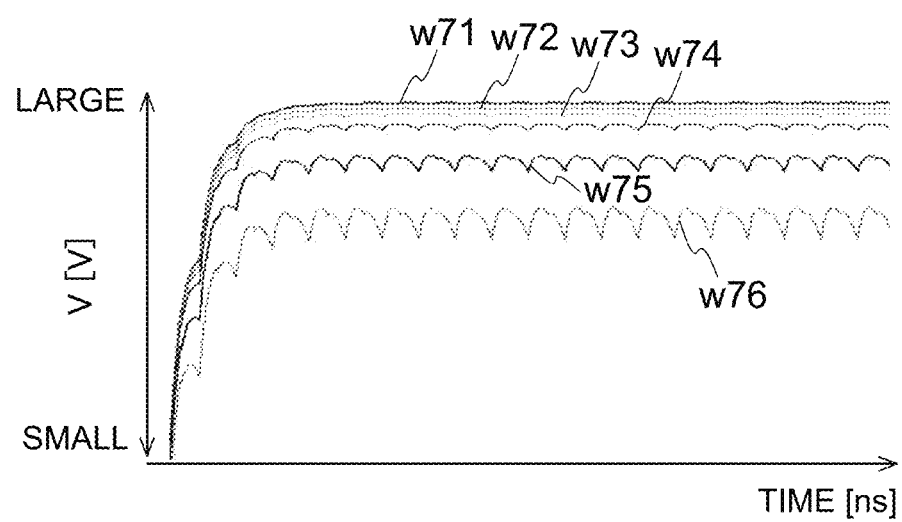
FIG. 27B is a diagram illustrating a waveform of the output voltage output from the power supply circuit according to FIGS. 24A and 24B.

FIG. 27A is a diagram illustrating a waveform of the output voltage Vout output from the power supply circuit 1k in FIGS. 25A and 25B, and FIG. 27B is a diagram illustrating a waveform of the output voltage Vout output from the power supply circuit 1j in FIGS. 24A and 24B. A vertical axis in FIG. 27A and a vertical axis in FIG. 27B both indicate voltages, and indicate the same voltage range.

Waveforms w63 to w68 in FIG. 27A illustrate voltage waveforms corresponding to a case where a load current of the output voltage Vout output from the power supply circuit 1k is changed in six ways. Similarly, waveforms w71 to w76 in FIG. 27B illustrate voltage waveforms corresponding to a case where a load current of the output voltage Vout output from the power supply circuit 1j is changed in six ways.

As can be seen by comparing the waveforms w63 to w68 in FIG. 27A and the waveforms w71 to w76 in FIG. 27B, the output voltage Vout output from the power supply circuit 1k in FIGS. 25A and 25B has less voltage variation than that of the output voltage Vout output from the power supply circuit 1j in FIGS. 24A and 24B.

Although the example in which one of the two switched capacitor circuits 4a (4x and 4y) in each of the power supply circuits 1i and 1k is operated in the power supply state and the other is operated in the capacitance supply state has been described above, three or more switched capacitor circuits 4a may be provided in each of the power supply circuits 1i and 1k. In this case, the capacitance on the output side as viewed from the second node n2 is made equal between the first switching state and the second switching state. Specifically, the switched capacitor circuit 4a that operates in the power supply state and the switched capacitor circuit 4a that operates in the capacitance supply state in the first switching state are provided, and each of the switched capacitor circuits 4a is in a state opposite to that in the first switching state in the second switching state.

In addition, the plurality of switched capacitor circuits 4a in each of the power supply circuits 1i and 1k according to the present embodiment may perform an interleaving operation in order to suppress the ripple of the output voltage Vout.

Figure 28A:
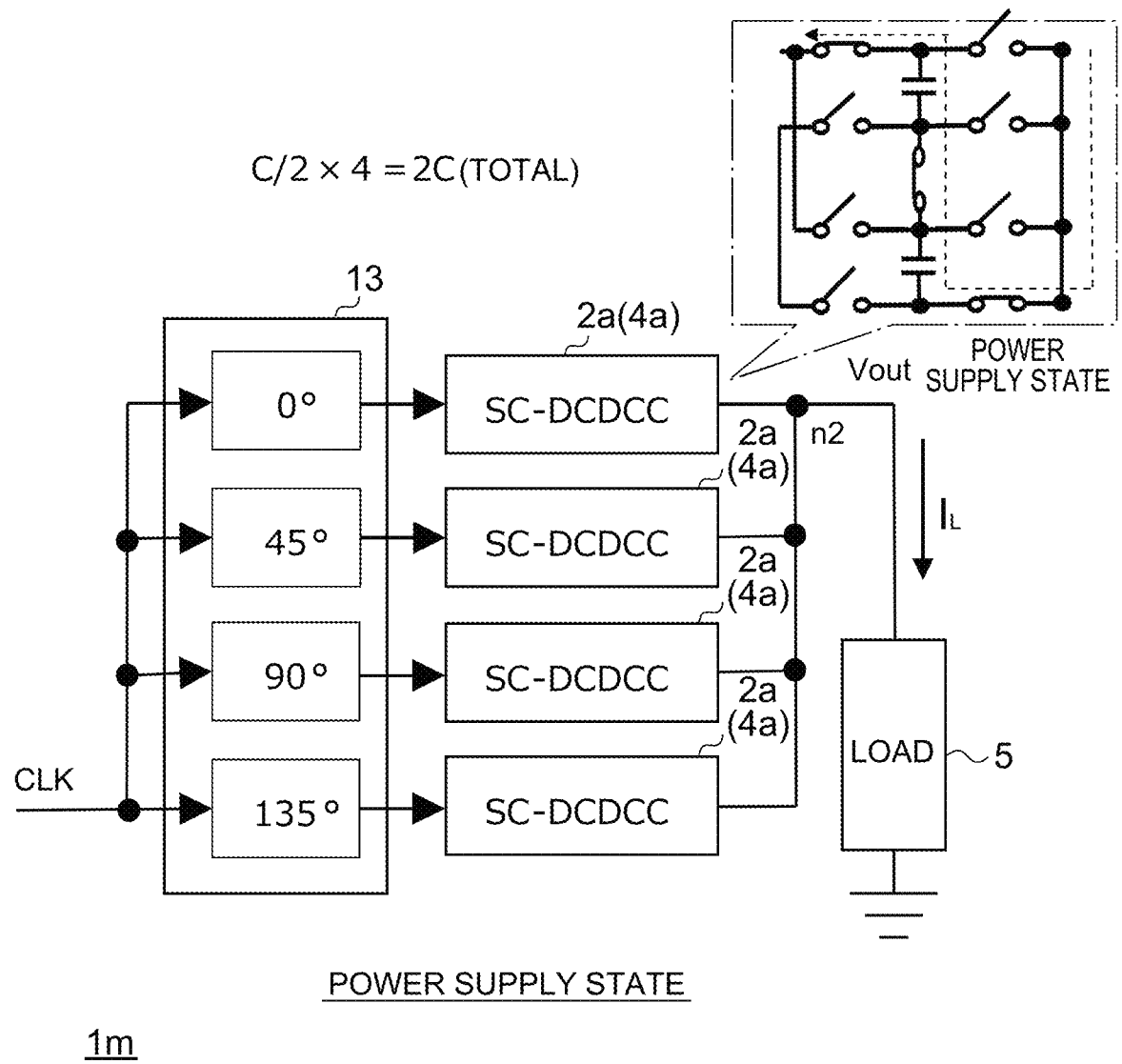
FIG. 28A is a block diagram of a power supply state of a power supply circuit including four SC-DCDCCs that perform an interleaving operation.
Figure 28B:
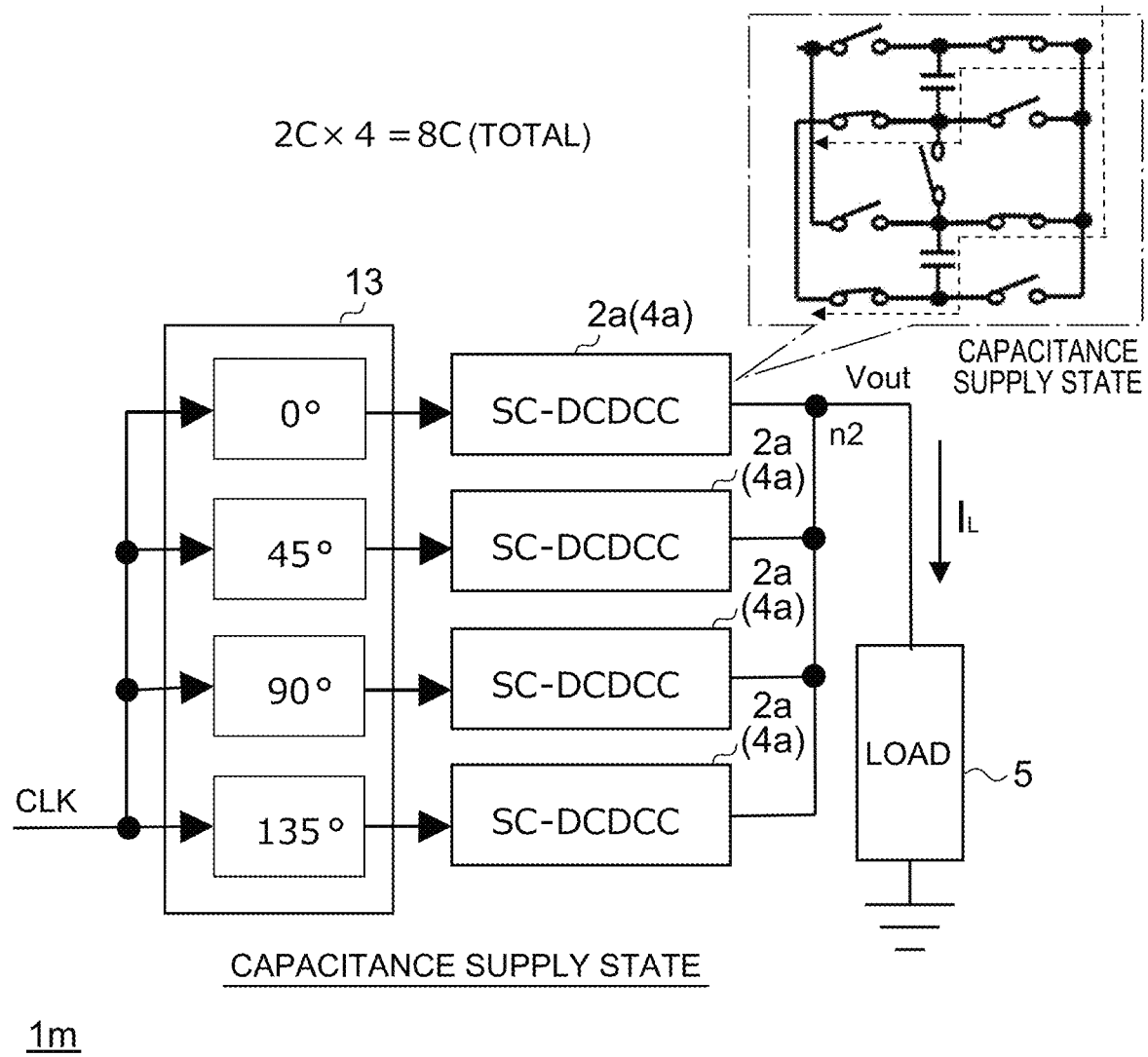
FIG. 28B is a block diagram of a capacitance supply state of the power supply circuit including the four SC-DCDCCs that perform the interleaving operation.

FIGS. 28A and 28B are block diagrams of a power supply circuit 1m including four SC-DCDCCs 2a that perform an interleaving operation. Each of the SC-DCDCCs 2a includes the switched capacitor circuit 4a having a circuit configuration similar to that of FIG. 13. FIGS. 28A and 28B illustrate an example in which the four switched capacitor circuits 4a in the power supply circuit 1m enter the power supply state or the capacitance supply state in synchronization. FIG. 28A illustrates the power supply state, and FIG. 28B illustrates the capacitance supply state. The four switched capacitor circuits 4a in the power supply circuit 1m of FIGS. 28A and 28B switch switches SW1 to SW9 as in FIGS. 15A and 15B, for example, and can output the output voltage Vout of Vin/3. A clock generation circuit 13 that generates four clock signals whose phases are sequentially shifted by 45° is connected to the four switched capacitor circuits 4a in FIGS. 28A and 28B. A clock signal of a corresponding phase is input to each of the switched capacitor circuits 4a. Each of the switched capacitor circuits 4a alternately switches between the power supply state and the capacitance supply state in synchronization with the clock signal input to each of the switched capacitor circuits 4a.

In the power supply state of FIG. 28A, the capacitance on the output side as viewed from the second node n2 is C/2×4=2C. In the capacitance supply state of FIG. 28B, the capacitance on the output side as viewed from the second node n2 is 2C×4=8C.

As illustrated in FIGS. 28A and 28B, even if all the switched capacitor circuits 4a in the power supply circuit 1m enter the power supply state or the capacitance supply state in synchronization while performing the interleaving operation, a large difference occurs in the capacitance on the output side as viewed from the second node n2 between the power supply state and the capacitance supply state, and the ripple occurs in the output voltage Vout.

Therefore, it is conceivable to operate the plurality of switched capacitor circuits 4a in the power supply circuit 1m to be alternately switched to the first switching state or the second switching state as in FIGS. 23A and 23B.

Figure 29A:
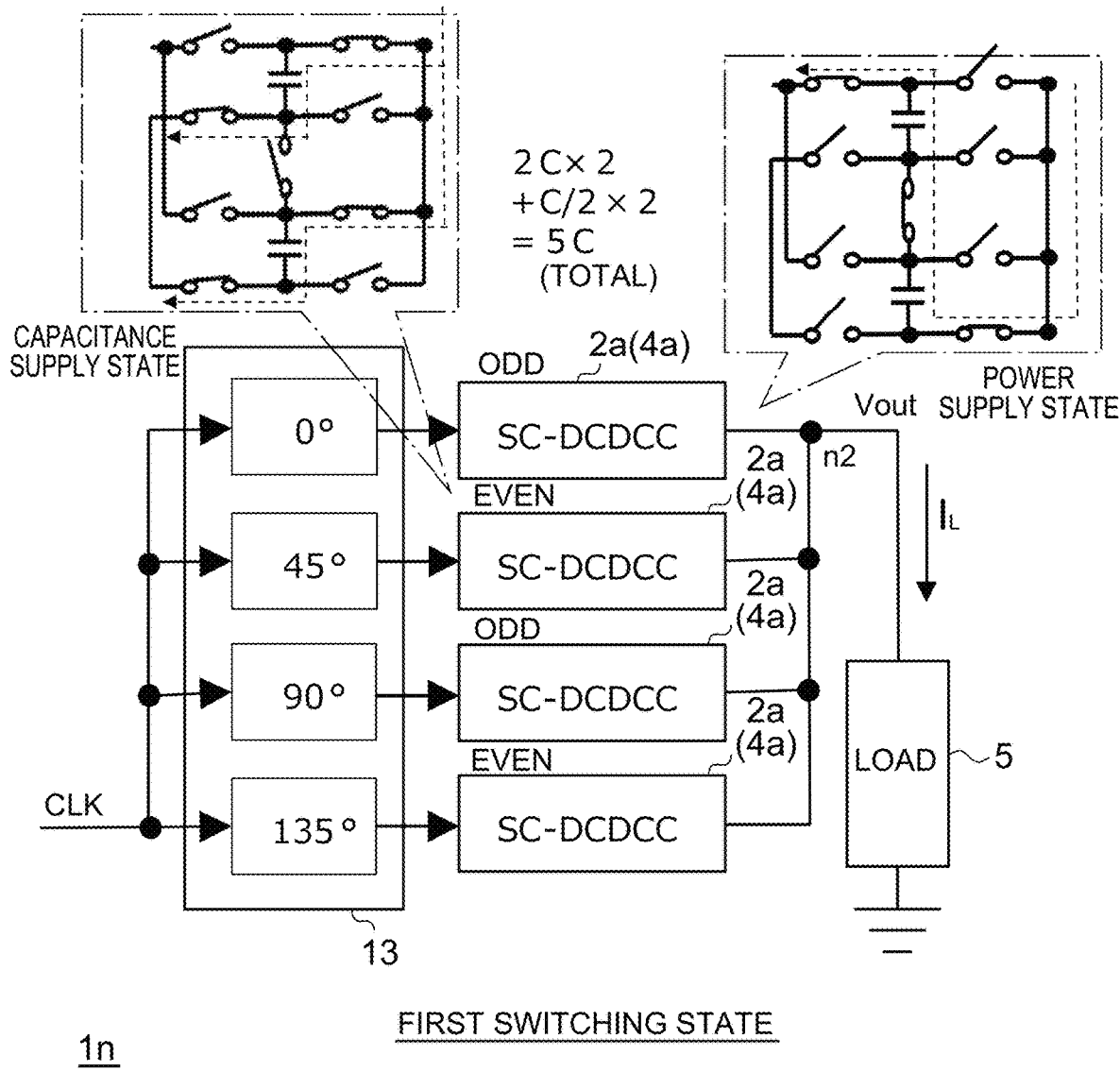
FIG. 29A is a diagram illustrating an example in which four switched capacitor circuits in a power supply circuit are operated in a first switching state.
Figure 29B:
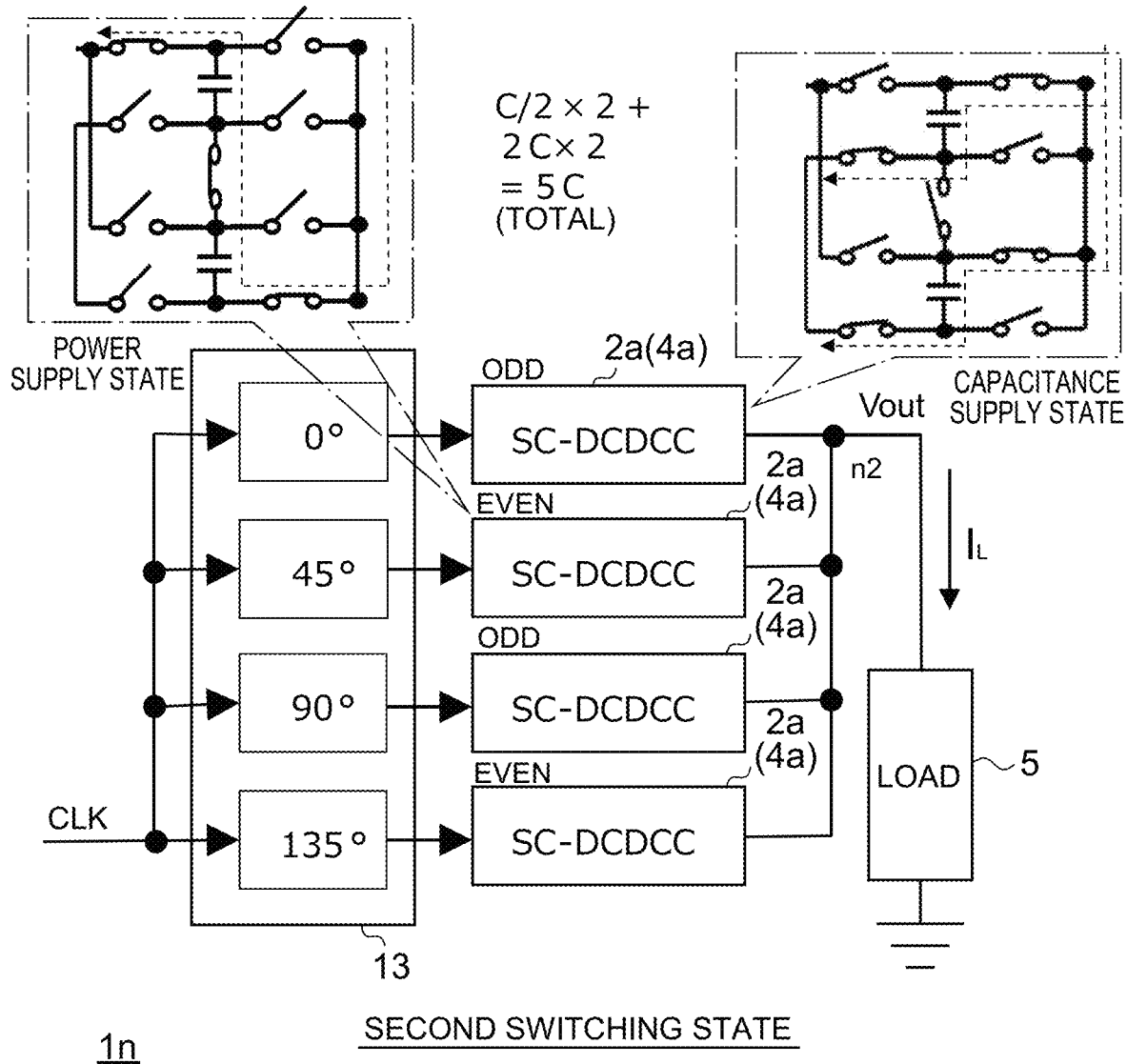
FIG. 29B is a diagram illustrating an example in which the four switched capacitor circuits in the power supply circuit are operated in a second switching state.

FIG. 29A is a diagram illustrating an example in which the four switched capacitor circuits 4a in a power supply circuit 1n are operated in the first switching state, and FIG. 29B is a diagram illustrating an example in which the four switched capacitor circuits 4a in the power supply circuit 1n are operated in the second switching state. The four switched capacitor circuits 4a in the power supply circuit 1n in FIGS. 29A and 29B can output the output voltage Vout of Vin/3 as in FIGS. 28A and 28B. Each of the SC-DCDCCs 2a in FIGS. 29A and 29B switches between the first switching state and the second switching state of the corresponding switched capacitor circuits 4a in accordance with a logic of a corresponding clock signal among the plurality of clock signals having different phases output from the clock generation circuit 13.

As illustrated in FIG. 29A, in the first switching state, the odd-numbered (ODD) switched capacitor circuit 4a is operated in the power supply state, and the even-numbered (EVEN) switched capacitor circuit 4a is operated in the capacitance supply state. As illustrated in FIG. 29B, in the second switching state, the odd-numbered (ODD) switched capacitor circuit 4a is operated in the capacitance supply state, and the even-numbered (EVEN) switched capacitor circuit 4a is operated in the power supply state.

The capacitance on the output side as viewed from the second node n2 of the switched capacitor circuit 4a operating in the power supply state is C/2, and the capacitance on the output side as viewed from the second node n2 of the switched capacitor circuit 4a operating in the capacitance supply state is 2C. In both the first switching state and the second switching state, two of the four switched capacitor circuits 4a operate in the power supply state, and the remaining two operate in the capacitance supply state. Thus, the capacitance on the output side as viewed from the second node n2 is C/2×2+2C×2=5C in both the first switching state and the second switching state.

In this manner, the capacitance on the output side as viewed from the second node n2 can be made equal in both the first switching state and the second switching state in the power supply circuit 1n in FIGS. 29A and 29B.

Figure 30A:
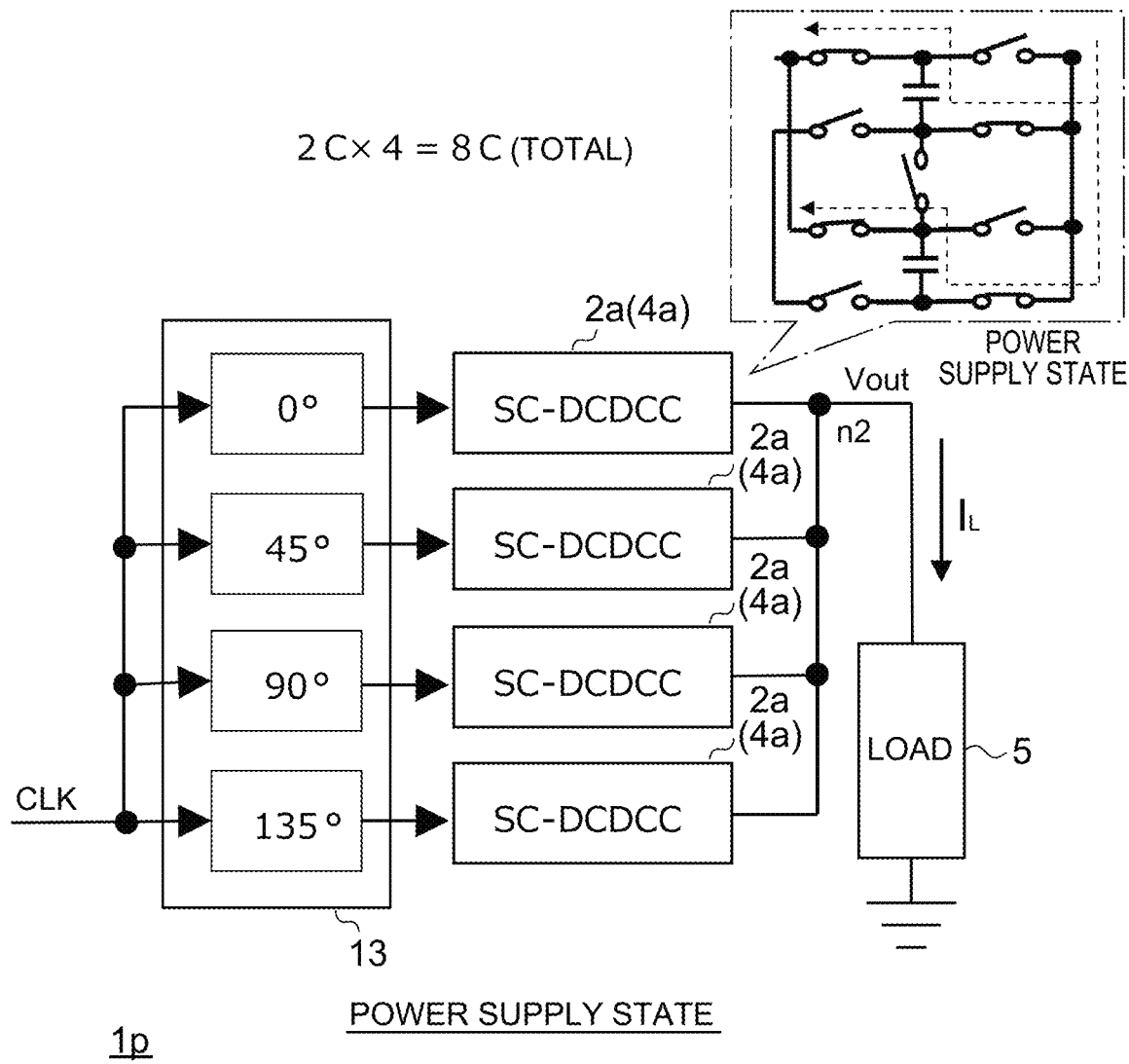
FIG. 30A is a block diagram of a power supply state of a power supply circuit including four switched capacitor circuits that perform an interleaving operation.
Figure 30B:
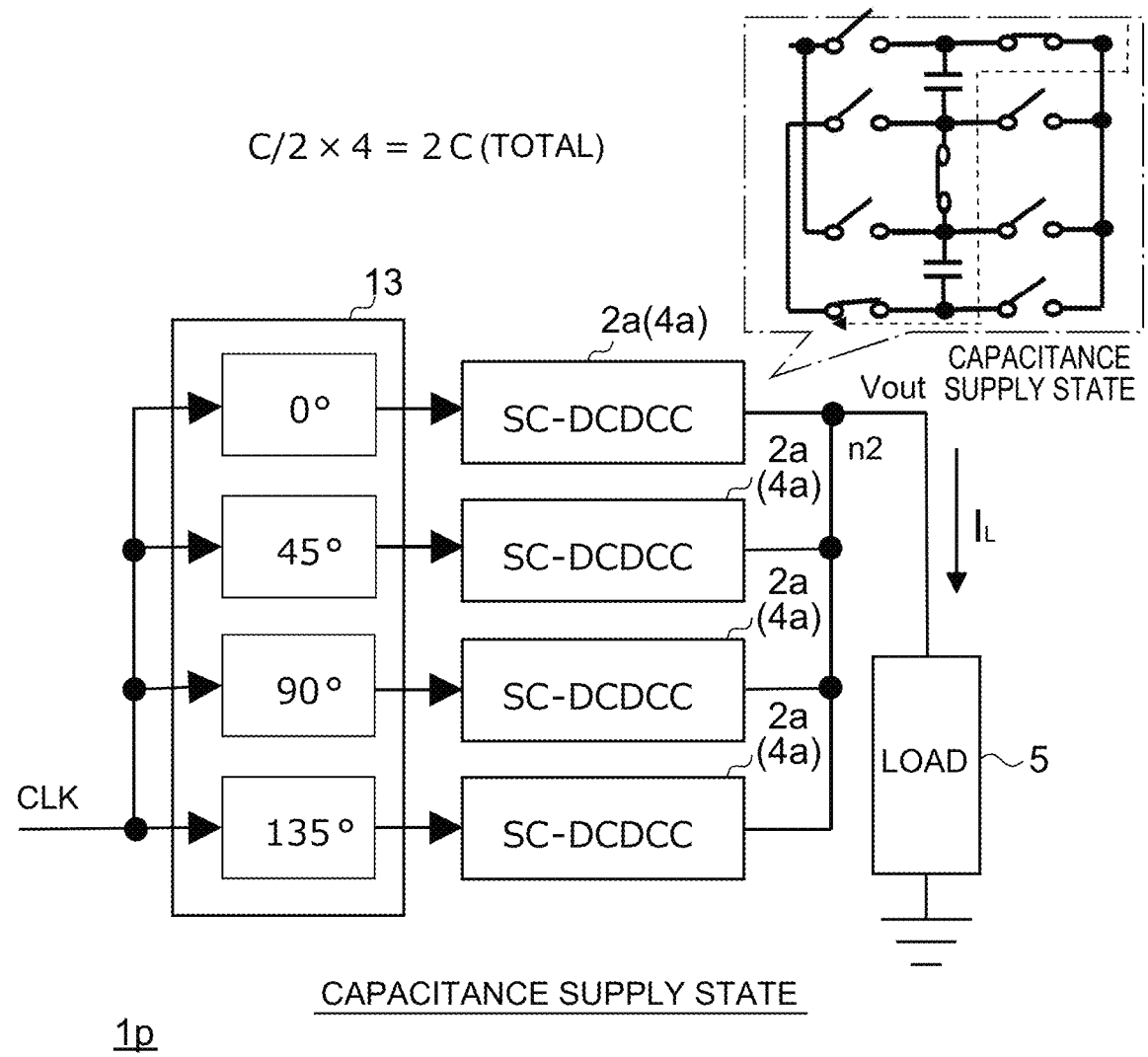
FIG. 30B is a block diagram of a capacitance supply state of the power supply circuit including the four switched capacitor circuits that perform the interleaving operation.

FIGS. 30A and 30B are block diagrams of a power supply circuit 1p including the four switched capacitor circuits 4a (SC-DCDCC 2a) that perform an interleaving operation. FIGS. 30A and 30B illustrate an example in which the four switched capacitor circuits 4a in the power supply circuit 1p enter the power supply state or the capacitance supply state in synchronization. FIG. 30A illustrates the power supply state, and FIG. 30B illustrates the capacitance supply state. All the respective switched capacitor circuits 4a have the same internal configuration, and have, for example, a circuit configuration as illustrated in FIG. 13. The four switched capacitor circuits 4a in the power supply circuit 1p of FIGS. 30A and 30B switch switches SW1 to SW9 as in FIGS. 16A and 16B, and can output the output voltage Vout of 2Vin/3. The clock generation circuit 13 that generates four clock signals whose phases are different from each other is connected to the four switched capacitor circuits 4a in FIGS. 30A and 30B.

In the power supply state of FIG. 30A, the capacitance on the output side as viewed from the second node n2 is 2C×4=8C. In the capacitance supply state of FIG. 30B, the capacitance on the output side as viewed from the second node n2 is C/2×4=2C.

As illustrated in FIGS. 30A and 30B, even if all the switched capacitor circuits 4a in the power supply circuit 1p enter the power supply state or the capacitance supply state in synchronization while performing the interleaving operation, a large difference occurs in the capacitance on the output side as viewed from the second node n2 between the power supply state and the capacitance supply state, and the ripple occurs in the output voltage Vout.

Therefore, it is conceivable to alternately switch the plurality of switched capacitor circuits 4a in the power supply circuit 1p to the first switching state or the second switching state to operate as in FIGS. 25A and 25B.

Figure 31A:
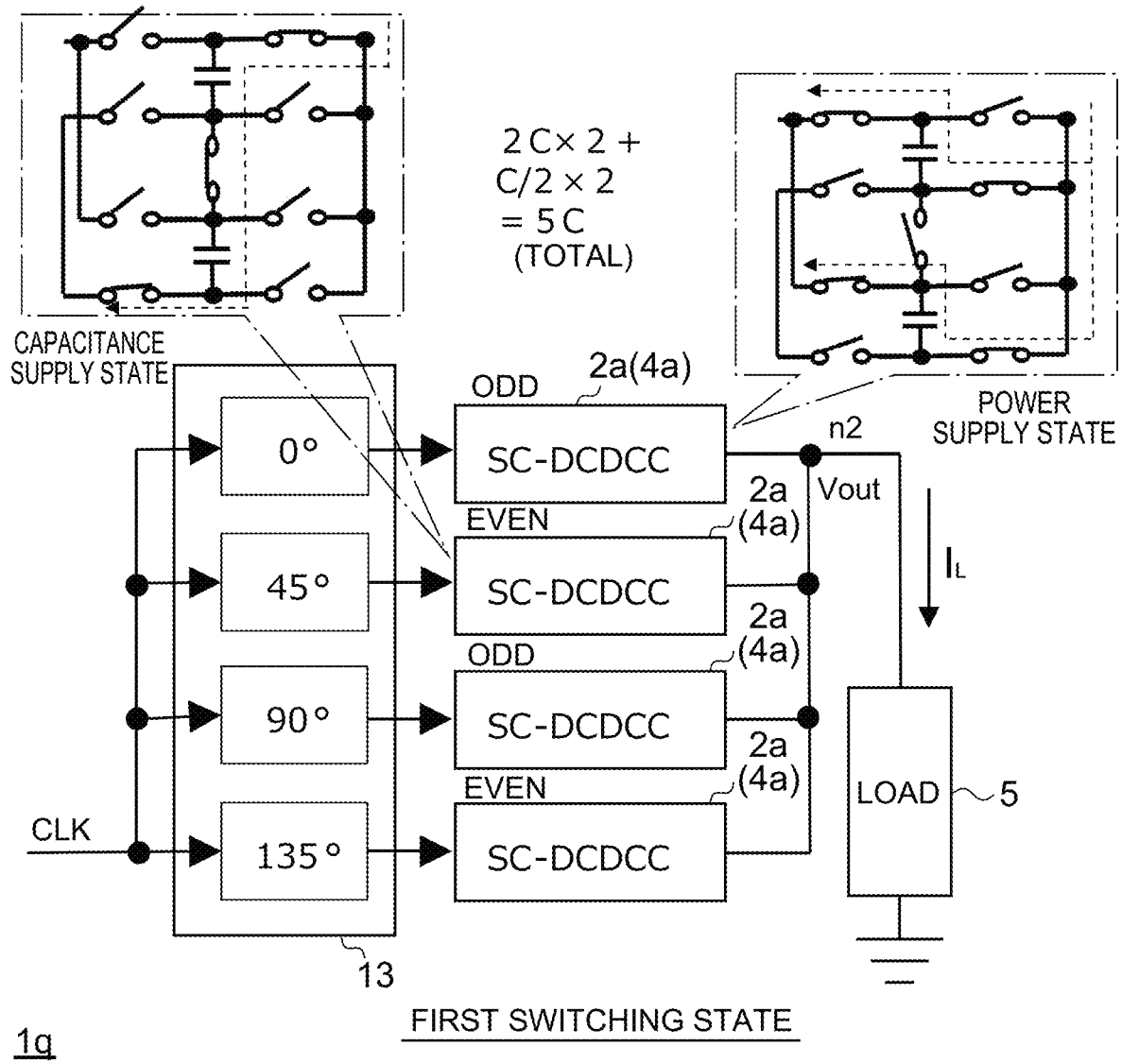
FIG. 31A is a diagram illustrating an example in which the four switched capacitor circuits in the power supply circuit are operated in a first switching state.
Figure 31B:
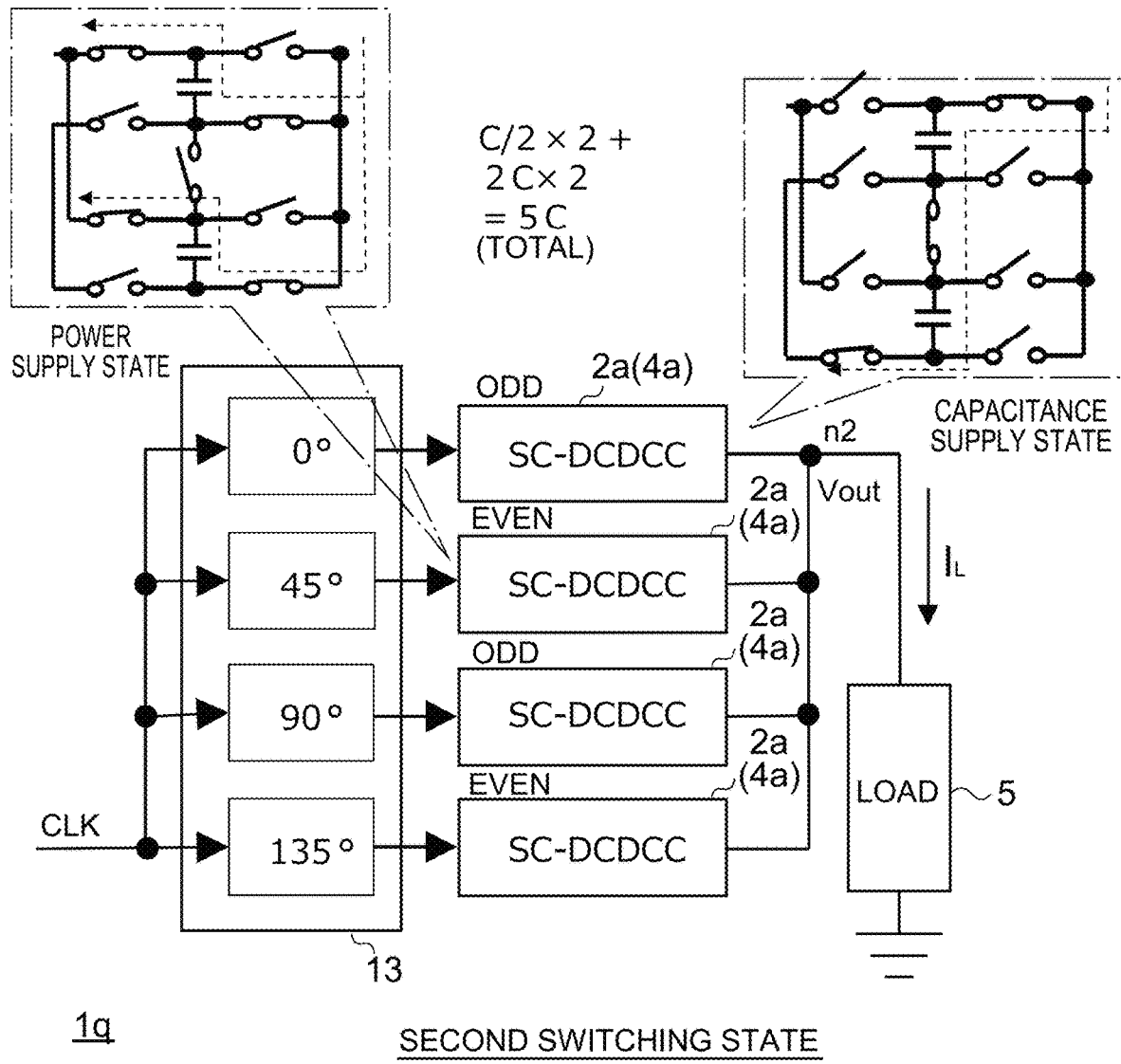
FIG. 31B is a diagram illustrating an example in which the four switched capacitor circuits in the power supply circuit are operated in a second switching state.

FIG. 31A is a diagram illustrating an example in which the four switched capacitor circuits 4a in a power supply circuit 1q are operated in the first switching state, and FIG. 31B is a diagram illustrating an example in which the four switched capacitor circuits 4a in the power supply circuit 1q are operated in the second switching state. The four switched capacitor circuits 4a in the power supply circuit 1q in FIGS. 31A and 31B can output the output voltage Vout of 2Vin/3 as in FIGS. 30A and 30B.

As illustrated in FIG. 31A, in the first switching state, the odd-numbered (ODD) switched capacitor circuit 4a is operated in the power supply state, and the even-numbered (EVEN) switched capacitor circuit 4a is operated in the capacitance supply state. As illustrated in FIG. 31B, in the second switching state, the odd-numbered (ODD) switched capacitor circuit 4a is operated in the capacitance supply state, and the even-numbered (EVEN) switched capacitor circuit 4a is operated in the power supply state.

The capacitance on the output side as viewed from the second node n2 of the switched capacitor circuit 4a operating in the power supply state is 2C, and the capacitance on the output side as viewed from the second node n2 of the switched capacitor circuit 4a operating in the capacitance supply state is C/2. In both the first switching state and the second switching state, two of the four switched capacitor circuits 4a operate in the power supply state, and the remaining two operate in the capacitance supply state. Thus, the capacitance on the output side as viewed from the second node n2 is C/2×2+2C×2=5C in both the first switching state and the second switching state.

In this manner, the capacitance on the output side as viewed from the second node n2 can be made equal in both the first switching state and the second switching state in the power supply circuit 1q in FIGS. 31A and 31B.

Figure 32:
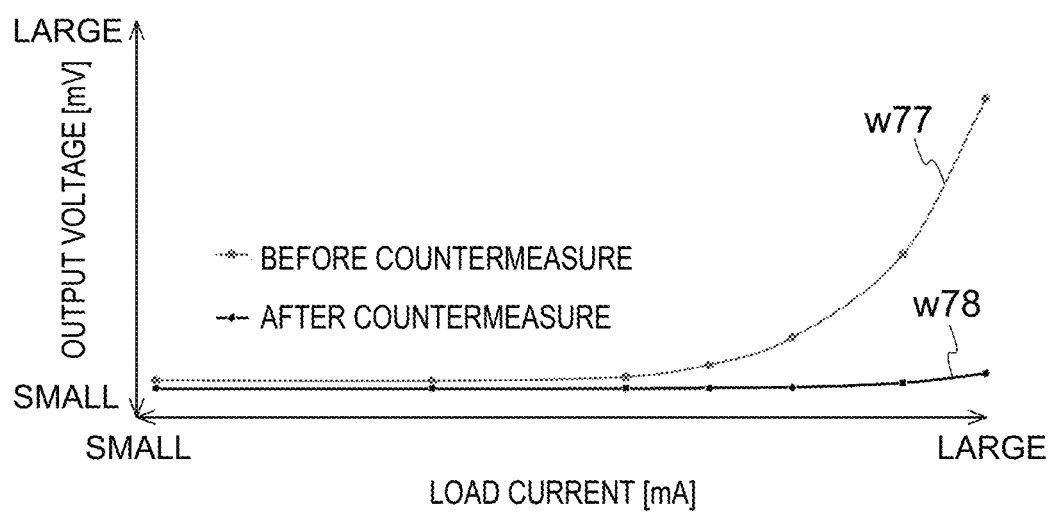
FIG. 32 is a diagram illustrating a ripple of an output voltage output from the power supply circuit according to FIGS. 30A and 30B and a ripple of an output voltage output from the power supply circuit according to FIGS. 31A and 31B.

FIG. 32 is a diagram illustrating a ripple component of the output voltage Vout output from the power supply circuit 1p in FIGS. 30A and 30B and a ripple component of the output voltage Vout output from the power supply circuit 1q in FIGS. 31A and 31B. A waveform w77 in FIG. 32 illustrates the ripple component of the output voltage Vout output from the power supply circuit 1p in FIGS. 30A and 30B, and a waveform w78 illustrates the ripple component of the output voltage Vout output from the power supply circuit 1q in FIGS. 31A and 31B. As can be seen by comparing the waveforms w77 and w78, the power supply circuit 1q in FIGS. 31A and 31B can significantly suppress the ripple component as compared with the power supply circuit 1p in FIGS. 30A and 30B.

Figure 33A:
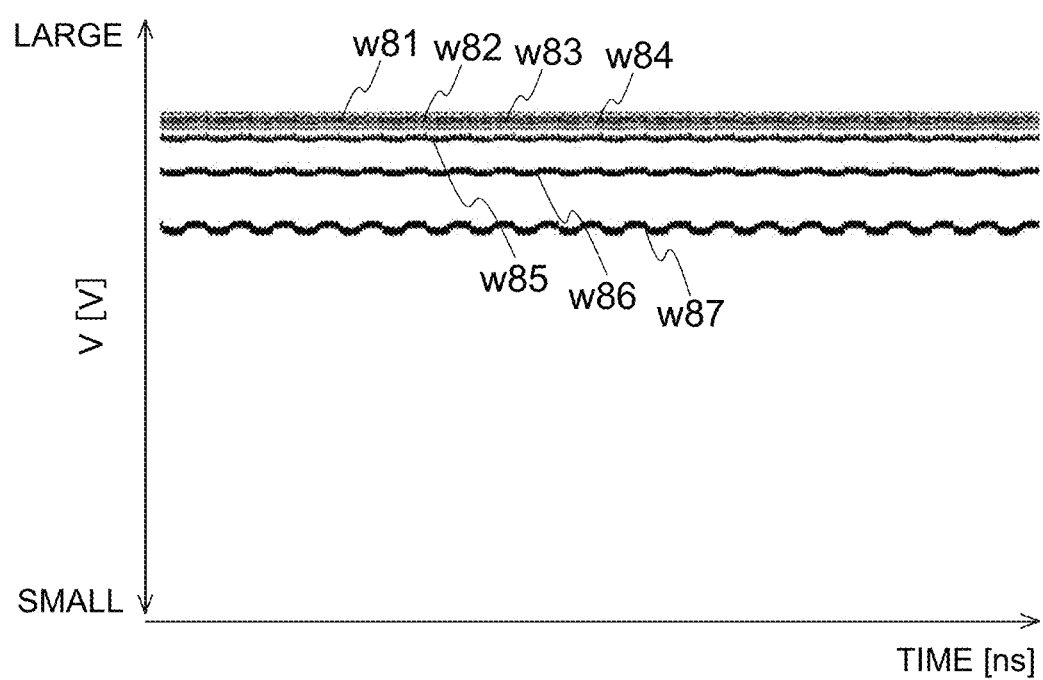
FIG. 33A is a diagram illustrating a waveform of the output voltage output from the power supply circuit according to FIGS. 31A and 31B.
Figure 33B:
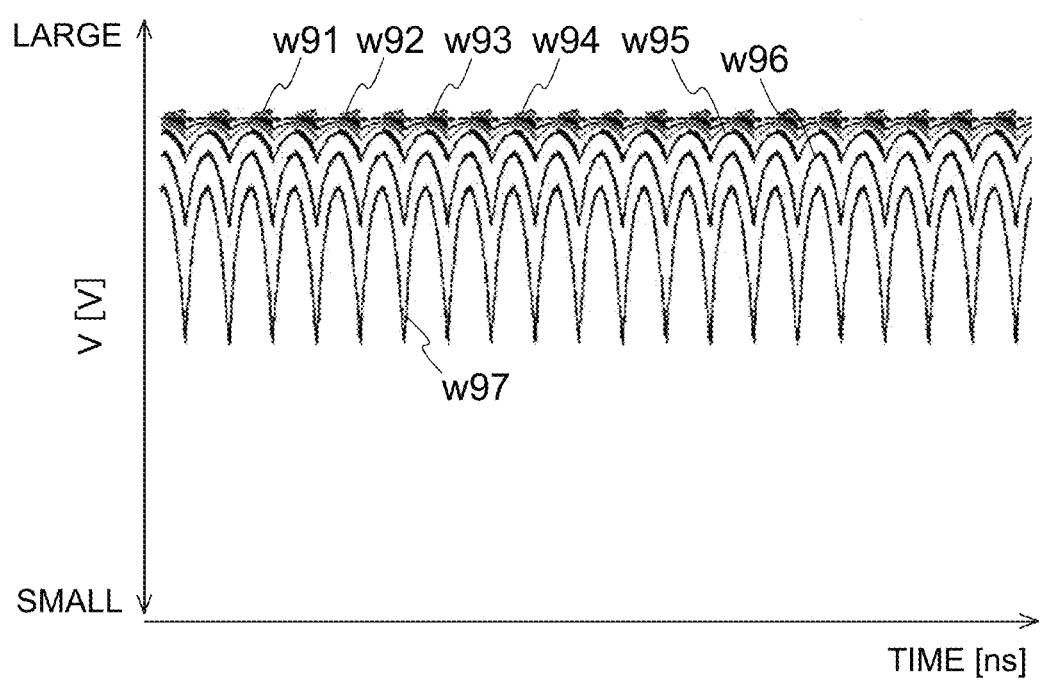
FIG. 33B is a diagram illustrating a waveform of the output voltage output from the power supply circuit according to FIGS. 30A and 30B.

FIG. 33A is a diagram illustrating a waveform of the output voltage Vout output from the power supply circuit 1q in FIGS. 31A and 31B, and FIG. 33B is a diagram illustrating a waveform of the output voltage Vout output from the power supply circuit 1p in FIGS. 30A and 30B. A vertical axis in FIG. 33A and a vertical axis in FIG. 33B both indicate voltages, and indicate the same voltage range. Waveforms w81 to w87 in FIG. 33A illustrate voltage waveforms corresponding to a case where a load current of the output voltage Vout output from the power supply circuit 1q is changed in seven ways. Similarly, waveforms w91 to w97 in FIG. 33B illustrate voltage waveforms corresponding to a case where a load current of the output voltage Vout output from the power supply circuit 1p is changed in seven ways.

As can be seen by comparing the waveforms between FIGS. 33A and 33B, the output voltage Vout output from the power supply circuit 1q in FIGS. 31A and 31B has less voltage variation than that of the output voltage Vout output from the power supply circuit 1p in FIGS. 30A and 30B, so that a voltage level can be further stabilized.

In this manner, in the power supply circuits 1i, 1k, 1n, and 1q according to the third embodiment, the plurality of switched capacitor circuits 4a connected in parallel between the first node n1 to which the input voltage Vin is supplied and the second node n2 that outputs the output voltage Vout are alternately switched to the first switching state or the second switching state to operate. Both the first switching state and the second switching state include the same number of switched capacitor circuits 4a operating in the power supply state and the same number of switched capacitor circuits 4a operating in the capacitance supply state, and thus, the capacitance on the output side as viewed from the second node n2 can be made equal between the first switching state and the second switching state. Thus, the ripple of the output voltage Vout can be suppressed.

In addition, the plurality of switched capacitor circuits 4a connected in parallel can perform the interleaving operation in the power supply circuits 1n and 1q according to the third embodiment, and thus, the ripple of the output voltage Vout can be further suppressed.

The power supply circuits 1i, 1k, 1n, and 1q according to the third embodiment described above can adopt the configuration in which the SC-DCDCC 2a and the analog LDO 3a are connected in parallel between the first node n1 and the second node n2, similarly to the power supply circuit 1 according to the first embodiment. As illustrated in, for example, FIG. 31A, the power supply circuits 1i, 1k, 1n, and 1q according to the third embodiment include the plurality of SC-DCDCCs 2a connected in parallel between the first node n1 and the second node n2, and thus, the same effects as those of the first embodiment can be obtained by connecting the analog LDO 3a in parallel to these SC-DCDCCs 2a.

Fourth Embodiment

Figure 34:
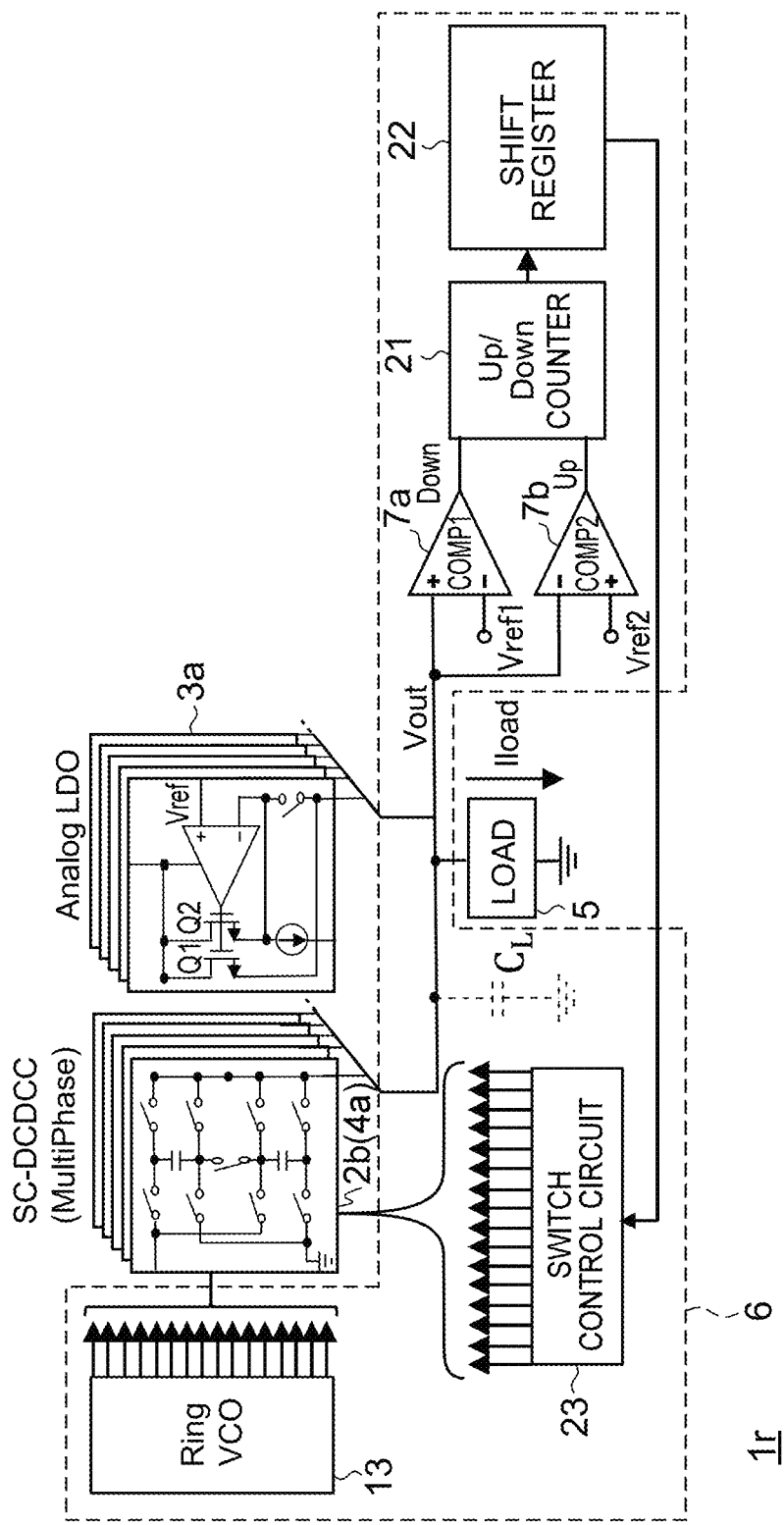
FIG. 34 is a block diagram illustrating a schematic configuration of a power supply circuit according to a fourth embodiment.

FIG. 34 is a block diagram illustrating a schematic configuration of a power supply circuit 1r according to a fourth embodiment. The power supply circuit 1r of FIG. 34 includes a plurality of SC-DCDCCs 2b, a plurality of analog LDOs 3a, a first comparator 7a, a second comparator 7b, an up/down counter 21, a shift register 22, a switch control circuit 23, and a clock generation circuit 13. Among these, the first comparator 7a, the second comparator 7b, the up/down counter 21, the shift register 22, and the switch control circuit 23 constitute a closed-loop control circuit 6. The shift register 22 corresponds to the control signal generator 6a of FIG. 1, and the switch control circuit 23 corresponds to the switching control circuit 6b of FIG. 1.

Each of the SC-DCDCCs 2b is the SC-DCDCC 2 or the SC-DCDCC 2a described in any one of the first to third embodiments. Each of the analog LDOs 3a has an internal configuration similar to that of the analog LDO 3a in FIG. 3. As illustrated in FIG. 3, each of the SC-DCDCCs 2b and each of the analog LDOs 3a in FIG. 34 are connected in parallel between a first node n1 to which an input voltage Vin is supplied and a second node n2 that outputs an output voltage Vout. FIG. 34 illustrates an example including the plurality of SC-DCDCCs 2b and the plurality of analog LDOs 3a, but the number of the SC-DCDCCs 2b and the number of the analog LDOs 3a are not particularly limited. The plurality of SC-DCDCCs 2b are configured as illustrated in FIG. 18 or 20, for example. As illustrated in FIGS. 31A and 31B, the plurality of SC-DCDCCs 2b may operate by alternately switching between a first switching state and a second switching state.

The first comparator 7a outputs a signal corresponding to a voltage difference between the output voltage Vout output from the second node n2 of the power supply circuit 1r and a first reference voltage Vref1. The first reference voltage Vref1 is a voltage that defines an upper limit voltage of the output voltage Vout. When the output voltage Vout becomes higher than the first reference voltage Vref1, the first comparator 7a outputs, for example, a high-level Down signal.

The second comparator 7b outputs a signal corresponding to a voltage difference between the output voltage Vout output from the second node n2 of the power supply circuit 1r and a second reference voltage Vref2. The second reference voltage Vref2 is a voltage that defines a lower limit voltage of the output voltage Vout. The second reference voltage Vref2 is a voltage having a lower voltage level than the first reference voltage. When the output voltage Vout becomes lower than the second reference voltage Vref2, the second comparator 7b outputs, for example, a high-level Up signal.

The up/down counter 21 decreases a count value when the Down signal is output from the first comparator 7a, and increases the count value when the Up signal is output from the second comparator 7b. The shift register 22 shifts a control signal according to the count value of the up/down counter 21.

The switch control circuit 23 switches operation states of the plurality of SC-DCDCCs 2b based on the control signal output from the shift register 22. For example, when the plurality of SC-DCDCCs 2b can output a DC voltage Vin/2 or Vin/3, the voltage level of the output voltage Vout can be finely adjusted as illustrated in FIGS. 19A and 19B by controlling a ratio between the number of SC-DCDCCs 2b each outputting the output voltage Vin/2 and the number of SC-DCDCCs 2b each outputting the output voltage Vin/3 based on a state of the control signal from the shift register 22.

The clock generation circuit 13 generates a clock signal to be supplied to each of the plurality of SC-DCDCCs 2b. The clock generation circuit 13 can include, for example, a ring oscillator (Ring VCO). In the case of performing an interleaving operation of the plurality of SC-DCDCCs 2b, clock signals having different phases are supplied to the respective SC-DCDCCs 2b. Each of the SC-DCDCCs 2b periodically switches between a power supply state and a capacitance supply state in synchronization with the corresponding clock signal. As described in the third embodiment, the plurality of SC-DCDCCs 2b may be alternately operated while being divided into the first switching state and the second switching state.

The power supply circuit 1r of FIG. 34 can use a capacitor in the switched capacitor circuit 4a of the SC-DCDCC 2b as an output capacitance CL of an analog LDO 3a, and thus, it is unnecessary to separately provide the output capacitance CL of the analog LDO 3a, and a circuit area can be reduced.

The analog LDO 3a in the power supply circuit 1r in FIG. 34 includes a first transistor Q1 and a second transistor Q2 which are configured using NMOS transistors, but PMOS transistors may be used.

Figure 35:
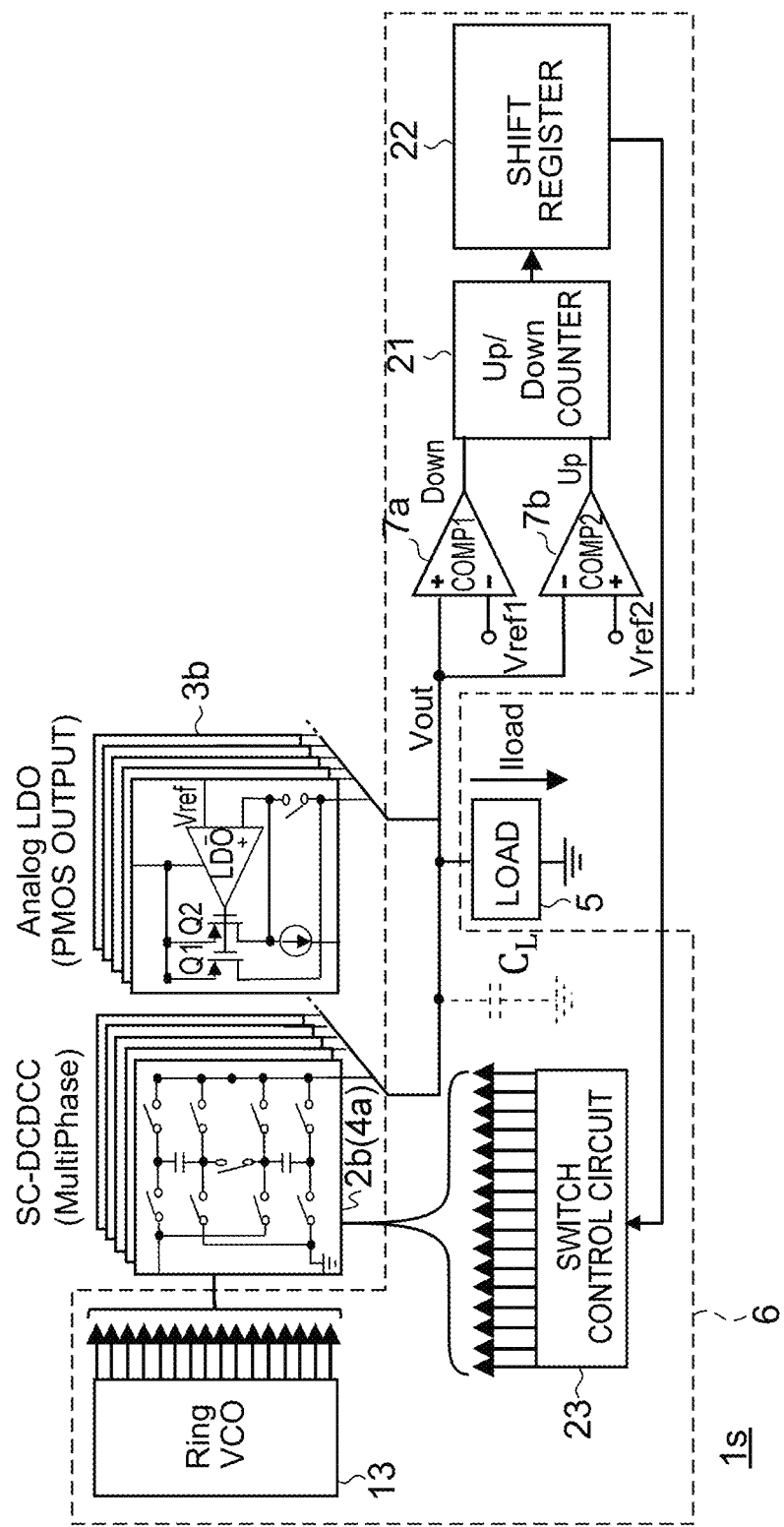
FIG. 35 is a block diagram of a power supply circuit including an analog LDO using a PMOS transistor.

FIG. 35 is a block diagram of a power supply circuit 1s including an analog LDO 3b using a PMOS transistor. The power supply circuit 1s in FIG. 35 is the same as the power supply circuit 1r in FIG. 34 except that the first transistor Q1 and the second transistor Q2 in the analog LDO 3b are PMOS transistors and wirings connected to an inverting input terminal and a non-inverting input terminal of a control amplifier 7 are reversed.

In the power supply circuits 1r and 1s of FIGS. 34 and 35, the plurality of SC-DCDCCs 2b and the plurality of analog LDOs 3a or 3b are connected in parallel between the first node n1 and the second node n2. Therefore, the power supply circuits 1r and 1s can cause a current corresponding to a load circuit 5 to flow, and a sufficient amount of current can be caused to flow to the load circuit 5 without increasing the circuit area of the SC-DCDCCs 2b and the analog LDOs 3a or 3b more than necessary. In addition, the SC-DCDCC 2b is subjected to feedback control by the closed-loop control circuit 6, and the analog LDO 3a or 3b is controlled by an open-loop control circuit 8 as illustrated in FIG. 3, and thus, double-loop control can be avoided, and the operation can be stabilized.

Furthermore, the ripple of the output voltage Vout can be suppressed by the interleaving operation of the plurality of SC-DCDCCs 2b in the power supply circuits 1r and 1s.

Fifth Embodiment

Figure 36:
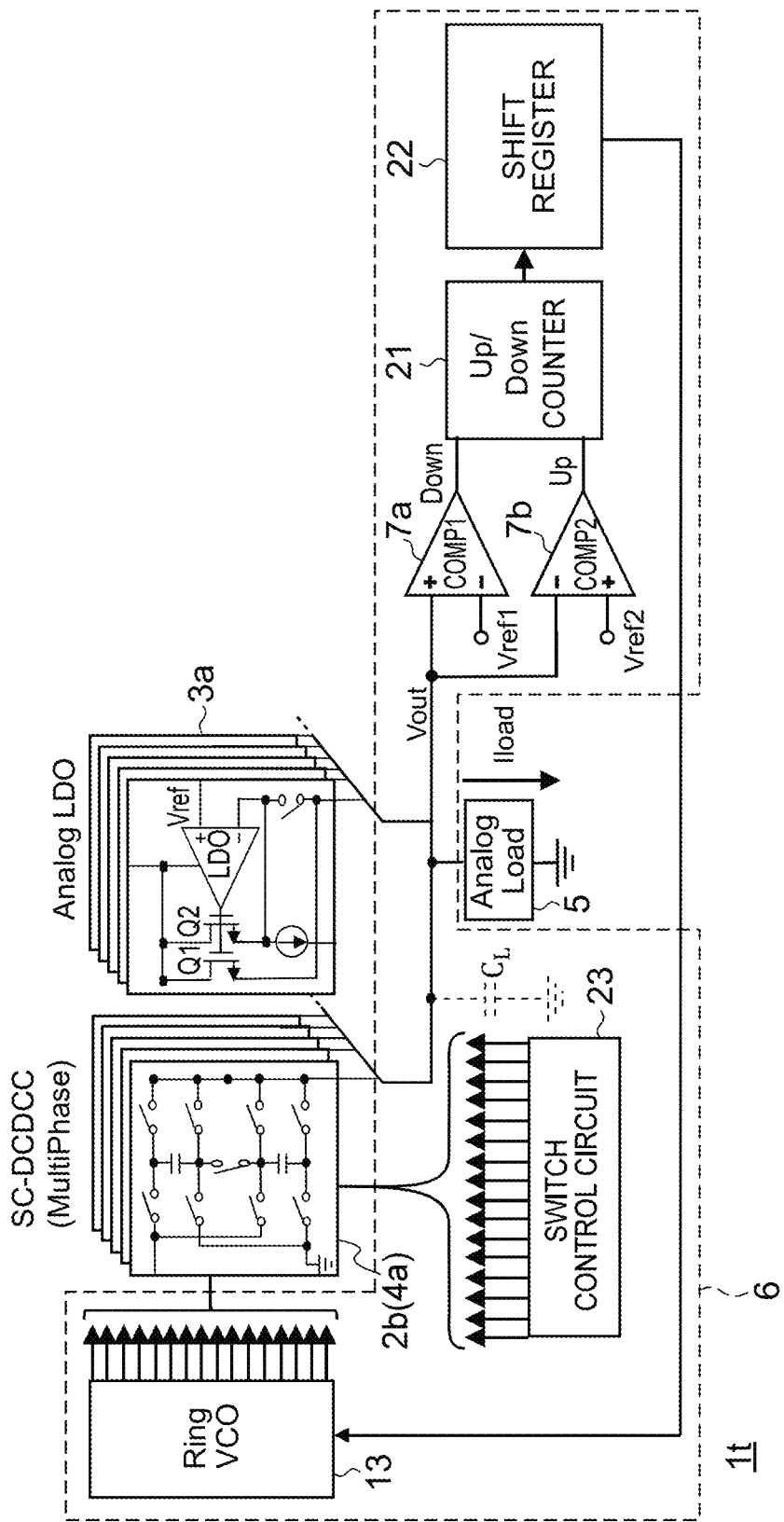
FIG. 36 is a block diagram illustrating a schematic configuration of a power supply circuit according to a fifth embodiment.

FIG. 36 is a block diagram illustrating a schematic configuration of a power supply circuit 1t according to a fifth embodiment. The power supply circuit it of FIG. 36 includes a plurality of SC-DCDCCs 2b, a plurality of analog LDOs 3a, a first comparator 7a, a second comparator 7b, an up/down counter 21, a shift register 22, a switch control circuit 23, and a clock generation circuit 13. Among these, the first comparator 7a, the second comparator 7b, the up/down counter 21, the shift register 22, and the clock generation circuit 13 constitute a closed-loop control circuit 6.

Although the switch control circuit 23 performs the switching control of the operation states of the plurality of SC-DCDCCs 2b based on the control signal output from the shift register 22 in the power supply circuit 1r of FIG. 34, a control signal output from the shift register 22 is input not to the switch control circuit 23 but to the clock generation circuit 13 in the power supply circuit 1t of FIG. 36. The clock generation circuit 13 performs switching control of the number of clock signals to be supplied to the plurality of SC-DCDCCs 2b based on the control signal output from the shift register 22. It is difficult for the plurality of SC-DCDCCs 2b to output an output voltage unless the corresponding clock signal is supplied from the clock generation circuit 13. Thus, as the number of clock signals generated by the clock generation circuit 13 increases, the total driving capability of the plurality of SC-DCDCCs 2b increases, and the driving capability of an output voltage Vout can be controlled according to a load. In this manner, the shift register 22 functions as a control circuit (second control circuit) that controls whether to output each of the plurality of clock signals from the clock generation circuit 13 based on a voltage level of the output voltage of the SC-DCDCC 2b.

In addition, the control operation of the switch control circuit 23 is fixed in the power supply circuit 1t of FIG. 36, and thus, it is unnecessary to change the control operation of the switch control circuit 23, and an internal configuration of the switch control circuit 23 can be simplified.

In this manner, the number of clock signals generated by the clock generation circuit 13 is adjusted according to the voltage level of the output voltage Vout output from a second node n2 of the power supply circuit 1t in the fifth embodiment. Thus, the driving capability of the output voltage Vout can be controlled by controlling the driving capability of the plurality of SC-DCDCCs 2b according to the voltage level of the output voltage Vout.

Sixth Embodiment

Figure 37:
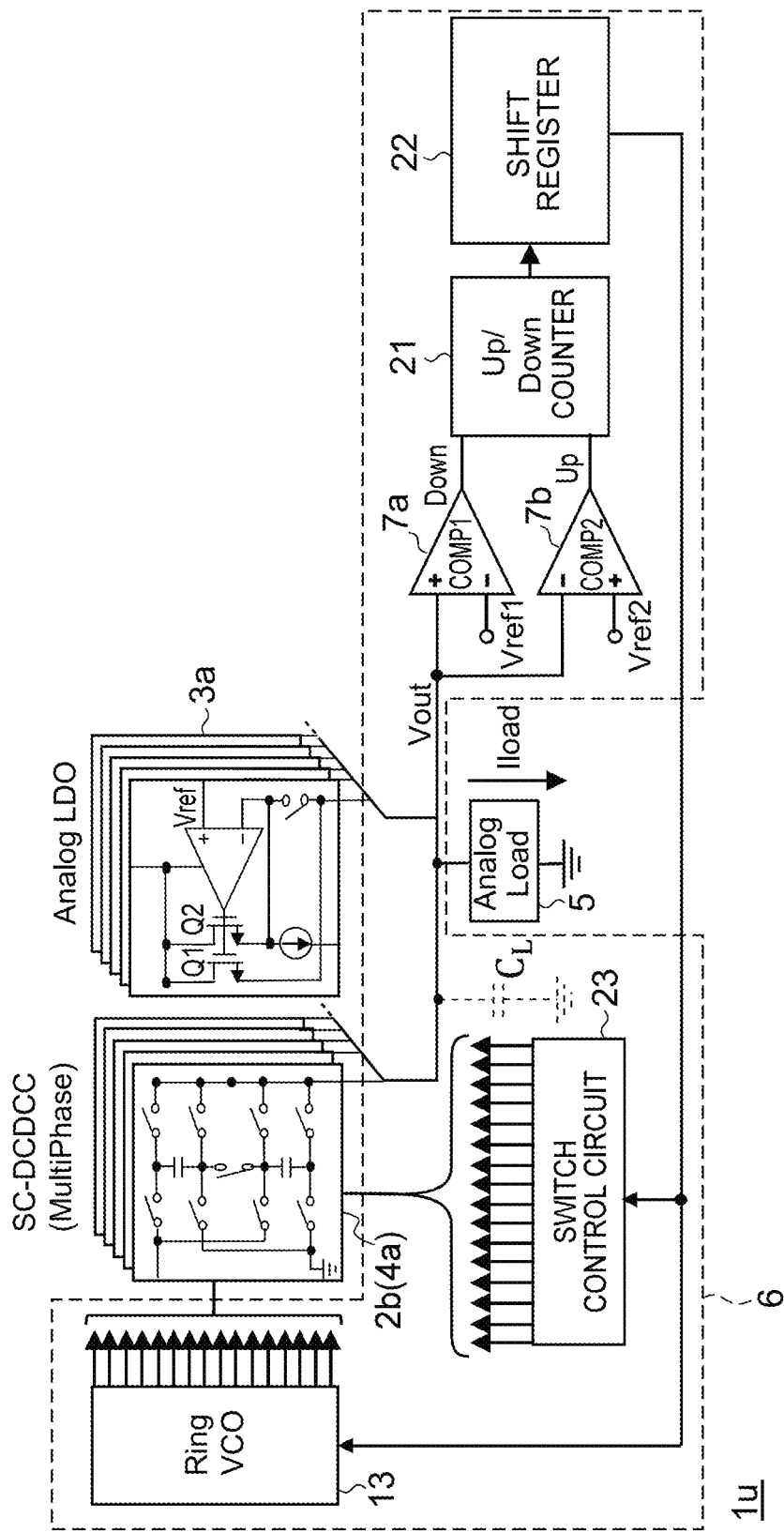
FIG. 37 is a block diagram illustrating a schematic configuration of a power supply circuit according to a sixth embodiment.

FIG. 37 is a block diagram illustrating a schematic configuration of a power supply circuit 1u according to a sixth embodiment. The power supply circuit 1u of FIG. 37 includes a plurality of SC-DCDCCs 2b, a plurality of analog LDOs 3a, a first comparator 7a, a second comparator 7b, an up/down counter 21, a shift register 22, a switch control circuit 23, and a clock generation circuit 13. Among these, the first comparator 7a, the second comparator 7b, the up/down counter 21, the shift register 22, the switch control circuit 23, and the clock generation circuit 13 constitute a closed-loop control circuit 6.

In the power supply circuit 1u of FIG. 37, both the switch control circuit 23 and the clock generation circuit 13 perform an operation for controlling an output voltage Vout based on a control signal output from the shift register 22. The switch control circuit 23 switches operation states of the plurality of SC-DCDCCs 2b based on the control signal output from the shift register 22. In addition, the clock generation circuit 13 controls frequencies of a plurality of clock signals to be supplied to the plurality of SC-DCDCCs 2b based on the control signal output from the shift register 22. The output voltage output from the SC-DCDCC 2b can be controlled by controlling the frequency of the clock signal supplied to each of the SC-DCDCCs 2b. Each of the SC-DCDCCs 2b generates a voltage in synchronization with the corresponding clock signal. The voltage can be adjusted according to a load by varying the frequency according to the load.

In this manner, in the power supply circuit 1u of FIG. 37, the switch control circuit 23 performs control to switch the operation states of the plurality of SC-DCDCCs 2b based on the control signal output from the shift register 22, and further, the clock generation circuit 13 controls the frequencies of the plurality of clock signals. As a result, a voltage level of the output voltage Vout can be more finely controlled, and the power efficiency can be improved by varying the frequency according to the load.

Seventh Embodiment

The description has been given in the above-described first to sixth embodiments mainly regarding the example in which the SC-DCDCC 2, 2a, or 2b performs the closed-loop control and the analog LDO 3, 3a, or 3b performs the open-loop control. On the other hand, a power supply circuit 1*v* according to a seventh embodiment, which will be described below, includes three operation modes (first to third operation modes).

Figure 38A:
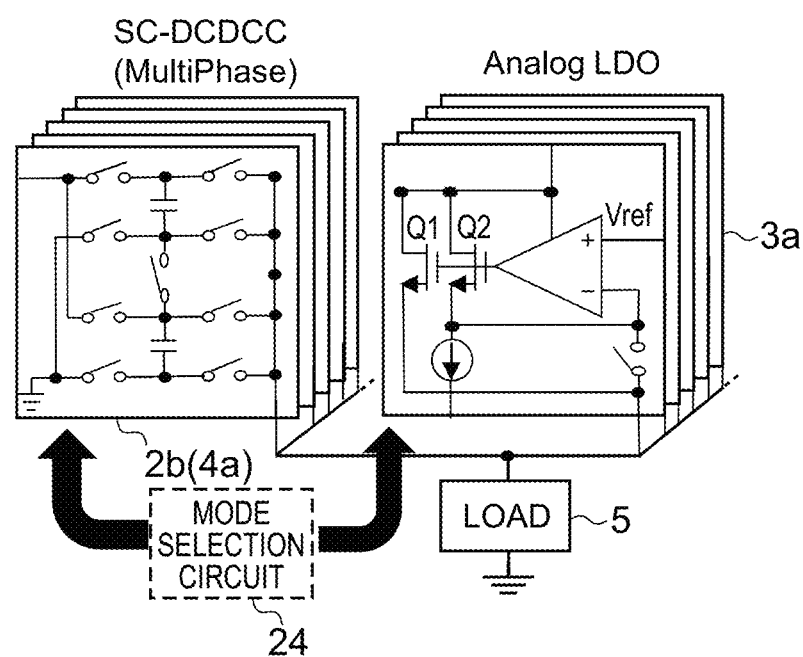
FIG. 38A is a diagram illustrating a first operation mode of the power supply circuit.
Figure 38B:
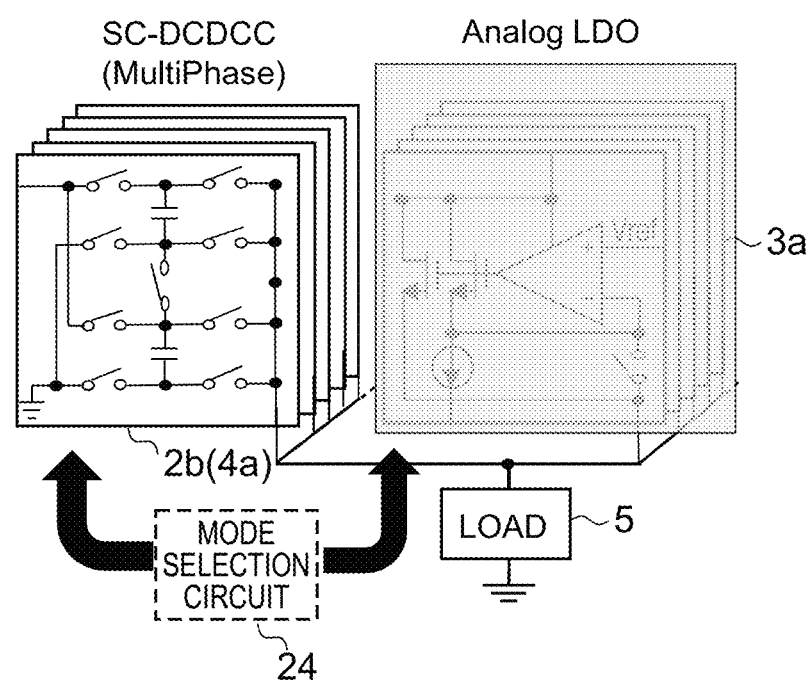
FIG. 38B is a diagram illustrating a second operation mode of the power supply circuit.
Figure 38C:
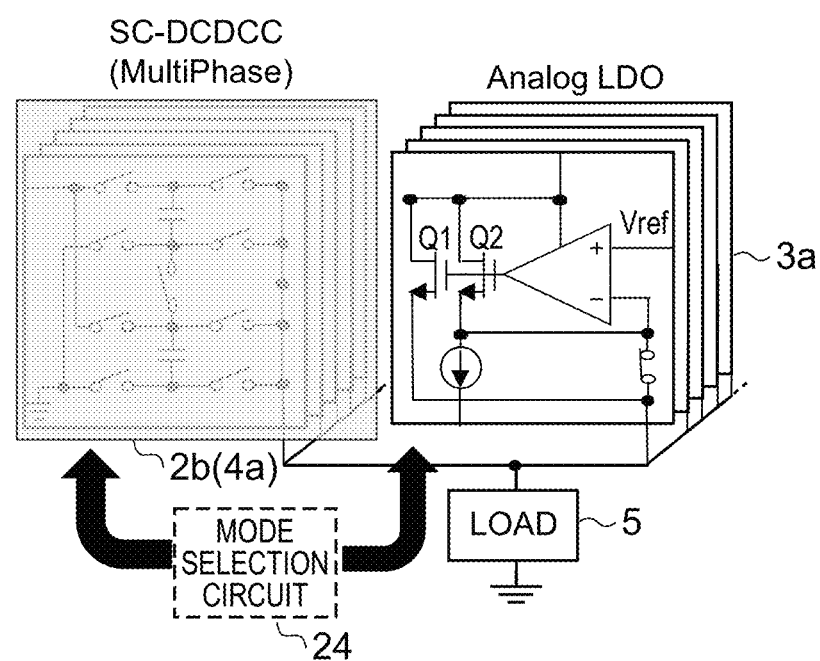
FIG. 38C is a diagram illustrating a third operation mode of the power supply circuit.

FIGS. 38A, 38B, and 38C are diagrams for describing first to third operation modes included in the power supply circuit 1*v* according to the seventh embodiment illustrated in FIG. 39 to be described later. The first operation mode illustrated in FIG. 38A is a mode in which an SC-DCDCC 2*b* performs closed-loop control and an analog LDO 3*a* performs open-loop control. The second operation mode illustrated in FIG. 38B is a mode in which the SC-DCDCC 2*b* performs the closed-loop control and the analog LDO 3*a* stops operating. The third operation mode illustrated in FIG. 38C is a mode in which the analog LDO 3*a* performs the closed-loop control and the SC-DCDCC 2*b* stops operating. Although FIGS. 38A, 38B, and 38C illustrate examples in which any one of the first to third operation modes is selected by a mode selection circuit 24, but it is not essential to provide the mode selection circuit 24.

The first operation mode is selected, for example, when both of power efficiency and a high power supply rejection ratio (PSRR) are required. The second operation mode is selected, for example, particularly when high power efficiency is required. The third operation mode is selected, for example, when a high PSRR is required.

Figure 39:
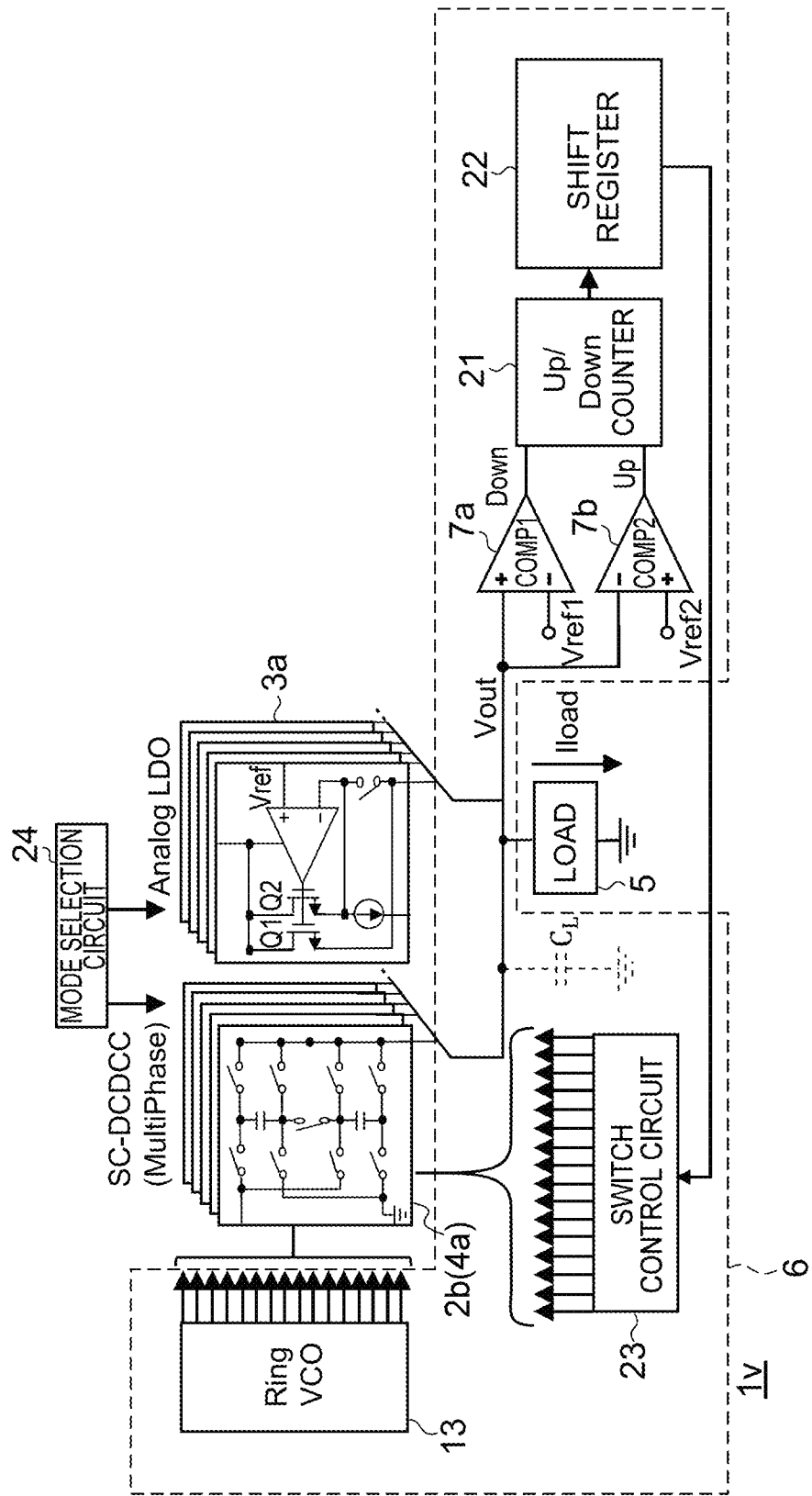
FIG. 39 is a block diagram illustrating a schematic configuration of a power supply circuit according to a seventh embodiment.

FIG. 39 is a block diagram illustrating a schematic configuration of the power supply circuit 1*v* according to the seventh embodiment. The power supply circuit 1*v* of FIG. 39 includes the mode selection circuit 24 in the same configuration as the power supply circuit 1*r* of FIG. 34. The mode selection circuit 24 selects any one of the first to third operation modes described above. When stopping operations of the plurality of SC-DCDCCs 2*b*, the mode selection circuit 24 stops generation of a clock signal in a clock generation circuit 13, for example. When stopping operations of the plurality of analog LDOs 3*a*, the mode selection circuit 24 disables a control amplifier in each of the analog LDOs 3*a*, for example.

In this manner, the plurality of operation modes for switching the operation of the SC-DCDCC 2*b* and the analog LDO 3*a* are provided in the seventh embodiment, and thus, the SC-DCDCC 2*b* and the analog LDO 3*a* can be selectively used according to individual use cases. As a result, an application range of the power supply circuit 1*v* can be expanded, and a utility value is increased.

Eighth Embodiment

The power supply circuit 1 according to the first to seventh embodiments described above can be used for various applications. In particular, the power supply circuit 1 according to the first to seventh embodiments is excellent in power efficiency, has the small ripple of the output voltage Vout, and can finely control the voltage level of the output voltage Vout, and thus, is applicable to the power supply circuit 1 for a semiconductor integrated circuit driven with low power consumption and a low voltage. At that time, the entire power supply circuit 1 including the capacitor in the switched capacitor circuit 4 (4*a*) can be formed on a semiconductor substrate.

Figure 40:
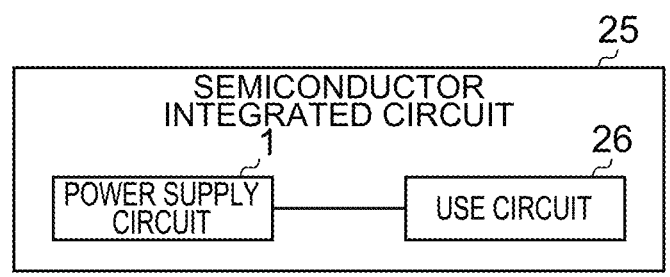
FIG. 40 is a block diagram illustrating a schematic configuration of a semiconductor integrated circuit including one of the power supply circuits according to first to seventh embodiments.

FIG. 40 is a block diagram illustrating a schematic configuration of a semiconductor integrated circuit 25 including the power supply circuit 1 according to first to seventh embodiments. The semiconductor integrated circuit 25 in FIG. 40 includes the power supply circuit 1 according to the first to seventh embodiments and a use circuit 26. A specific circuit configuration of the use circuit 26 is not limited. The use circuit 26 only needs to use the output voltage Vout output from the power supply circuit 1, and may be a digital circuit or an analog circuit. For example, the use circuit 26 may be a processor, a controller, or a peripheral circuit thereof.

Alternatively, the use circuit 26 may be a semiconductor memory, a memory controller, or a peripheral circuit thereof. Alternatively, the use circuit 26 may be a signal transmission circuit, a communication circuit, an interface circuit, or the like. In this manner, the power supply circuit 1 according to the first to seventh embodiments can be provided inside the various semiconductor integrated circuits 25, and thus, can be incorporated into various integrated circuits (ICs).

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A power supply circuit comprising:
a first node;
a second node;
a DC-DC converter that includes a switched capacitor, configured to generate an output voltage based on an input voltage supplied from the first node, and output the output voltage from the second node;
a regulator that is connected in parallel to the DC-DC converter between the first node and the second node and controls an output current flowing to the second node based on a reference voltage lower than the input voltage;
a switch circuit configured to alternatively select a first operation mode of using both closed-loop control for performing feedback control based on a voltage level of the output voltage on the DC-DC converter and open-loop control for controlling the output current based on the reference voltage without performing the feedback control on the regulator, a second operation mode of performing the closed-loop control on the DC-DC converter and stopping an operation of the regulator, or a third operation mode of performing the closed-loop control on the regulator and stopping an operation of the DC-DC converter; and
a first circuit configured to execute closed-loop control for the DC-DC converter based on a voltage level of the output voltage, wherein
the regulator includes a fourth circuit configured to execute the open-loop control, and
the fourth circuit includes:
a control amplifier configured to output a signal corresponding to a voltage difference between a voltage of a third node in the fourth circuit and the reference voltage;
a first transistor configured to adjust the output current based on an output signal of the control amplifier; and
a second transistor configured to adjust the voltage of the third node based on the output signal of the control amplifier,
wherein the switch circuit is configured to switch whether to execute the closed-loop control on the regulator.

2. The power supply circuit according to claim 1, wherein the first circuit includes:
a second circuit configured to generate a control signal according to the voltage level of the output voltage; and
a third circuit configured to control switching of the switched capacitor based on the control signal.

3. The power supply circuit according to claim 1, further comprising
a clock generation circuit configured to output a plurality of clock signals having different phases in association with a plurality of the DC-DC converters, wherein
the plurality of DC-DC converters are connected in parallel between the first node and the second node,
each of the plurality of DC-DC converters configured to output a unique output voltage in synchronization with a corresponding clock signal among the plurality of clock signals,
the first circuit is configured to control the plurality of DC-DC converters individually based on the voltage level of the output voltage and to control frequencies of the plurality of clock signals output from the clock generation circuit, and
the second node is configured to output the output voltage obtained by combining the unique voltages output from each of the plurality of DC-DC converters.

4. The power supply circuit according to claim 1, wherein
a plurality of the DC-DC converters are connected in parallel between the first node and the second node,
each of the plurality of DC-DC converters includes:
a first DC-DC converter circuit including a first switched capacitor circuit; and
a second DC-DC converter circuit including a second switched capacitor circuit having a similar configuration as the first switched capacitor circuit, and
wherein the first circuit is configured to repeat a first switching state and a second switching state alternately, the first switching state being a state in which a first capacitor in the first switched capacitor circuit is charged and a second capacitor in the second switched capacitor circuit is discharged, the second switching state being a state in which the second capacitor is charged and the first capacitor is discharged.

5. The power supply circuit according to claim 4, wherein the first circuit is configured to perform switching control of the first switched capacitor circuit and the second switched capacitor circuit such that a capacitance on the second node side in the first switching state is equal to a capacitance on the second node side in the second switching state.

6. The power supply circuit according to claim 4, further comprising
a clock generation circuit configured to output a plurality of clock signals having different phases in association with the plurality of DC-DC converters, wherein
each of the plurality of DC-DC converters is configured to switch between the first switching state and the second switching state of each of switched capacitor circuits included in each of the plurality of DC-DC converters in accordance with a logic of a corresponding clock signal among the plurality of clock signals.

7. The power supply circuit according to claim 1, wherein
a plurality of the DC-DC converters are connected in parallel between the first node and the second node,
each of the plurality of DC-DC converters outputs a unique voltage, and
the second node is configured to output the output voltage obtained by combining a plurality of the unique output voltages output from each of the plurality of DC-DC converters.

8. The power supply circuit according to claim 7, further comprising
a clock generation circuit configured to output a plurality of clock signals having different phases in association with the plurality of DC-DC converters, wherein
each of the plurality of DC-DC converters is configured to switch an operation of the switched capacitor in synchronization with a corresponding clock signal among the plurality of clock signals to generate the corresponding unique output voltage.

9. The power supply circuit according to claim 1, further comprising
a clock generation circuit configured to output a plurality of clock signals having different phases in association with a plurality of the DC-DC converters, wherein
the plurality of DC-DC converters are connected in parallel between the first node and the second node,
each of the plurality of DC-DC converters configured to output a unique output voltage in synchronization with a corresponding clock signal among the plurality of clock signals,
the power supply circuit configured to control the number of the DC-DC converters that output the unique output voltages by controlling the number of the clock signals output from the clock generation circuit, and
the second node is configured to output the output voltage obtained by combining the unique voltages output from the DC-DC converters whose number is controlled among the plurality of DC-DC converters.

10. The power supply circuit according to claim 1, wherein
the regulator is connected with a capacitor, as an output capacitance, in the switched capacitor included in the DC-DC converter.

11. A semiconductor integrated circuit comprising:
the power supply circuit according to claim 1; and
a circuit configured to perform an operation based on the output voltage from the power supply circuit.

12. The semiconductor integrated circuit according to claim 11, wherein
the first circuit includes:
a second circuit configured to generate a control signal according to the voltage level of the output voltage; and
a third circuit configured to control switching of the switched capacitor based on the control signal.

13. The semiconductor integrated circuit according to claim 11, wherein
the power supply circuit further includes a clock generation circuit configured to output a plurality of clock signals having different phases in association with a plurality of the DC-DC converters, wherein
the plurality of DC-DC converters are connected in parallel between the first node and the second node,
each of the plurality of DC-DC converters configured to output a unique output voltage in synchronization with a corresponding clock signal among the plurality of clock signals,
the first circuit is configured to control the plurality of DC-DC converters individually based on the voltage level of the output voltage and to control frequencies of the plurality of clock signals output from the clock generation circuit, and the second node is configured to output the output voltage obtained by combining the unique voltages output from each of the plurality of DC-DC converters.

14. The semiconductor integrated circuit according to claim 11, wherein
a plurality of the DC-DC converters are connected in parallel between the first node and the second node,
each of the plurality of DC-DC converters includes:
a first DC-DC converter circuit including a first switched capacitor circuit; and
a second DC-DC converter circuit including a second switched capacitor circuit having a similar configuration as the first switched capacitor circuit, and
wherein the first circuit is configured to repeat a first switching state and a second switching state alternately, the first switching state being a state in which a first capacitor in the first switched capacitor circuit is charged and a second capacitor in the second switched capacitor circuit is discharged, the second switching state being a state in which the second capacitor is charged and the first capacitor is discharged.

15. The semiconductor integrated circuit according to claim 11, wherein
a plurality of the DC-DC converters are connected in parallel between the first node and the second node,
each of the plurality of DC-DC converters outputs a unique voltage, and
the second node is configured to output the output voltage obtained by combining a plurality of the unique output voltages output from each of the plurality of DC-DC converters.

16. The semiconductor integrated circuit according to claim 11, wherein
the power supply circuit further includes a clock generation circuit configured to output a plurality of clock signals having different phases in association with a plurality of the DC-DC converters, wherein
the plurality of DC-DC converters are connected in parallel between the first node and the second node,
each of the plurality of DC-DC converters configured to output a unique output voltage in synchronization with a corresponding clock signal among the plurality of clock signals,
the power supply circuit configured to control the number of the DC-DC converters that output the unique output voltages by controlling the number of the clock signals output from the clock generation circuit, and
the second node is configured to output the output voltage obtained by combining the unique voltages output from the DC-DC converters whose number is controlled among the plurality of DC-DC converters.

17. The semiconductor integrated circuit according to claim 11, wherein
the regulator is connected with a capacitor, as an output capacitance, in the switched capacitor included in the DC-DC converter.

* * * * *